US007647209B2

(12) United States Patent
Sawada et al.

(10) Patent No.: US 7,647,209 B2
(45) Date of Patent: Jan. 12, 2010

(54) SIGNAL SEPARATING APPARATUS, SIGNAL SEPARATING METHOD, SIGNAL SEPARATING PROGRAM AND RECORDING MEDIUM

(75) Inventors: Hiroshi Sawada, Nara (JP); Shoko Araki, Kyotanabe (JP); Ryo Mukai, Nara (JP); Shoji Makino, Machida (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 396 days.

(21) Appl. No.: 10/594,983

(22) PCT Filed: Feb. 7, 2006

(86) PCT No.: PCT/JP2006/302092

§ 371 (c)(1),
(2), (4) Date: Sep. 29, 2006

(87) PCT Pub. No.: WO2006/085537

PCT Pub. Date: Aug. 17, 2006

(65) Prior Publication Data

US 2008/0215651 A1    Sep. 4, 2008

(30) Foreign Application Priority Data

Feb. 8, 2005    (JP)    .............. 2005-031824
Mar. 11, 2005    (JP)    .............. 2005-069768
Jun. 7, 2005    (JP)    .............. 2005-166760

(51) Int. Cl.
*G06F 3/00*    (2006.01)
(52) U.S. Cl. ............... 702/190; 702/189; 702/194; 702/196

(58) Field of Classification Search ............ 702/30, 702/56, 66, 150, 177, 179, 180, 187, 190; 342/147; 703/11; 708/322, 205; 706/22
See application file for complete search history.

(56) References Cited

U.S. PATENT DOCUMENTS 6,625,587 B1 *    9/2003    Erten et al. ............... 706/22

(Continued)

FOREIGN PATENT DOCUMENTS

JP    2004-145172    5/2004

(Continued)

OTHER PUBLICATIONS

Ryo Mukai, et al., "Blind Source Separation of Many Signals in the Frequency Domain", IEEE, XP-002433501, vol. V, May 14, 2006, pp. 969-972.

(Continued)

*Primary Examiner*—Eliseo Ramos Feliciano
*Assistant Examiner*—Felix E Suarez
(74) *Attorney, Agent, or Firm*—Oblon, Spivak, McClelland, Maier & Neustadt, L.L.P.

(57) ABSTRACT

A frequency domain transforming section transforms mixed signals observed by multiple sensors into mixed signals in the frequency domain, a complex vector generating section generates a complex vector by using the frequency-domain mixed signals, a normalizing section generates a normalized vector excluding frequency dependence of the complex vector, and a clustering section clusters the normalized vectors to generate clusters. Then, a separated signal generating section generates separated signals in the frequency domain by using information about the clusters and a time domain transforming section transforms the separated signals in the frequency domain into separated signals in the time domain.

31 Claims, 41 Drawing Sheets

U.S. PATENT DOCUMENTS

| | | | |
|---|---|---|---|
| 7,039,546 B2 * | 5/2006 | Sawada et al. | 702/150 |
| 2005/0203981 A1 * | 9/2005 | Sawada et al. | 708/322 |
| 2006/0058983 A1 * | 3/2006 | Araki et al. | 702/190 |

FOREIGN PATENT DOCUMENTS

| | | |
|---|---|---|
| JP | 2004-170552 | 6/2004 |
| WO | WO 2004/079388 | 9/2004 |

OTHER PUBLICATIONS

Stefan Winter, et al., "Overcomplete BSS for Convolutive Mixtures Based on Hierarchical Clustering", PROC. ICA—Independent Component Analysis and Blind Source Separation, XP-002432839, Sep. 2004, pp. 652-660.

Ronald E. Crochiere, et al., Multirate Digital Signal Processing, 1983, 1 pp. vii-xii, 78-88, 296-300 and Two Cover pages.

Özgür Yilmaz, et al., "Blind Separation of Speech Mixtures via Time-Frequency Masking", IEEE Transactions on Signal Processing, vol. 52, No. 7, Jul. 2004, pp. 1830-1847.

Richard O. Duda, et al., Pattern Classification, Second Edition, 2001, pp. vii-xvii, 526-527, and two cover pages.

Ryo Mukai, et al., "Frequency Domain Blind Source Separation Using Small and Large Spcing Sensor Pairs", IEEE, 2004, pp. V-1 to V-4.

Aapo Hyvärinen, et al., Independent Component Analysis, 2001, pp. v-xvii, 6-7 and a cover page.

Shoko Araki, "Underdetermined Blind Separation for Speech in Real Environments With Sparseness and ICA", IEEE, 2004, pp. III-881 to III-884.

Simon Haykin (editor), Unsupervised Adaptive Filtering, vol. 1 Blind Source Separation, 2000, pp. vi-ix, 2-3, and two cover pages.

Barry D. Van Veen, et al., "Beamforming: A Versatile Approach to Spatial Filtering", IEEE ASSP Magazine, Apr. 1988, pp. 4-24.

Hiroshi Sawada, et al., "A Robust and Precise Method for Solving the Permutation Problem of Frequency-Domain Blind Source Separation", IEEE Transactions on Speech and Audio Processing, vol. 12, No. 5, Sep. 2004, pp. 530-538.

Hiroshi Sawada, et al., "Polar Coordinate Based Nonlinear Function for Frequency-Domain Blind Source Separation", IEICE Trans. Fundamentals, vol. E86-A, No. 3, Mar. 2003, pp. 590-596.

Hiroshi Sawada, et al., "Blind Extraction of a Dominant Source Signal From Mixtures of Many Sources", IEEE, 2005, pp. III-61 to III-64.

Shoko Araki, et al., "A Novel Blind Source Separation Method With Observation Vector Clustering", NTT Communication Science Laboratories, 4 pages, Year 2005.

Ronald E. Crochiere, et al., Multirate Digital Signal Processing, 1983, 1 pp. vii - xii, 78-88, 296-300 and Two Cover pages.

Özgür Yilmaz, et al., "Blind Separation of Speech Mixtures via Time-Frequency Masking", IEEE Transactions on Signal Processing, vol. 52, No. 7, Jul. 2004, pp. 1830-1847.

Richard O. Duda, et al., Pattern Classification, Second Edition, 2001, pp. vii - xvii, 526-527, and two cover pages.

Ryo Mukai, et al., "Frequency Domain Blind Source Separation Using Small and Large Spcing Sensor Pairs", IEEE, 2004, pp. V-1 to V-4.

Aapo Hyvarinen, et al., Independent Component Analysis, 2001, pp. v—xvii, 6-7 and a cover page.

Shoko Araki, "Underdetermined Blind Separation for Speech in Real Environments With Sparseness and ICA", IEEE, 2004, pp. III-881 to III-884.

Simon Haykin (editor), Unsupervised Adaptive Filtering, vol. 1 Blind Source Separation, 2000, pp. vi - ix, 2-3, and two cover pages.

Barry D. Van Veen, et al., "Beamforming: A Versatile Approach to Spatial Filtering", IEEE ASSP Magazine, Apr. 1988, pp. 4-24.

Hiroshi Sawada, et al., "A Robust and Precise Method for Solving the Permutation Problem of Frequency-Domain Blind Source Separation", IEEE Transactions on Speech and Audio Processing, vol. 12, No. 5, Sep. 2004, pp. 530-538.

Hiroshi Sawada, et al., "Blind source separation of many sounds in the frequency domain",Japanese Society for Artificial Intelligence Technical Report, pp. 17-22 (with English abstract), Year 2005.

Hiroshi Sawada, et al., "Polar Coordinate Based Nonlinear Function for Frequency-Domain Blind Source Separation", IEICE Trans. Fundamentals, vol. E86-A, No. 3, Mar. 2003, pp. 590-596.

Hiroshi Sawada, et al., "Blind Extraction of a Dominant Source Signal From Mixtures of Many Sources", IEEE, 2005, pp. III-61 to III-64.

Hiroshi Sawada, et al., "Blind extraction of dominant target sources using ICA and time-frequency masking", pp. 1-8, Year 2006.

Shoko Araki, et al., "A Novel Blind Source Separation Method With Observation Vector Clustering", NTT Communication Science Laboratories, 4 pages, Year 2005.

* cited by examiner

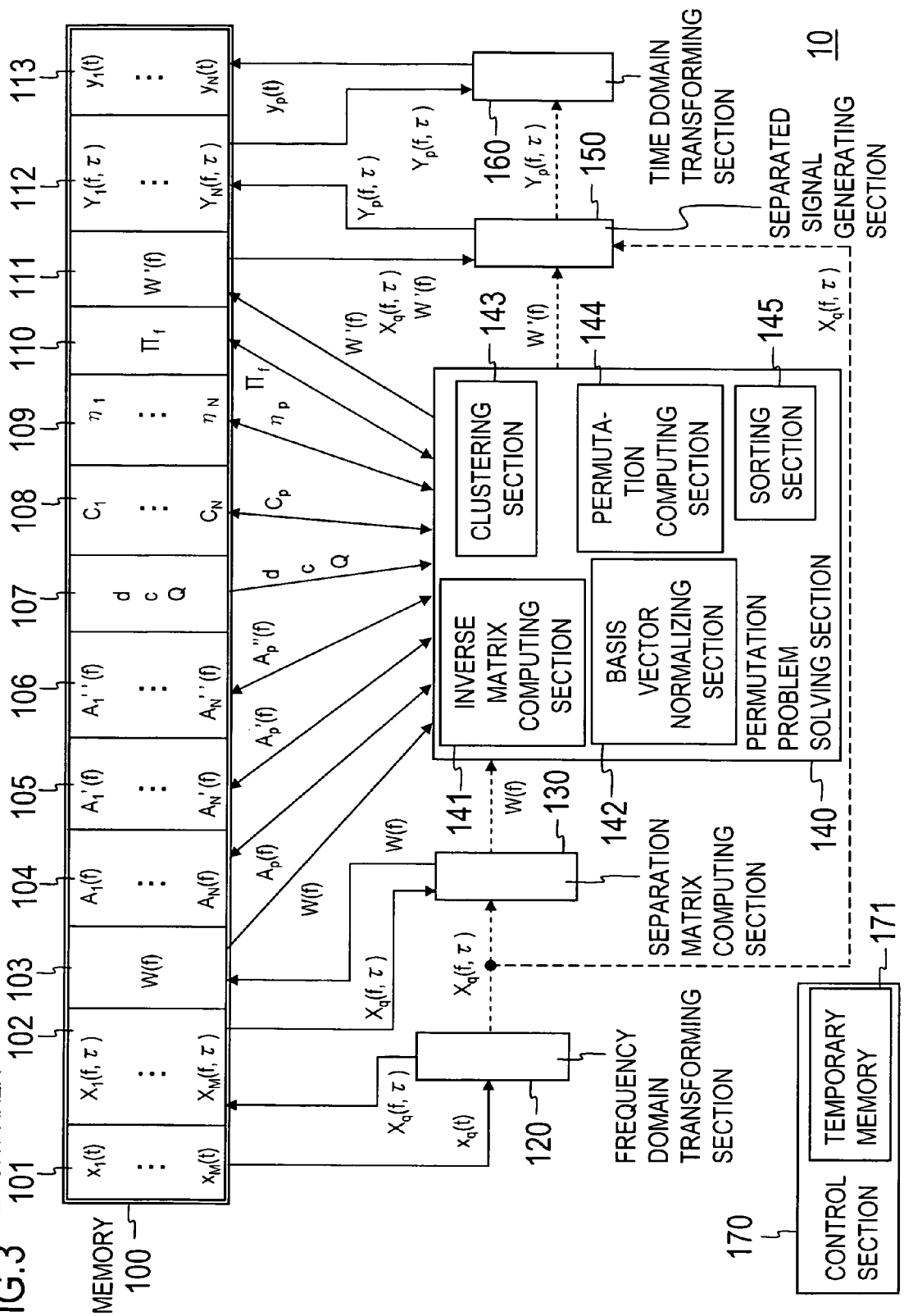

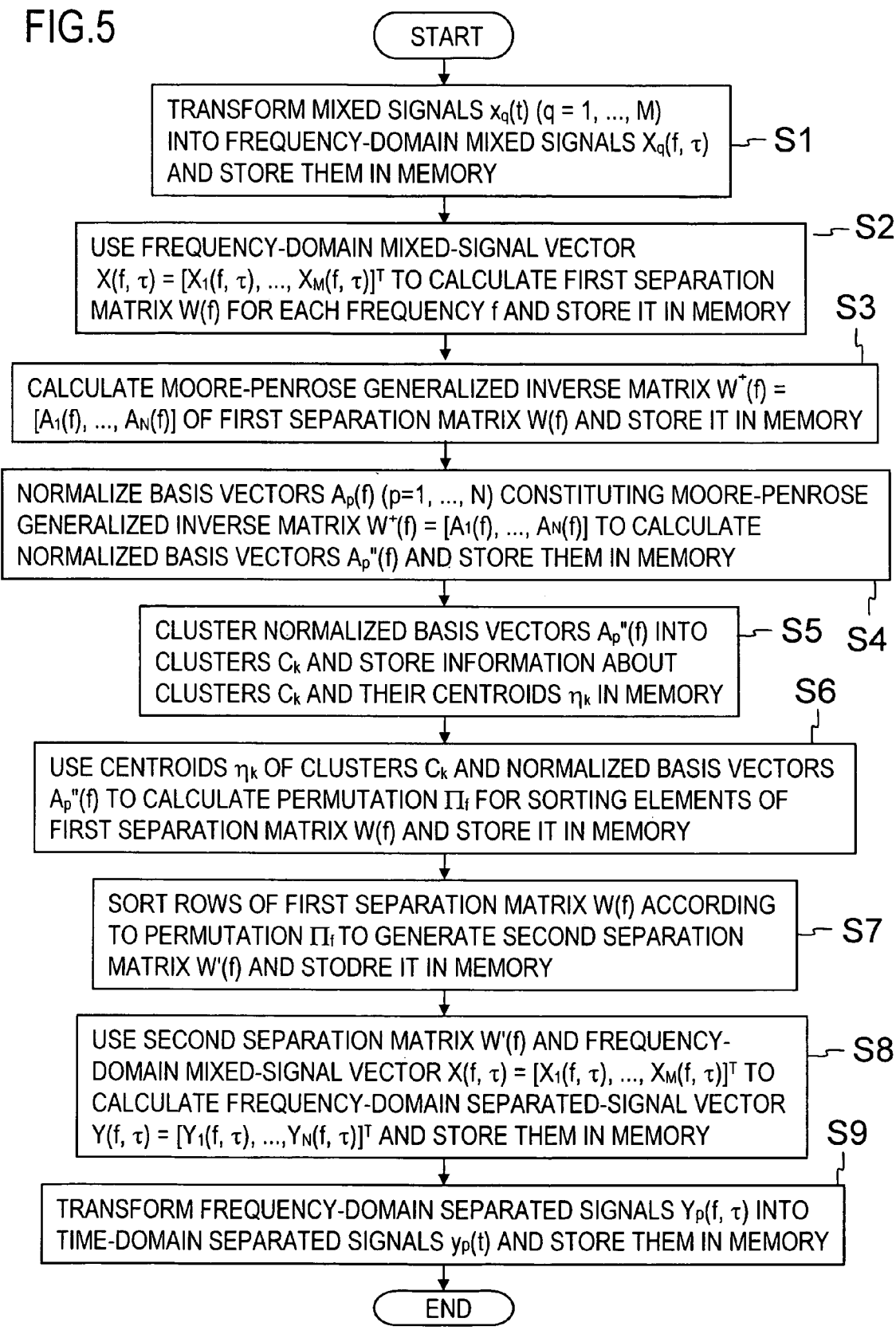

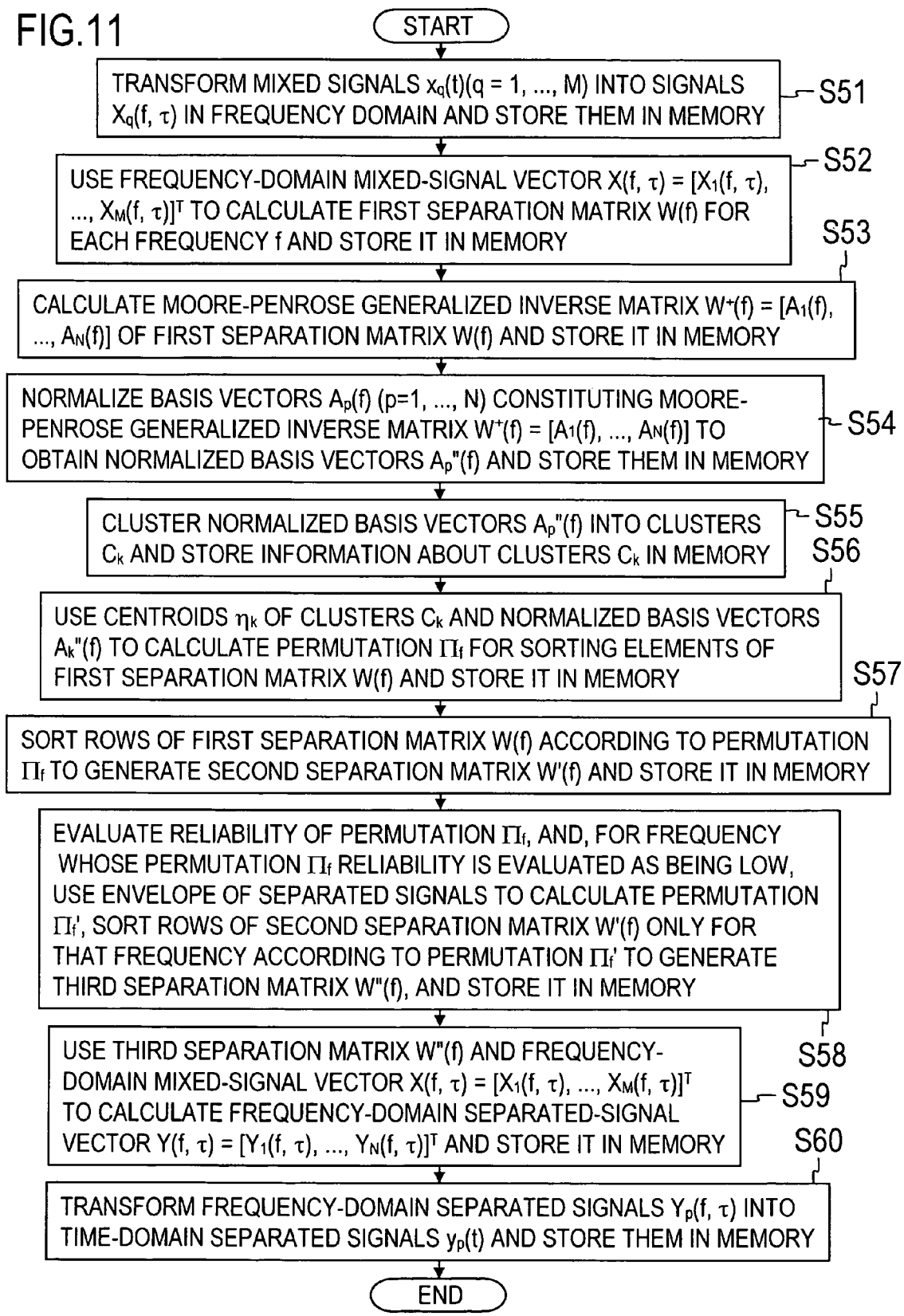

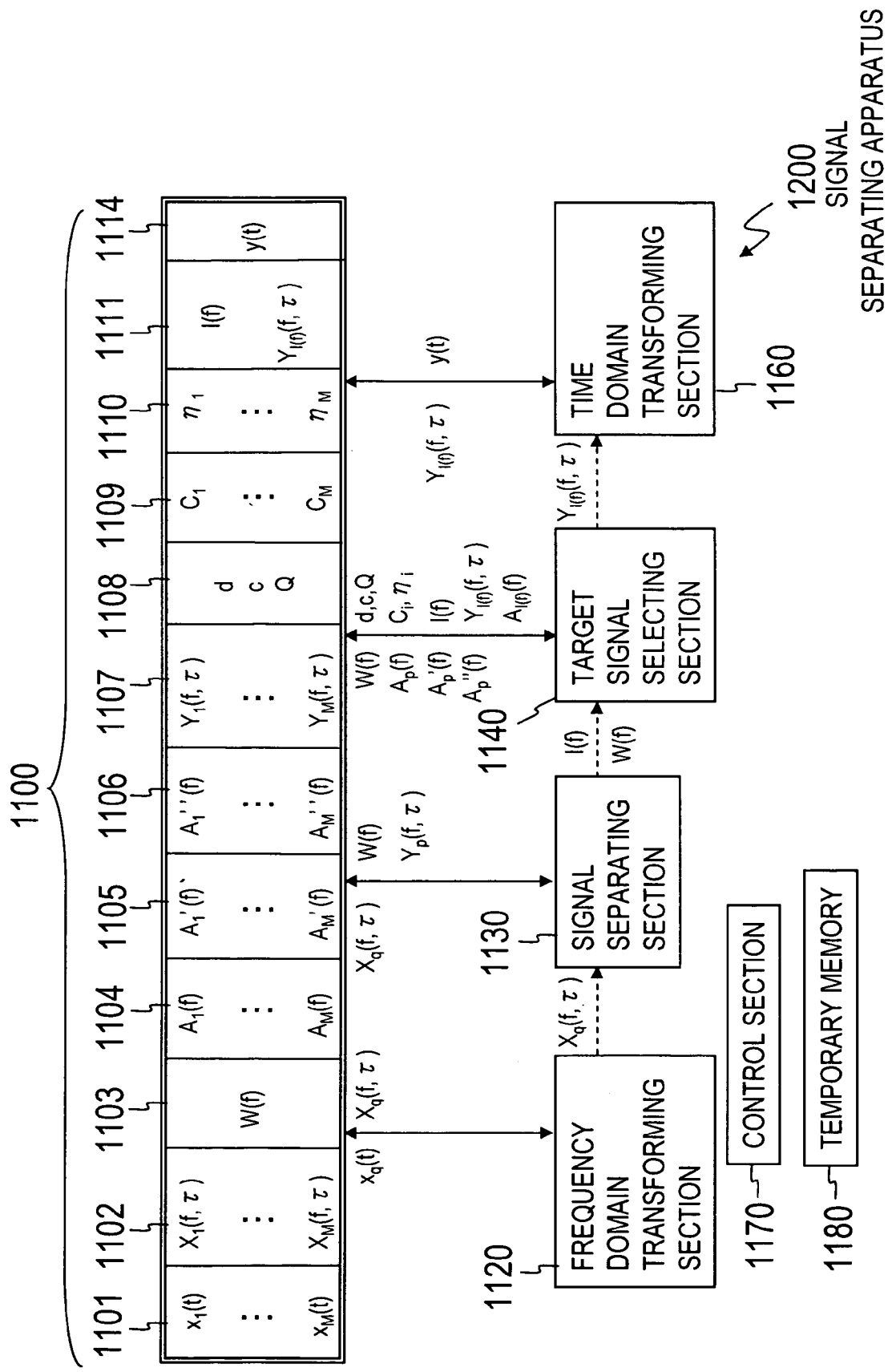

| TARGET SOUND POSITION | a120 | b120 | c120 | c170 |
|---|---|---|---|---|
| ICA ONLY | 11.7dB | 11.7dB | 9.0dB | 12.9dB |
| ICA WITH MASKING (0.375 $\pi$ ,40) | 15.5dB | 14.3dB | 12.4dB | 16.7dB |
| ICA WITH MASKING (0.333 $\pi$ ,20) | 16.9dB | 15.4dB | 14.0dB | 18.1dB |
| ICA WITH MASKING (0.25 $\pi$ ,20) | 19.7dB | 17.9dB | 16.9dB | 20.8dB |

WHEN $d_{max}/2 \geq d$

WHEN $d_{max}/2 < d < d_{max}$

WHEN d = d_max

WHEN d > d_max

EXPERIMENTAL RESULTS (in [dB])

|  | $SIR_1$ | $SIR_2$ | $SIR_3$ |
|---|---|---|---|
| InputSIR | -5.2 | -1.5 | -2.9 |
| DOA (Previous) | 17.7 | 6.3 | 12.7 |
| Normalized obser. vector (Proposed) | 16.4 | 6.0 | 13.0 |

EXPERIMENTAL RESULTS (in[dB])

|  | $SIR_1$ | $SIR_2$ | $SIR_3$ | $SIR_4$ |
|---|---|---|---|---|
| InputSIR | -8.1 | -6.0 | -5.9 | -0.8 |
| Proposed | 16.8 | 10.6 | 14.5 | 10.8 |

EXPERIMENTAL RESULTS (in[dB])

|  | $SIR_1$ | $SIR_2$ | $SIR_3$ | $SIR_4$ |
|---|---|---|---|---|
| InputSIR | -8.1 | -5.3 | -6.6 | -0.6 |
| Proposed | 17.8 | 15.6 | 9.6 | 15.7 |

SIGNAL SEPARATING APPARATUS, SIGNAL SEPARATING METHOD, SIGNAL SEPARATING PROGRAM AND RECORDING MEDIUM

TECHNICAL FIELD

The present invention relates to the signal processing technical field and, in particular, to a technique for extracting a source signal from a mixture in which multiple source signals are mixed in a space.

BACKGROUND ART

A Beamformer (also called beamforming) is a widely-known conventional art of extracting a particular signal through use of multiple sensors and suppressing the other signals (for example see Non-patent literature 1). However, the beamformer requires information about the direction of a target signal and therefore has the drawback of being difficult to use in situations in which such information cannot be obtained (or cannot be estimated).

One newer art is Blind Signal Separation (BSS) (for example see Non-patent literature 2). BSS is advantageous in that it does not require the information that the beamformer requires and is expected to find application in various situations. Signal separation using the BSS will be descried below.

[Blind Signal Separation]

First, BSS is formulated. It is assumed here that all signals are sampled at a certain sampling frequency $f_s$ and are discretely represented. It is also assumed that N signals are mixed and observed by M sensors. In the following description, a situation is dealt with in which signals are attenuated and delayed with the distance from the signal sources to sensors and a distortion in the transmission channels can occur due to reflections of the signals by objects such as walls. Signals mixed in such a situation can be expressed, using the impulse responses $h_{qk}(r)$ from sources k to sensors q (where q is the sensor's number [q=1, ..., M] and k is the source's number [k=1, ..., N]), as a convolutive mixture

[Formula 1]
$$x_q(t) = \sum_{k=1}^{N} \sum_{r=0}^{\infty} h_{qk}(r) s_k(t-r) \quad (1)$$

where t denotes the time of sampling, $s_k(t)$ denotes the source signal originated from a signal source at sample time t, $x_q(t)$ denotes the signal observed by a sensor q at the sampling time t, and r is a sweep variable.

Typical impulse response $h_{qk}(r)$ has a strong pulsing response after a time lapse and then attenuates with time. The purpose of blind signal separation is to obtain separated signals $y_1(t), \ldots, y_N(t)$, each corresponding to one of the source signals $s_1(t), \ldots, S_N(t)$, only from observed signals (hereinafter referred to as "mixed signals") without the aid of information about the source signals $s_1(t), \ldots, s_N(t)$ and impulse responses $h_{11}(r), \ldots, h_{1N}(r), \ldots, h_{M1}(r), \ldots, h_{MN}(r)$.

[Frequency Domain]

A process of conventional BSS will be described below.

Operations for separation are performed in the frequency domain. Therefore, an L-point Short-Time discrete Fourier Transformation (STFT) is applied to the mixed signal $x_q(t)$ at a sensor q to obtain a time-series signal at each frequency.

[Formula 2]
$$X_q(f, \tau) = \sum_{r=-L/2}^{(L/2)-1} x_q(\tau+r) g(r) e^{-j2\pi f r} \quad (2)$$

Here, f is one of frequencies which are discretely sampled as $f=0, f_s/L, \ldots, f_s(L-1)/L$ (where $f_s$ is the sampling frequency), $\tau$ is discrete time, j is an imaginary unit, and g(r) is a window function. The window function may be a window that has the center of power at g(0), such as a Hanning window.

[Formula 3]
$$g(r) = \frac{1}{2}\left(1 + \cos\frac{2\pi r}{L}\right)$$

In this case, $X_q(f, \tau)$ represents a frequency characteristic of the mixed signals $x_q(t)$ centered at time $t=\tau$. It should be noted that $X_q(f, \tau)$ includes information about L samples and $X_q(f, \tau)$ does not need to be obtained for all $\tau$. Therefore, $X_q(f, \tau)$ is obtained at $\tau$ with an appropriate interval.

By performing the processing in the frequency domain, the convolutive mixture in the time domain expressed by Equation (1) can be approximated as a simple mixture at each frequency as

[Formula 4]
$$X_q(f, \tau) = \sum_{k=1}^{N} H_{qk}(f) S_k(f, \tau) \quad (3)$$

Thus, operations for separation are simplified. Here, $H_{qk}(f)$ is the frequency responses of a source signal k to a sensor q and $S_k(f, \tau)$ is obtained by applying a Short-Time Discrete Fourier Transformation to the source signal $s_k(t)$ according to an equation similar to Equation (2). With a vector notation, Equation (3) can be written as

[Formula 5]
$$X(f, \tau) = \sum_{k=1}^{N} H_k(f) S_k(f, \tau) \quad (4)$$

where, $X(f, \tau) = [X_1(f, \tau), \ldots X_M(f, \tau)]^T$ is a mixed-signal vector, $H_k(f) = [H_{1k}(f), \ldots, H_{MK}(f)]^T$ is the vector consisting of frequency responses from the source k to sensors. Here, $[*]^T$ represents the transposed vector of $[*]$.

[Signal Separation using Independent Component Analysis]

One approach to the blind signal separation is signal separation using Independent Component Analysis (ICA). In the approach using ICA, a separation matrix W(f) of N rows and M columns and a separated signal vector $$Y(f,\tau) = W(f) X(f,\tau) \quad (5)$$

are calculated solely from the mixed-signal vector $X(f, \tau)$. Here, the separation matrix W(f) is calculated such that the elements (separated signals) $Y_1(f, \tau), \ldots, Y_N(f, \tau)$ of the separated signal vector $Y(f, \tau)=[Y_1(f, \tau), \ldots, Y_N(f, \tau)]^T$ are independent of each other. For this calculation, an algorithm such as the one described in Non-patent literature 4 may be used.

In ICA, separation is made by exploiting the independence of signals. Accordingly, obtained separated signals $Y_1(f, \tau), \ldots, Y_N(f, \tau)$ have ambiguity of the order. This is because the independence of signals is retained even if the order of the signals changes. The order ambiguity problem, known as a permutation problem, is an important problem in signal separation in the frequency domain. The permutation problem must be solved in such a manner that the suffix p of separated signals $Y_p(f, \tau)$ corresponding to the same source signal $S_k(f, \tau)$ is the same at all frequencies f.

Examples of conventional approaches to solving the permutation problem include the one described in Non-patent literature 5. In that approach, information about the position of a signal source (the direction and the distance ratio) is estimated with respect to the positions of selected two sensors (sensor pair). The estimates at multiple sensor pairs are combined to obtain more detailed positional information. These estimates as positional information are clustered and the estimates that belong to the same cluster are considered as corresponding to the same source, thereby solving the permutation problem.

[Signal Separation Using Time-Frequency Masking]

Another approach to blind signal separation is a method using time-frequency masking. This approach is a signal separation and extraction method effective even if the relation between the number N of sources and the number M of sensors is such that M<N.

In this approach, the sparseness of signals is assumed. Signals are said to be "sparse" if they are null at most of discrete times $\tau$. The sparseness of signals can be observed for example in speech signals in the frequency domain. The assumption of the sparseness and independence of signals makes it possible to assume that the probability that multiple coexisting signals are observed to overlap one another at a time-frequency point (f, $\tau$) is low. Accordingly, it can be assumed that mixed signals at each time-frequency point (f, $\tau$) at each sensor consists of only one signal $s_p(f, \tau)$ that is active at that time-frequency point (f, $\tau$). Therefore, mixed-signal vectors are clustered by an appropriate feature quantity, a time-frequency mask $M_k(f, \tau)$ to be used for extracting mixed signals $X(f, \tau)$ that correspond to the member time-frequencies (f, $\tau$) of each cluster $C_k$, and each signal is separated and extracted according to $$Y_k(f,\tau)=M_k(f,\tau)X_{Q'}(f,\tau).$$

Here, $X_{Q'}(f, \tau)$ is one of the mixed signals and $Q' \in \{1, \ldots, M\}$.

The feature quantity used for the clustering may be obtained, for example, as follows. The phase difference between the mixed signals at two sensors (a sensor q and a reference sensor Q (hereinafter Q is referred to as the reference value and the sensor that corresponds to the reference value Q is denoted as the reference sensor Q)) is calculated as

[Formula 6]

$$\phi(f, \tau) = \angle \frac{X_q(f, \tau)}{X_Q(f, \tau)} \quad (8)$$

and, from the phase difference, Direction of Arrival (DOA)

[Formula 7]

$$\theta(f, t) = \cos^{-1} \frac{\phi(f, \tau) \cdot c}{2\pi \cdot f \cdot d} \quad (9)$$

can be calculated as the feature quantity used for the clustering (for example see Non-patent literature 3). Here, "d" is the distance between sensor q and reference sensor Q and "c" is the signal transmission speed. Also, the k-means method (for example see Non-patent literature 6) may be used for the clustering. The time-frequency mask $M_k(f, \tau)$ used may be generated by calculating the average $\tilde{\theta}_1, \tilde{\theta}_2, \ldots, \tilde{\theta}_N$ of the members of each cluster $C_k$ and obtaining

[Formula 8]

$$M_k(f, \tau) = \begin{cases} 1 & \tilde{\theta}_k - \Delta \le \theta(f, \tau) \le \tilde{\theta}_k + \Delta \\ 0 & \text{otherwise} \end{cases}$$

$$(k = 1, \ldots, N)$$

Here, $\Delta$ gives the range in which signals are extracted. In this method, as $\Delta$ is reduced, the separation and extraction performance increases but the nonlinear distortion increases; on the other hand, as $\Delta$ is increased, the nonlinear distortion decreases but the separation performance degrades.

Another feature quantity that can be used for the clustering may be the phase difference between the mixed signals at two sensors (sensor q and reference sensor Q) (Equation (8)) or the gain ratio between the two sensors

[Formula 9]

$$\alpha(f, \tau) = \left| \frac{X_q(f, \tau)}{X_Q(f, \tau)} \right|$$

Non-patent literature 1: B. D. Van Veen and K. M. Buckley, "Beamforming: a versatile approach to special filtering," IEEE ASSP Magazine, pp. 4-24, April 1988

Non-patent literature 2: S. Haykin, eds, "Unsupervised Adaptive Filtering," John-Wiley & Sons, 2000, ISBN 0-471-29412-8

Non-patent literature 3: S. Araki, S. Makino, A. Blin, R. Mukai, and H. Sawada, "Underdetermined blind separation for speech in real environments with sparseness and ICA," in Proc. ICASSP 2004, vol. III, May 2004, pp. 881-884

Non-patent literature 4: A. Hyvarinen and J. Karhunen and E. Oja, "Independent Component Analysis," John Wiley & Sons, 2001, ISBN 0-471-40540

Non-patent literature 5: R. Mukai, H. Sawada, S. Araki and S. Makino, "Frequency Domain Blind Source Separation using Small and Large Spacing Sensor Pairs," in Proc. of ISCAS 2004, vol. V, pp. 1-4, May 2004

Non-patent literature 6: R. O. Duda, P. E. Hart, an D. G Stork, Pattern Classification, Wiley Interscience, 2nd edition, 2000

DISCLOSURE OF THE INVENTION

Issues to be Solved by the Invention

However, the conventional art described above had a problem that information obtained from signals observed by multiple sensors could not efficiently and simply be used for signal separation.

For example, a problem with the signal separation using independent component analysis is that it requires complicated operations to accurately solve the permutation problem. That is, the conventional approach to solving the permutation problem estimates the direction and the distance ratio of each individual sensor pair. Accordingly, in order to accurately solve the permutation problem, estimates obtained at multiple sensors had to be combined. Furthermore, the estimates have errors. Therefore, sensor pairs that were likely to have less errors had to be used on a priority basis or the method for combining the estimates had to be designed such that errors in the estimates were accommodated. Another problem with the approach was that information about the positions of sensors had to be obtained beforehand because of the need for estimating information about the positions of signal sources. This is disadvantageous when sensors are randomly disposed. Even if sensors are regularly disposed, it is difficult to obtain precise positional information and therefore operations such as calibration must be performed in order to solve the permutation problem more accurately.

For the conventional signal separation using time-frequency masking, only the methods that use two sensors have been proposed. If there are more than two sensors, information about only two particular sensors q and Q among the sensors have been used to calculate a feature quantity. This means reduction in dimensionality and therefore in the amount of information as compared with the case where all available sensors are used. Accordingly, information about all sensors was not efficiently used, whereby the performance was limited. To use information about all sensors effectively, feature quantities obtained with multiple sensor pairs can be combined as in the approach in Non-patent literatures 5, for example. However, in order to combine feature quantities, additional processing for extracting the feature quantities is required and some technique may have to be used in combining them, such as selecting and using sensor pairs that are likely to have less errors in combining. Also this approach has a problem that precise information about the positions of sensors must be obtained beforehand. This is disadvantageous when sensors are to be positioned randomly. Even if sensors are regularly disposed, it is difficult to obtain precise positional information and therefore operations such as calibration must be performed for more accurate signal extraction.

The fundamentals of blind signal separation are to separate mixed signals observed by sensors and to extract multiple separated signals. However, not all the separated signals are important; only some of the separated signals may include a target signal. In such a case, the separated signals that contain the target signal must be selected. Conventional blind signal separation does not provide information indicating which separated signals include a target signal. Therefore, some other means must be used to determine which separated signals contain a target signal.

The present invention has been made in light of these circumstances, and an object of the present invention is to provide a technique capable of simply and efficiently using information obtained from signals observed by multiple sensors to perform signal separation.

Means to Solve Issues

According to the present invention, in order to solve the problems described above, first a frequency domain transforming section transforms mixed signals observed by multiple sensors into mixed signals in the frequency domain. Then, a normalizing section normalizes complex vectors generated by using the mixed signal in the frequency domain to generate normalized vectors excluding the frequency dependence of the complex vector. A clustering section then clusters the normalized vectors to generate clusters. The clusters are then used for signal separation.

The generation of the clusters does not require direct use of precise information about the positions of the sensors observing mixed signals as input information. Furthermore, the clusters are generated on the basis of information that is dependent on the position of the signal sources. Thus, according to the present invention, signal separation can be performed without using precise information about the positions of the sensors.

According to the present invention, the normalizing section preferably includes a first normalizing section which normalizes the argument of each element of a complex vector on the basis of one particular element of the complex vector and a second normalizing section which divides the argument of each element normalized by the first normalizing section by a value proportional to the frequency.

The normalized complex vectors form clusters that are dependent on the positions of the signal sources. Thus, signal separation can be performed without using precise information about the positions of the sensors.

According to the present invention, the normalizing section preferably further includes a third normalizing section which normalizes the norm of a vector consisting of the elements normalized by the second normalizing section to a predetermined value.

The normalized complex vectors form clusters that are dependent on the positions of the signal sources. By normalizing the norm of vector consisting of elements normalized by the second normalization, clustering operation is simplified.

According to a preferred mode of the first aspect of the present invention, the frequency domain transforming section first transforms the mixed signals observed by multiple sensors into mixed signals in the frequency domain. Then, a separation matrix computing section calculates a separation matrix for each frequency by using the frequency-domain mixed signals and an inverse matrix computing section calculates a generalized inverse matrix of the separation matrix. Then, a basis vector normalizing section normalizes the basis vectors constituting the generalized inverse matrix to calculate normalized basis vectors. A clustering section then clusters the normalized basis vectors into clusters. Then, a permutation computing section uses the center vectors of the clusters and the normalized basis vectors to calculate a permutation for sorting the elements of the separation matrix. It should be noted that the notion of a basis vector is included in the notion of that of a complex vector.

According to the first aspect of the present invention, basis vectors are normalized and then clustered to calculate a permutation for solving a permutation problem. Therefore, information about the positions of sensors does not need to be obtained beforehand for the clustering. According to a preferred mode of the present invention, all elements of normalized basis vectors are subjected to being clustered to calculate a permutation for solving a permutation problem. Therefore, unlike the conventional art, operations for combining the results of estimation are not required.

In the first aspect of the present invention, more preferably the basis vector normalizing section normalizes the basis vector to eliminate its frequency dependence. More preferably, the normalization for eliminating frequency dependence of the basis vector is achieved by normalizing the argument of each element of the basis vector on the basis of one particular element of the basis vector and dividing the argument of each element by a value proportional to the frequency. By this normalization, clusters that are dependent on the positions of signal sources can be generated.

In the first aspect of the present invention, the normalization that eliminates frequency dependence of the basis vector is performed more preferably by calculating

[Formula 10]

$$A'_{qp}(f) = |A_{qp}(f)| \exp\left[j \frac{\arg[A_{qp}(f)/A_{Qp}(f)]}{4 f c^{-1} d}\right] \qquad (10)$$

for each element $A_{qp}(f)$ (where q=1, ..., M and M is the number of sensors that observe mixed signals) of the basis vector $A_p(f)$ (where p=1, ..., N and N is the number of signal sources). Here, "exp" is Napier's number, arg[.] is an argument, "f" is the frequency, "j" is an imaginary unit, "c" is a signal transmission speed, "Q" is a reference value selected from the natural numbers less than or equal to M, and "d" is a real number. That is, the normalization performed by calculating Equation (10) normalizes the argument of each element of a basis vector by using one particular element of the basis vector as the reference and dividing the argument of each element by a value proportional to the frequency. This normalization eliminates dependence on frequencies. Furthermore, the normalization does not need precise information about the positions of sensors.

The real number "d" in Equation (10) is preferably the maximum distance $d_{max}$ between the reference censor Q corresponding to the element $A_{Qp}(f)$ and another sensor because this typically improves the accuracy of the clustering. The reason will be detailed later.

In the first aspect of the present invention, a basis vector is normalized to a frequency-independent frequency-normalized vector and this frequency-normalized vector is then normalized to a normalized basis vector whose norm has a predetermined value. The normalized basis vector generated by the two-step normalization is independent of frequencies and dependent only on the positions of signal sources. It should be noted that the norm normalization simplifies clustering operation.

In the first aspect of the present invention, preferably a permutation is calculated by using the envelope of separated signals (the envelope of the absolute values of separated signals), central vectors of clusters, and normalized basis vectors. Thus, a permutation problem can be solved more accurately.

According to a preferable second aspect of the present invention, a frequency domain transforming section transforms mixed signals observed by multiple sensors into mixed signal in the frequency domain and a signal separating section calculates a separation matrix and separated signals for each frequency by using the frequency-domain mixed signals. Then, a target signal selecting section selects selection signals including a target signal from among the separated signals. In this procedure, basis vectors which are columns of the generalized inverse matrix of the separation matrix are normalized, the normalized basis vectors are clustered, and selection signals are selected by using the variance of the clusters as the indicator. If the separation matrix is a square matrix, its generalized inverse matrix is equivalent to its inverse matrix. That is, the notion of generalized inverse matrix includes ordinary inverse matrices.

By using the variance of clusters as the indicator, a signal nearer a sensor can be located as a target signal and separated signals including the target signal can be selected as selection signals. The reason will be described below. The normalization of basis vectors is performed such that normalized basis vectors form clusters that are dependent only on the positions of signal sources in a given model (for example a near-field model) that is an approximation of a convolutive mixture of signals originated from multiple signal sources. However, there are various factors in a real environment that are not reflected in such a model. For example, transmission distortions of signals caused as they are reflected by objects such as walls are not reflected in a near-field model. Such a discrepancy between a real environment and a model increase as the distance from a signal source to the sensors increase; signals nearer to the sensors exhibits smaller discrepancy. Accordingly, signals nearer to the sensors can be normalized under conditions closer to those in a real environment and therefore the variance of clusters caused by discrepancies between the real environment and a model can be smaller. Based on the realization of this relation, a preferred mode of the second aspect of the present invention extracts selection signals including a target signal closer to the sensors by using the variance of clusters as the indicator. The above operation can extract a target signal and suppress other interfering signals to some extent.

However, if a separation matrix and separated signals are calculated by using Independent Component Analysis (ICA), the number of interfering signals that can be completely suppressed by the above process is equal to the number of sensors minus 1 at most. If there are more interfering signals, unsuppressed interfering signal components will remain. Therefore, according to the present invention, preferably a mask generating section generates a time-frequency mask by using frequency-domain mixed signals and basis vectors, and a masking section applies the time-frequency mask to selected selection signals. Thus, interfering signals remaining in the selection signals can be better suppressed even if the number of signal sources is larger than that of the sensors.

In the second aspect of the present invention, the mask generating section preferably generates a whitening matrix by using the frequency-domain mixed signals, uses the whitening matrix to transform a mixed-signal vector consisting of the frequency-domain mixed signals to a whitened mixed-signal vector and transform the basis vectors to a whitened basis vectors, then calculates the angle between the whitened mixed-signal vector and the whitened-basis vector at each time-frequency, and generates a time-frequency mask by using a function including the angle as an element. By applying the time-frequency mask to selection signals, interfering signals remaining in the selection signals can be suppressed.

In the second aspect of the present invention, the whitening matrix is preferably $V(f)=R(f)^{-1/2}$, where $R(f)=<X(f,\tau)\cdot X(f,\tau)^H>_\tau$, f is a frequency, $\tau$ is discrete time, $X(f,\tau)$ is a mixed-signal vector, $<*>_\tau$ is a time average vector of a vector "*", and $*^H$ is a complex conjugate transposed vector of the vector "*" (a vector obtained by transposing the complex conjugate of the elements of the vector). Then, a whitened mixed-signal vector $Z(f,\tau)$ is calculated as $Z(f,\tau)=V(f)\cdot X(f,\tau)$ and whitened basis vector $B(f)$ is calculated as $B(f)=V(f)\cdot A(f)$, where $A(f)$ is a basis vector. The angle $\theta(f,\tau)$ is calculated as $\theta(f,\tau)=\cos^{-1}(|B^H(f)\cdot Z(f,\tau)|/\|B(f)\|\cdot\|Z(f,\tau)\|)$, where $|*|$ is the absolute value of a vector "*" and ‖*‖ the norm of the vector "*". A logistic function $M(\theta(f, \tau)) = \alpha/(1+e^{g \cdot (\theta(f,\tau)-\theta_T)})$ is calculated as a time-frequency mask, where $\alpha$, g, and $\theta_T$ are real numbers. The time-frequency mask can be applied to extracted selection signals to further suppress interfering signals remaining in the selection signals.

In the second aspect of the present invention, the target signal selecting section preferably performs normalization that eliminates frequency dependence from a basis vector. In the second aspect of the present invention, the normalization that eliminates frequency dependence from a basis vector more preferably normalizes the argument of each element of the basis vector by using one particular element of the basis vector as the reference and divides the argument of each element by a value proportional to the frequency. In the second aspect of the present invention, the normalization that eliminates frequency dependence of a basis vector is performed preferably by calculating

[Formula 11]

$$A'_{qp}(f) = |A_{qp}(f)| \exp\left[j \frac{\arg[A_{qp}(f)/A_{Qp}(f)]}{4fc^{-1}d}\right] \quad (11)$$

for each element $A_{qp}(f)$ (where q=1, ... and M is the number of sensors observing mixed signals) of the basis vector $A_p(f)$ (where p is a natural number). Here, exp is Napier's number, arg[·] is an argument, f is the frequency, j is an imaginary unit, c is signal transmission speed, Q is a reference value selected from the natural numbers less than or equal to M, and "d" is a real number. As a result of this normalization, the normalized basis vectors form clusters that are dependent only on the positions of signal sources in a given model which is an approximation of a convolutive mixture of signals originated from the multiple signal sources. Consequently, separated signals including a target signal can be selected by using the magnitude of variance of clusters as the indicator as described above. The normalization does not require precise information about the positions of sensors.

The real number "d" in the above described Equation (11) is preferably the maximum distance $d_{max}$ between a reference sensor Q and another sensor because this typically improves the accuracy of clustering. The reason will be detailed later.

In the second aspect of the present invention, the target signal selecting section selects a cluster that yields the minimum variance and selects separated signals corresponding to the selected cluster as the selected signals including a target signal. Thus, the signal that has the smallest discrepancy from the model (for example the signal nearest a sensor) can be selected as the target signal.

In a preferable third aspect of the present invention, first a frequency domain transforming section transforms mixed signals observed by multiple sensors into mixed signals in the frequency domain. Then, a vector normalizing section normalizes a mixed-signal vector consisting of the frequency-domain mixed signals to obtain a normalized vector. Then, a clustering section clusters the normalized vectors to generate clusters. Then, a separated signal generating section extracts a element of a mixed-signal vector corresponding to the time-frequency of the normalized vector belonging to the k-th cluster and generates a separated signal vector having the element as its k-th element.

In the third aspect of the present invention, mixed signals observed by all sensors are normalized and clustered, and information about each cluster is used to generate a separated signal vector. This means that the separated signals are extracted by using information about all sensors at a time. This processing does not need precise information about the positions of sensors. Thus, according to the third aspect of the present invention, signal separation can be performed by using information obtained from all of the observed signals in a simple and efficient manner without needing precise information about the positions of sensors.

In the third aspect of the present invention, the vector normalizing section preferably performs normalization that eliminates frequency dependence from a mixed-signal vector consisting of the frequency-domain mixed signals. More preferably, the normalization that eliminates frequency dependence from a mixed-signal vector has a normalization of the argument of each element of the basis vector by using one particular element of the mixed-signal vector as the reference and a division of the argument of each element by a value proportional to the frequency. More preferably, the normalization that eliminates frequency dependence from the mixed signal vector is performed by calculating

[Formula 12]

$$X'_q(f, \tau) = |X_q(f, \tau)| \exp\left[j \frac{\arg[X_q(f, \tau)/X_Q(f, \tau)]}{4fc^{-1}d}\right] \quad (12)$$

for each element $X_q(f, \tau)$ (where q=1, ..., M and M is the number of sensors observing mixed signals) of the mixed-signal vector. Here, exp is Napier's number, arg[·] is an argument, j is an imaginary number, c is signal transmission speed, Q is a value selected from the natural numbers less than or equal to Q, d is a real number, f is a frequency, and $\tau$ is discrete time. Thus, frequency dependence can be eliminated. Consequently, clusters dependent on the positions of signal sources can be formed. It should be noted that this normalization does not require precise information about the positions of sensors.

The real number "d" in the above described Equation (12) is preferably the maximum distance $d_{max}$ between the sensor corresponding to element $X_Q(f, \tau)$ and another sensor because the precision of clustering is typically improved by this. The reason will be detailed later.

In the third aspect of the present invention, the vector normalizing section preferably performs normalization that eliminates frequency dependence from a mixed-signal vector and normalization that normalizes its norm to a predetermined value. This simplifies clustering operations.

EFFECTS OF THE INVENTION

As has been described, according to the present invention, information obtained from signals observed by multiple sensors can be used in a simple and efficient manner to perform signal separation.

For example, according to the first aspect of the present invention, the permutation problem can be solved accurately without needing to obtain information about the precise sensor positions beforehand or to perform complicated operations. According to the second aspect of the present invention, a target signal can be extracted from mixed signals which are a mixture of signals originated from multiple sources (even if N>M), without information about the direction of the target signal. According to the third aspect of the present invention, information obtained from all signals observed can be used in a simple and efficient manner to perform signal separation (even if N>M), without needing precise information about sensor positions.

BRIEF DESCRIPTION OF THE DRAWINGS

FIG. 3 illustrates a block diagram of the signal separating apparatus according to the first embodiment;

FIG. 5 is a flowchart outlining a whole process performed in the signal separating apparatus according to the first embodiment;

FIG. 11 is a flowchart outlining a whole process performed in the signal separating apparatus according to the second embodiment;

FIG. 25 is a block diagram illustrating a signal separating apparatus according to a fourth embodiment;

DESCRIPTION OF SYMBOLS 1, 10, 200, 1001, 1200, 1300, 2001: Signal separating apparatus

BEST MODES FOR CARRYING OUT THE INVENTION

Embodiments of the present invention will be described below with reference to the accompanying drawings.

[Principles]

The principles of the present invention will be described first.

Figure 1:
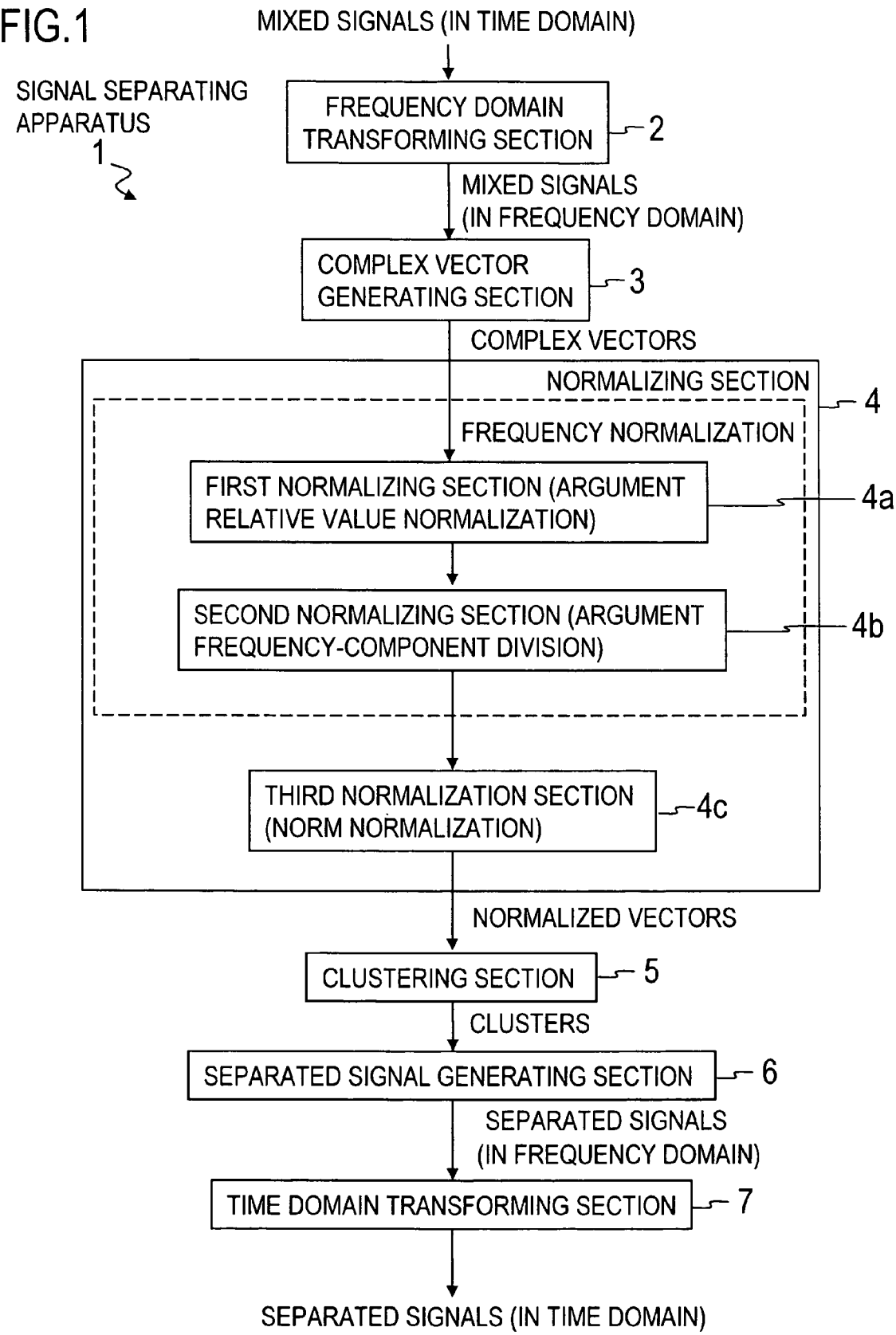
FIG. 1 is a block diagram illustrating a functional configuration of a signal separating apparatus including the principles of the present invention.

FIG. 1 is a block diagram illustrating a functional configuration of a signal separating apparatus 1 incorporating principles of the present invention. The signal separating apparatus 1 may be configured on a computer of well-known von Neumann-type by causing the computer to execute a predetermined program as will be described later.

The signal separating apparatus 1 separates a mixture of source signals originated from multiple signal sources into the source signals. As shown in FIG. 1, the signal separating apparatus 1 has a frequency domain transforming section 2, a complex vector generating section 3, a normalizing section 4, and a clustering section 5. The normalizing section 4 includes a first normalizing section 4a which normalizes the argument of each element of a complex vector by using one particular element of that complex vector as the reference, a second normalizing section 4b which divides the argument of each element normalized by the first normalizing section 4a by a value proportional to a frequency, and a third normalizing section 4c which normalizes the norm of a vector consisting of the elements normalized by the second normalizing section 4b to a predetermined value. The first and second normalizing sections 4a and 4b eliminate the frequency dependence of complex vectors (frequency normalization).

When signal separation is performed by the signal separating apparatus 1, mixed signals (signals in the time domain) observed by multiple sensors are first inputted in the frequency domain transforming section 2. The frequency domain transforming section 2 uses transformation such as the Short-Time discrete Fourier Transformation (STFT) to transform the mixed signals (signals in the time domain) observed by the multiple sensors into mixed signals in the frequency domain. Then, the complex vector generating section 3 uses the mixed signals in the frequency domain to generate a complex vector consisting of complex-number elements. The normalizing section 4 then normalizes the complex vector to generate a normalized vector excluding the frequency dependence of the complex vector.

In the normalization in the example in FIG. 1, the first normalizing section 4a first normalizes the argument of each element of a complex vector at each time-frequency by using one particular element of that complex vector as the reference. As a result, the argument of each element of the complex vector will depend only on the relative position of the signal source with respect to sensors and on the frequency of the signal source without depending on the phase and amplitude of the source signal (details will be described later). Then, the second normalizing section 4b divides the argument of each element normalized by the first normalizing section 4a by a value proportional to the frequency. As a result, the frequency dependence of the elements of each complex vector is eliminated and the complex vector is normalized to a vector that is dependent only on the relative position of each signal source with respect to each sensor. Then, the third normalizing section 4c normalizes the norm of the vector consisting of the elements normalized by the second normalizing section 4b to a predetermined number.

Then, the clustering section 5 clusters the vectors thus normalized into clusters. These clusters are dependent only on the relative positions of the signal sources with respect to the sensors. The separated signal generating section 6 uses the clusters to perform any of various types of signal separation to generate separated signals in the frequency domain. Finally, time domain transforming section transforms the separated signals in the frequency domain into separated signal in the time domain.

As has been described, the generation of the clusters does not require obtaining precise information about the positions of the sensors beforehand. Furthermore, information about signals observed at all sensors is used for generating the clusters. That is, according to the present invention, information obtained from signals observed by multiple sensors can be used in a simple and efficient manner to perform signal separation.

It is possible to generate clusters that are dependent only on the relative positions of signal sources with respect to sensors by clustering with some additional arrangements without normalizing the norm. However, in order to simplify clustering, it is preferable to normalize the norm by the third normalizing section 4c.

Embodiments of the present invention will be described below.

First Embodiment (Example of the First Aspect of the Present Invention)

The first embodiment of the present invention will be described.

The first embodiment accurately solves the permutation problem in accordance with the principles described above, without needing to obtain precise information about sensor positions beforehand or to perform complicated operations. It should be noted that "basis vectors" described later correspond to the "complex vectors" mentioned above.

<Hardware Configuration>

Figure 2:
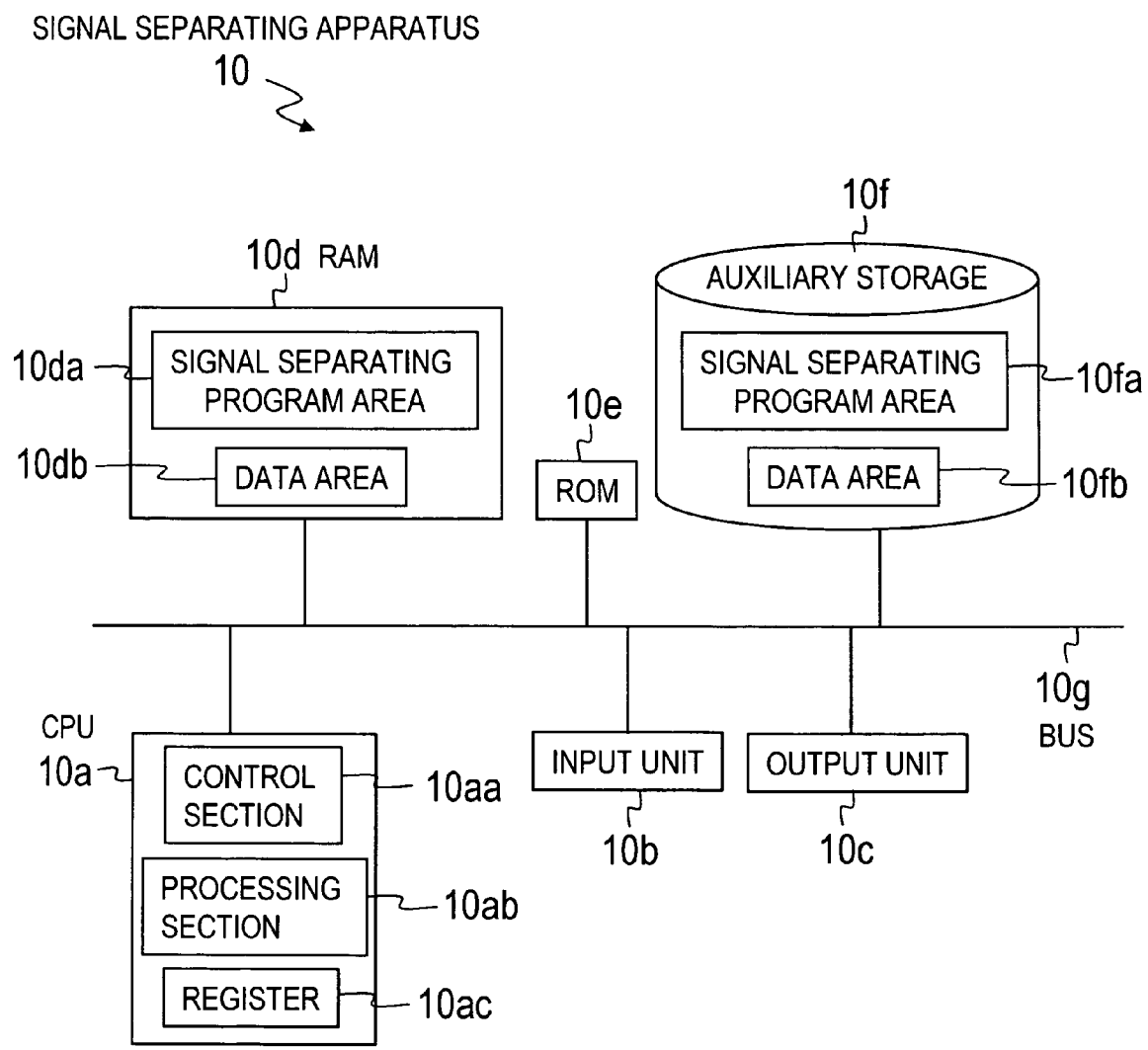
FIG. 2 is a block diagram illustrating a hardware configuration of a signal separating apparatus according to a first embodiment.

FIG. 2 is a block diagram showing a hardware configuration of a signal separating apparatus 10 according to the first embodiment.

As shown in FIG. 2, the signal separating apparatus 10 in this example includes a CPU (Central Processing Unit) 10a, an input unit 10b, an output unit 10c, an auxiliary storage device 10f, a RAM (Random Access Memory) 10d, a ROM (Read Only Memory) 10e, and a bus 10g.

The CPU 10a in this example includes a control section 10aa, a processing section 10ab, and a register 10ac and performs various operations in accordance with programs read in the register 10ac. The input unit 10b in this example may be an input port, keyboard, or mouse through which data is inputted; the output unit 10c may be an output port or display through which data is outputted. The auxiliary storage 10f, which may be a hard disk, MO (Magneto-Optical disc), or semiconductor memory, has a signal separating program area 10f a which stores a signal separating program for executing signal separation of the first embodiment and a data area 10fb which stores various kinds of data such as time-domain mixed-signals observed by sensors. The RAM 10d, which may be an SRAM (Static Random Access Memory), or DRAM (Dynamic Random Access Memory), has a signal separating program area 10da in which the signal separating program is written and a data area 10db in which various kinds of data are written. The bus 10g in this example interconnects the CPU 10a, input unit 10b, output unit 10c, auxiliary storage device 10f, RAM 10d, and ROM 10e in such a manner that they can communicate with one another.

<Cooperation Between Hardware and Software>

The CPU 10a in this example writes the signal separating program stored in the signal separating program area 10f a in the auxiliary storage device 10f into the signal separating program area 10db in the RAM 10d in accordance with a read OS (Operating System) program. Similarly, the CPU 10a writes various kinds of data such as time-domain mixed-signals stored in the data area 10fb in the auxiliary storage device 10f into the data area 10db in the RAM 10d. The CPU 10a also stores in the register 10ac the addresses on the RAM 10d at which the signal separating program and the data are written. The control section 10aa in the CPU 10a sequentially reads the addresses stored in the register 10ac, reads the program and data from the areas on the RAM 10d indicated by the read addresses, causes the processing section 10ab to sequentially execute operations described in the program, and stores the results of the operations in the register 10ac.

Figure 4A:
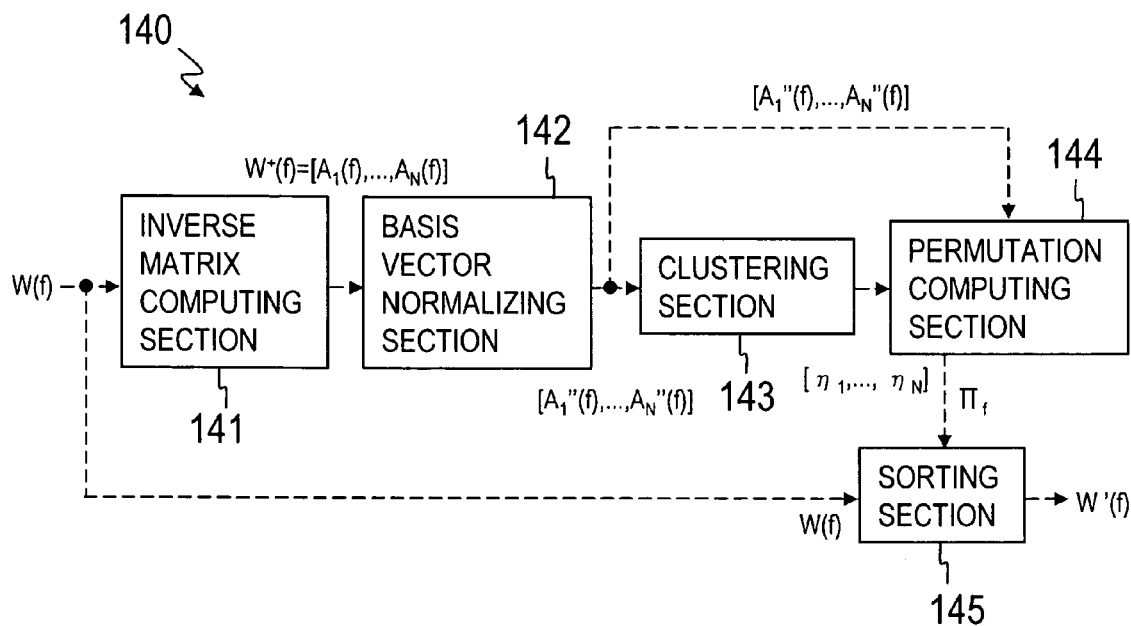
FIG. 4A is a block diagram illustrating details of a permutation problem solving section shown in FIG. 3.
Figure 4B:
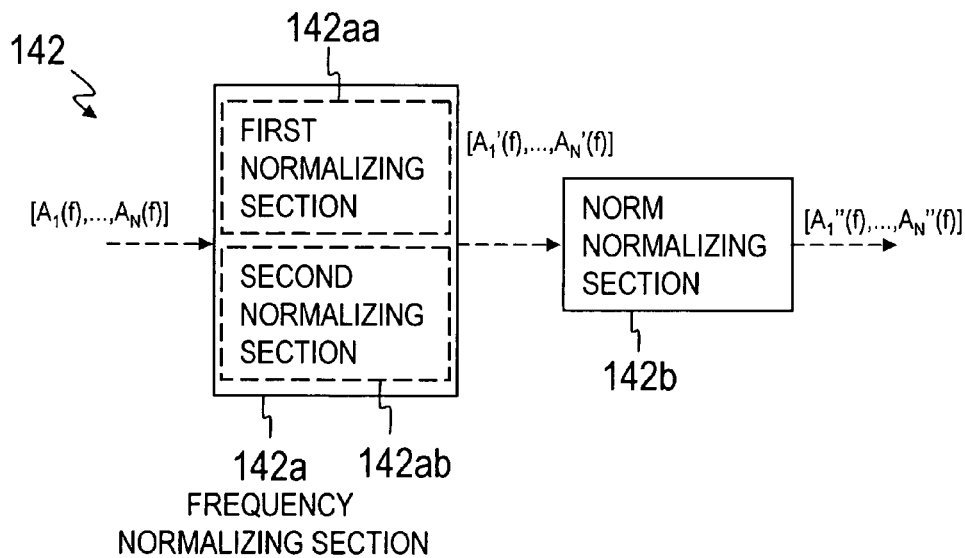
FIG. 4B is a block diagram illustrating details of a basis vector normalizing section shown in FIG. 4A.

FIG. 3 is a block diagram showing a signal separating apparatus 10 configured by the signal separating program being read by the CPU 10a. FIG. 4A is a block diagram illustrating details of the permutation problem solving section 140 shown in FIG. 3; and FIG. 4B is a block diagram illustrating details of the basis vector normalizing section 142 shown in FIG. 4A. As shown in FIG. 3, the signal separating apparatus 10 includes a memory 100, a frequency domain transforming section 120, a separation matrix computing section 130, a permutation problem solving section 140, a separated signal generating section 150, a time domain transforming section 160, and a control section 170. The permutation problem solving section 140 in this example has an inverse matrix computing section 141 (which corresponds to the "complex vector generating section"), a basis vector normalizing section 142 (which corresponds to the "normalizing section"), a clustering section 143, a permutation computing section 144, and a sorting section 145. The basis vector normalizing section 142 has a frequency normalizing section 142a and a norm normalizing section 142b. The frequency normalizing section 142a includes a first normalizing section 142aa and a second normalizing section 142ab. The control section 170 has a temporary memory 171.

The memory 100 and the temporary memory 171 correspond to the register 10ab, the data area 10fb in the auxiliary storage device 10f or the data area 10db in the RAM 10d. The frequency domain transforming section 120, the separation matrix computing section 130, the permutation problem solving section 140, the separated signal generating section 150, the time domain transforming section 160, and the control section 170 are configured by the OS program and the signal separating program read by the CPU 10a.

The dashed arrows in FIGS. 3 and 4 represent theoretical information flows whereas the solid arrows represent actual data flows. Arrows representing data flows to and from the control section 170 are omitted from FIGS. 3 and 4. Arrows representing actual data flows are also omitted from FIG. 4.

<Processing>

Processing performed in the signal separating apparatus 10 according to the first embodiment will be described below. In the following description, a situation will be dealt with in which N source signals are mixed and observed by M sensors. It is assumed that mixed signals $X_q(t)$ (q=1, . . . , M) in the time domain observed by sensors are stored in memory area 101 in the memory 100 and parameters, namely, the signal transmission speed c, a reference value Q (a suffix representing one reference sensor selected from among M sensors) chosen from natural numbers smaller than or equal to M, and a real number "d", are stored in a memory area 107 in preprocessing.

FIG. 5 is a flowchart outlining a whole process performed in the signal separating apparatus 10 according to the first embodiment. With reference to FIG. 5, processing performed in the signal separating apparatus in this embodiment 10 will be described below.

[Processing by frequency domain transforming section 120]

First, the frequency domain transforming section 120 reads mixed signals $X_q(t)$ in the time domain from storage area 101 of the memory 100, transforms them into time-series signals at each frequency (which are referred to as "frequency-domain mixed signals") $X_q(f, \tau)$ (q=1, . . . , M) by using a transform such as Short-Time discrete Fourier Transformation, and stores them in memory area 102 of the memory 100 (step S1).

[Processing by the Separation Matrix Computing Section 130]

Then, the separation matrix computing section 130 reads the frequency-domain mixed signals $X_q(f, \tau)$ from memory area 102 of the memory 100. After reading the frequency-domain mixed signals $X_q(f, \tau)$, the separation matrix computing section 130 uses a mixed-signal vector $X(f, \tau)=[X_1(f, \tau), \ldots, X_M(f, \tau)]^T$ consisting of those signals to perform Independent Component Analysis (ICA) to calculate a first separation matrix W(f) and separated signal vectors $Y(f, \tau)=[Y_1(f,\tau), \ldots, Y_N(f,\tau)]^T$. The calculated first separation matrix W(f) is stored in memory area 103 in the memory 100 (step S2).

Here, the first separation matrix W(f) calculated by the separation matrix computing section 130 includes ambiguity of the order. Therefore, the permutation problem solving section 140 resolves the ambiguity of the order of the first separation matrix W(f) to obtain a matrix separation signal W'(f).

[Processing by the Permutation Problem Solving Section 140]

First, the inverse matrix computing section 141 reads the first separation matrix W(f) from memory area 103 of the memory 100, calculates the Moore-Penrose generalized inverse matrix $W^+(f)=[A_1(f), \ldots, A_N(f)]$ (which is identical to the inverse matrix $W^{-1}(f)$ if M=N) of the matrix, and stores the basis vectors $A_p(f)=[A_{1p}(f), \ldots, A_{Mp}(f)]^T$ that constitute the Moore-Penrose generalized inverse matrix in memory area 104 (step S3).

Then, the basis vector normalizing section 142 reads the basis vectors $A_p(f)$ (p=1, ..., N, f=0, $f_s/L$, ..., $f_s(L-1)/L$) from memory area 104 of memory 100, normalizes them into normalized basis vectors $A_p''(f)$, and stores them in memory area 106 of the memory 100 (step S4). It should be noted that the basis vector normalizing section 142 normalizes all basis vectors $A_p(f)$ (p=1, ..., N, f=0, $f_s/L$, ..., $f_s(L-1)1L$) into normalized basis vectors $A_p''(f)$ that are not dependent on frequencies but only on the positions of the signal sources. Consequently, when they are clustered, each of the clusters will correspond to a signal source. If the normalization is not properly performed, clusters are not generated. The normalization in this embodiment consists of two steps: frequency normalization and norm normalization. The frequency normalization is performed by the frequency normalizing section 142a (FIG. 4B) to normalize basis vectors into frequency-normalized vectors that are independent of frequency. The norm normalization is performed by the norm normalizing section 142b to normalize the frequency-normalized vectors into normalized basis vectors whose norm has a predetermined value (1 in this example). These normalization operations will be detailed later.

Then, the clustering section 143 reads the normalized basis vectors $A_p''(f)$ from memory area 106 of the memory 100, clusters the normalized basis vectors $A_p''(f)$ into N clusters $C_k$ (k=1, ..., N), and stores information identifying the clusters $C_k$ and their centroids (center vector) $\eta_k$ in memory areas 108 and 109 of the memory 100, respectively (step S5). The clustering is performed so that the total sum U of sums of squares $U_k$ of the elements (normalized basis vectors $A_v''(f)$) of each cluster $C_k$ and the centroid $\eta_k$ of the cluster $C_k$

[Formula 13]

$$U = \sum_{k=1}^{M} U_k$$

$$U_k = \sum_{A_v''} (f) \in C_k \|A_v''(f) - \eta_k\|^2$$

is minimized. The minimization can be performed effectively by using the k-means clustering described in Non-patent literature 6, for example. The centroid $\eta_k$ of each cluster $C_k$ can be calculated by

[Formula 14]

$$\eta_k = \frac{\sum_{A_v''(f) \in C_k} A_v''(f)/|C_k|}{\left\| \sum_{A_v''(f) \in C_k} A_v''(f)/|C_k| \right\|}$$

where $|C_k|$ is the number of elements (normalized basis vectors $A_v''(f)$) of the cluster $C_k$. The distance used here is the square of the Euclidean distance, it may be the Minkowski distance, which is the generalized square of the Euclidean distance. The reason why the normalized basis vectors $A_p''(f)$ form clusters will be described later.

Then, the permutation computing section 144 reads the normalized basis vectors $A_p''(f)$ from memory area 106 of the memory 100 and the centroids $\eta_k$ of clusters $C_k$ from memory area 109. The permutation computing section 144 then uses them to calculate a permutation $\Pi_f$ (a bijective mapping function from $\{1, 2, \ldots, N\}$ to $\{1, 2, \ldots, N\}$) used for rearranging the elements of the first separation matrix W(f) for each frequency f and stores it in memory area 110 of the memory 100 (step S6). The permutation $\Pi_f$ is determined by

[Formula 15]

$$\Pi_f = \arg\min_{\Pi} \sum_{k=1}^{N} \|\eta_k - A_{\Pi(k)}''(f)\|^2 \qquad (13)$$

where "argmin$_\Pi$" represents $\Pi$ that minimizes "·". The permutation $\Pi_f$ can be determined according to Equation (13) by calculating

[Formula 16]

$$\sum_{k=1}^{N} \|\eta_k - A_{\Pi(k)}''(f)\|^2$$

for all possible permutations $\Pi$ (N! permutations), for example, and by determining $\Pi$ corresponding to its minimum value as the permutation $\Pi_f$. An example of this procedure is given below.

Example 1 of Determination of Permutation $\Pi_f$

It is assumed here that the number N of signal sources is 3 and the squares of the distances between the normalized basis vectors $A_1''(f)$, $A_2''(f)$, and $A_3''(f)$ at an frequency f and the centroids $\eta_1$, $\eta_2$, and $\eta_3$ are as shown in the following table.

TABLE 1

|  | $A_1''(f)$ | $A_2''(f)$ | $A_3''(f)$ |
|---|---|---|---|
| $\eta_1$ | 0.85 | 0.1 | 0.7 |
| $\eta_2$ | 0.9 | 0.6 | 0.2 |
| $\eta_3$ | 0.15 | 0.8 | 0.95 |

Here, the permutation obtained according to Equation (13) is $\Pi_f: [1,2,3] \to [2,3,1]$ because the combinations $\|\eta_1 - A_{\Pi(1)}''(f)\|^2 = \|\eta_1 - A_2''(f)\|^2 = 0.1$ $\|\eta_2 - A_{\Pi(2)}''(f)\|^2 = \|\eta_2 - A_3''(f)\|^2 = 0.2$ $\|\eta_3 - A_{\Pi(3)}''(f)\|^2 = \|\eta_3 - A_1''(f)\|^2 = 0.15$ minimize

[Formula 17]

$$\sum_{k=1}^{3} \|\eta_k - A_{\Pi(k)}''(f)\|^2$$

(End of the Description of Example 1 of Determination of Permutation $\Pi_f$)

However, this procedure will be unrealistic if N is large. Therefore, an approximation method may be used in which $A_{\Pi(k)}''(f)$ that minimize $\|\eta_k - A_{\Pi(k)}''(f)\|^2$ are selected one by one in such a manner that there are no overlaps and a permutation that transfers the selected $A_{\Pi(k)}''(f)$ to the normalized basis vector $A_k''(f)$ is chosen as the permutation $\Pi_f$. A procedure for determining the permutation $\Pi_f$ using this approximation method under the same conditions given in Example 1 of determination of permutation $\Pi_f$ will be described below.

Example 2 of Determination of Permutation $\Pi_f$

First, because the minimum square of distance in Table 1 is 0.1 (the square of the distance between the normalized basis vector $A_2''(f)$ and centroid $\eta_1$), $\Pi(1)=2$ is chosen. Then, the row and column relating to the normalized basis vector $A_2''(f)$ and centroid $\eta_1$ are deleted as shown below.

TABLE 2

|  | $A_1''(f)$ | $A_2''(f)$ | $A_3''(f)$ |
|---|---|---|---|
| $\eta_1$ |  |  |  |
| $\eta_2$ | 0.9 |  | 0.2 |
| $\eta_3$ | 0.15 |  | 0.95 |

Because the minimum square of distance in Table 2 is 0.15 (the square of the distance between the normalized basis vector $A_1''(f)$ and centroid $\eta_3$), $\Pi(3)=1$ is chosen. Finally, the remainder, 3 is assigned to $\Pi(2)$. (End of the description of Example 2 of determination of permutation $\Pi_f$)

Then, the sorting section 145 reads the first separation matrix W(f) from memory area 103 of the memory 100 and the permutation $\Pi_f$ from memory area 110. The sorting section 145 rearranges the rows of the first separation matrix W(f) in accordance with the permutation $\Pi_f$ to generate a second separation matrix W'(f) and stores it in memory 111 of the memory 100 (step S7). The rearrangement of the first separation matrix W(f) according to the permutation $\Pi_f$ means that rearrangement equivalent to the rearrangement of the elements $A_{\Pi(k)}''(f)$ to the elements $A_k''(f)$ in the Moore-Penrose generalized inverse $W^+(f)$ described above is performed on the first separation matrix W(f). That is, the first separation matrix W(f) is rearranged in such a manner that the $\Pi_f(k)$-th row of the first separation matrix W(f) becomes the k-th row of the second separation matrix W'(f). In the Examples 1 and 2 of determination of permutation $\Pi_f$, the second, third, and first rows of the first separation matrix W(f) become the first, second, and third rows, respectively, of the second separation matrix W'(f).

[Processing by the Separated Signal Generating Section 150]

Then, the separated signal generating section 150 reads the mixed signals $X_q(f, \tau)$ in the frequency domain from memory 102 of the memory 100 and the second separation matrix W'(f) from memory area 111. The separated signal generating section 150 then uses the mixed-signal vector $X(f, \tau) = [X_1(f, \tau), \ldots, X_M(f, \tau)]^T$ consisting of the mixed signals $X_q(f, \tau)$ in the frequency domain and the second separation matrix W'(f) to calculate a separated signal vector $$Y(f, \tau) = W'(f) \cdot X(f, \tau)$$

and stores the frequency-domain signals $Y_p(f, \tau)$ which are the elements of the separated signal vector (which are referred to as "frequency-domain mixed signals) in memory area 112 of the memory 100 (step S8).

[Processing by the Time Domain Transforming Section 160]

Finally, the time domain transforming section 160 reads the frequency-domain separated signals $Y_p(f, \tau)$ from memory 112 of the memory 100, transforms them into separated signals $y_p(t)$ in the time domain one by one for each suffix p (for each $Y_p(f, \tau)$) by using transformation such as short-time inverse Fourier transformation, and stores the separated signals $y_p(t)$ in the time domain in memory area 113 of the memory 110 (step S9).

[Details of Normalization (Details of Step S4)]

Details of the above-mentioned normalization (step S4) performed by the basis vector normalizing section 142 will be described below.

Figure 6:
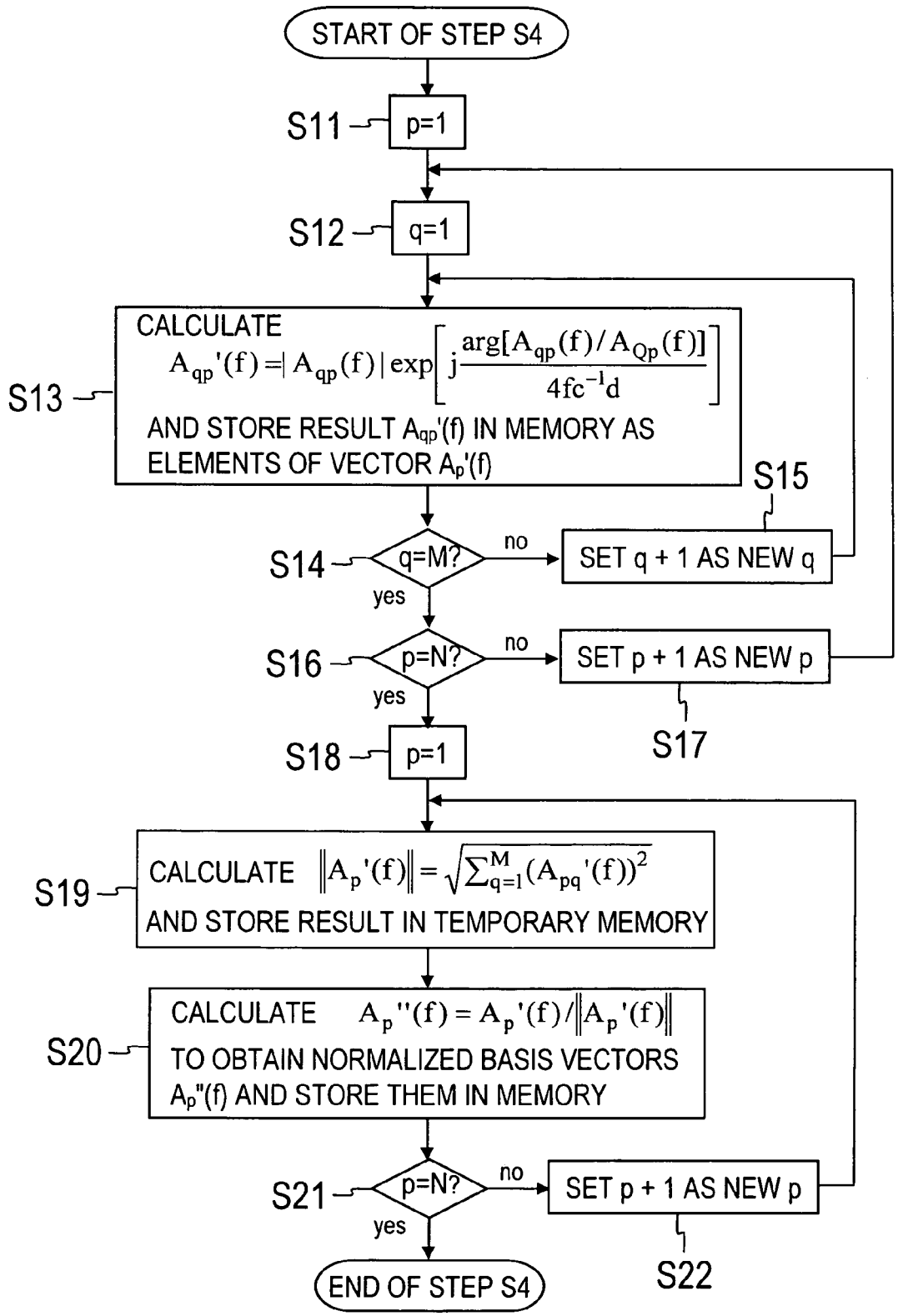
FIG. 6 is a flowchart for describing details of a normalization process according to the first embodiment.

FIG. 6 is a flowchart illustrating details of the normalization process.

First, the control section 170 (FIG. 3) assign 1 to parameter p and stores it in the temporary memory 171 (step S11). The control section 170 also assigns 1 to parameter q and stores it in the temporary memory 171 (step S12). Then, the frequency normalizing section 142a (FIG. 4) reads the parameters d, c, and Q described above from memory area 107 of the memory 100, reads parameters p and q from the temporary memory 171, and, for the elements $A_{qp}(f)$ of the basis vector $A_p(f)$, calculates

[Formula 18]

$$A'_{qp}(f) = |A_{qp}(f)| \exp\left[j \frac{\arg[A_{qp}(f)/A_{Qp}(f)]}{4fc^{-1}d}\right] \quad (14)$$

then, stores the calculated $A_{qp}'(f)$ in memory area 105 of the memory 100 as the elements $A_{qp}'(f)$ of the frequency-normalized vector $A_p'(f)$ (step S13). Here, $\arg[\cdot]$ represents the argument of · and j is the imaginary unit.

In particular, the first normalizing section 142aa of the frequency normalizing section 142a first normalizes the argument of each element $A_{qp}(f)$ of a basis vector $A_p(f)$ on the basis of a particular element $A_{Qp}(f)$ of the basis vector $A_p(f)$ by

[Formula 19]

$$A_{qp}'''(f) = |A_{qp}(f)| \exp\{j \cdot \arg[A_{qp}(f)/A_{Qp}(f)]\} \quad (15)$$

Then, the second normalizing section 142ab of the frequency normalizing section 142a divides the argument of each of the elements $A_{qp}'''(f)$ normalized by the first normalizing section 142aa by a value $4fc^{-1}d$ proportional to the frequency f as

[Formula 20]

$$A_{qp}'(f) = |A_{qp}'''(f)| \exp\left[j \frac{\arg[A_{qp}'''(f)]}{4fc^{-1}d}\right] \quad (16)$$

Then, the control section 170 determines whether the value of parameter q stored in the temporary memory 171 satisfies q=M (step S14). If not q=M, the control section 170 sets a calculation result q+1 as a new value of the parameter q, stores it in the temporary memory 171 (step S15), and returns to step S13. On the other hand, if q=M, then the control section 170 determines whether p=N (step S16).

If not p=N, then the control section 170 sets a calculation result p+1 as a new value of the parameter p, stores it in the temporary memory 171 (step S17), and then returns to step S12. On the other hand, if p=N, the control section 170 assigns 1 to the parameter p, and stores it in the temporary memory 171 (step S18). Then the norm normalizing section 142b starts processing. The norm normalizing section 142b first reads the elements $A_{qp}'(f)$ of the frequency-normalized vector $A_p'(f)$ from memory area 105 of the memory 100, calculates

[Formula 21]

$$\|A_p'(f)\| = \sqrt{\sum_{q=1}^{M}(A_{pq}'(f))^2} \qquad (17)$$

to obtain the norm $\|A_p'(f)\|$ of the frequency-normalized vector $A_p'(f)$, and stores the frequency-normalized vector $A_p'(f)$ and its norm $\|A_p'(f)\|$ in the temporary memory 171 (step S19).

Then, the norm normalizing section 142b reads the frequency-normalized vector $A_p'(f)$ and its norm $\|A_p'(f)\|$ from the temporary memory 171, calculates $$A_p''(f) = A_p'(f)/\|A_p'(f)\| \qquad (18)$$

to obtain a normalized basis vector $A_p''(f)$, and stores it in memory area 106 of the memory 100 (step S20).

Then, the control section 170 determines whether the value of parameter p stored in the temporary memory 171 satisfies p=N (step S21). If not p=N, the control section 170 sets a calculation result p+1 as a new value of the parameter p, stores it in the temporary memory 171 (step S22), and then returns to step S19. On the other hand, if p=N, the control section 170 terminates the processing at step S4.

The normalized basis vectors $A_p''(f)$ thus generated are not dependent on frequency and dependent only on the positions of the signal sources. Consequently, the normalized basis vectors $A_p''(f)$ forms clusters. The reason will be described below.

[Reason Whey Normalized Basis Vectors $A_p''(f)$ Form Clusters]

Each of the elements $A_{qp}(f)$ of a basis vector $A_p(f)$ is proportional to the frequency response $H_{qk}$ from the signal source k corresponding to a source signal p to a sensor q (that is, it is equal to the frequency response multiplied by a complex scalar). These complex scalars change with discrete time whereas the relative value between the complex scalar corresponding to the source signal p and sensor q and the complex scalar corresponding to the source signal p and sensor Q does not change with changing discrete time (provided that the frequency f is the same). That is, if the frequency f is the same, the relative value between the argument of the complex scalar corresponding to the source signal p and sensor q and the argument of the complex scalar corresponding to the source signal p and sensor Q is constant.

As described above, the first normalizing section 142aa of the frequency normalizing section 142a normalizes the argument of each element $A_{qp}(F)$ of a basis vector $A_p(f)$ on the basis of one particular element $A_{Qp}(f)$ of that basis vector $A_p(f)$. Thus, uncertainty due to the phase of the complex scalars mentioned above is eliminated and the argument of the element $A_{qp}(f)$ of the basis vector $A_p(f)$ corresponding to the source signal p and sensor q is represented as a value relative to the argument of the element $A_{Qp}(F)$ of the basis vector $A_p(f)$ corresponding to the source signal p and sensor Q (corresponding to the reference value Q). The relative value corresponding to the argument of the element $A_{Qp}(f)$ is represented as 0. The frequency response from a signal source k to a sensor q is approximated using a direct-wave model without reflections and reverberations. Then the argument normalized by the first normalizing section 142aa is proportional to both of the arrival time difference of waves from the signal source k to the sensor and the frequency f. The arrival time difference here is the difference between the time taken for a wave from the signal source k to reach the sensor q and the time taken for the wave to reach the reference sensor Q.

As has been describe above, the second normalizing section 142ab divides the argument of each element $A_{qp}'''(f)$ normalized by the first normalizing section 142aa by a value proportional to the frequency f. Thus, the elements $A_{qp}'''(f)$ are normalized to elements $A_{qp}'(f)$ excluding dependence of their arguments on frequency. Consequently, according to the direct-wave model, each of the normalized elements $A_{qp}'(f)$ depends only on the arrival time difference between the times at which the wave from the signal source k reaches the sensors. The arrival time difference of the wave from the signal source k to the sensors depends only on the relative positions of the signal source k, sensor q, and reference sensor Q. Accordingly, the arguments of the elements $A_{qp}'(f)$ with the same signal source k, sensor q, and reference sensor Q are the same even if the frequency varies. Thus, the frequency-normalized vectors $A_p'(f)$ are not dependent on the frequency f but only on the positions of signal source k.

Therefore, by clustering the normalized basis vectors $A_p''(f)$ resulting from normalization of the norms of the frequency-normalized vectors $A_p'(f)$, clusters are generated, each of which corresponds to the same signal source. Although the direct-wave model is not exactly satisfied in a real environment because of reflections and reverberations, a sufficiently good approximation can be obtained as shown in experimental results which will be given later.

The reason why the normalized basis vectors $A_p''(f)$ forms clusters will be described below with respect to a model. The impulse response $h_{qk}(r)$ in Equation (1) described earlier is approximated using a direct-wave (near-field) mixture model and represented in the frequency domain as

[Formula 22]

$$H_{qk}(f) = \frac{1}{d_{qk}}\exp[-j2\pi f c^{-1}(d_{qk} - d_{Qk})] \qquad (19)$$

where $d_{qk}$ is the distance between a signal source k and a sensor q. The attenuation $1/d_{qk}$ is determined by the distance $d_{qk}$ and the delay $(d_{qk}-d_{Qk})/c$ is determined by the distance normalized at the position of the reference sensor Q.

If order ambiguity and scaling ambiguity in independent component analysis (ICA) are taken into consideration, the following relation holds between the basis vector $A_p(f)$ and the vector $H_k(f)$ consisting of frequency responses from the signal source k to the sensors.

$$A_p(f) = \epsilon_p \cdot H_k(f), A_{qp}(f) = \epsilon_p \cdot H_{qk}(f) \qquad (20)$$

where $\epsilon_p$ is a complex scalar value representing the ambiguity of the scaling. The possibility that suffixes k and p differ from each other represents the ambiguity of the order. From Equations (16), (18), (19), and (20),

[Formula 23]

$$A''_{qp}(f) = \frac{1}{d_{qk}D}\exp\left[-j\frac{\pi}{2}\frac{(d_{qk}-d_{Qk})}{d}\right], \quad D = \sqrt{\sum_{i=1}^{M}\frac{1}{d_{ik}^2}} \quad (21)$$

As can be seen from this equation, the elements $A''_{qp}(f)$ of the normalized basis vector $A''_p(f)$ are independent of the frequency f and dependent only on the positions of the signal sources k and sensors q. Therefore, clustering the normalized basis vectors $A''_p(f)$ generates clusters, each corresponding to the same signal source.

The same applies to a near-field mixture model in which signal attenuation is not taken into consideration. The convolutive mixture model represented by Equation (1) given earlier is approximated with a near-field mixture model in which attenuation is ignored and represented in the frequency domain as

[Formula 24]

$$H_{qk}(f) = \exp[-j2\pi f c^{-1}(d_{qk}-d_{Qk})] \quad (22)$$

From Equations (16), (18), (20), and (22), it follows that

[Formula 25]

$$A''_{qp}(f) = \frac{1}{\sqrt{M}}\exp\left[-j\frac{\pi}{2}\frac{(d_{qk}-d_{Qk})}{d}\right] \quad (23)$$

Again, the elements $A''_{qp}(f)$ of the normalized basis vector $A''_p(f)$ are independent of the frequency f and dependent only on the positions of the signal source k and sensor q.

Also, the same applies to a far-field mixture model as well as the near-field mixture model. The convolutive mixture model represented by Equation 1 mentioned above is approximated and represented in the frequency domain as

[Formula 26]

$$H_{qk}(f) = \exp[-j2\pi f c^{-1}\|SE_q - SE_Q\|\cos\theta_k^{qQ}] \quad (24)$$

Here, $SE_q$ and $SE_Q$ are vectors representing the positions of sensors q and Q, and $\theta_k^{qQ}$ is the angle between the straight line connecting sensors q and Q and the straight line connecting the center points of sensors q and Q and the signal source k. From Equations (16), (18), (20), and (24),

[Formula 27]

$$A''_{qp}(f) = \frac{1}{M}\exp\left[-j\frac{\pi}{2}\frac{\|SE_q - SE_Q\|\cos\theta_k^{qQ}}{d}\right] \quad (25)$$

Again, the elements $A''_{qp}(f)$ of the normalized basis vector $A''_p(f)$ are independent of the frequency f and dependent only on the positions of the signal source k and sensor q.

Preferably, the value of the parameter d is $d > d_{max}/2$ (where $d_{max}$ represents the maximum distance between the reference sensor Q corresponding to element $A_{Qp}(f)$ and another sensor) from Equation (21), more preferably, $d \geq d_{max}$, and more preferably, $d = d_{max}$. The reason will be described below.

FIGS. 7 and 8 are complex planes for illustrating the relation between an element $A''_{qp}(f)$ of a normalized basis vector and its argument $\arg[A''_{qp}(f)]$ at each value of parameter d. The horizontal axis in FIGS. 7 and 8 represents the real axis and the vertical axis represents the imaginary axis.

Figure 7A:
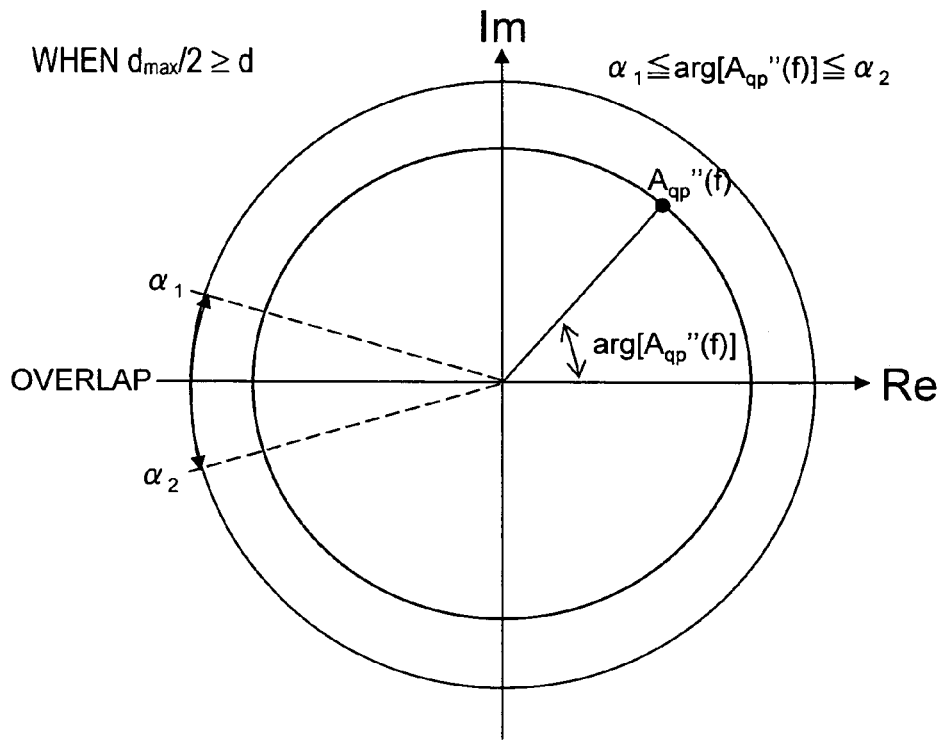
FIG. 7A is a complex plane used for illustrating the relation between an element $A_{qp}"(f)$ of a normalized basis vector for each value of parameter "d" and the element's argument $\arg[A_{qp}"(f)]$ when $d_{max}/2 \geq d$.

FIG. 7A is a complex plane in the case where $d_{max}/2 \geq d$. From the definition of $d_{max}$ given above, the absolute value of $d_{qk} - d_{Qk}$ for any q and k is less than or equal to $d_{max}$. Therefore, if $d_{max}/2 \geq d$, then $(\pi/2)\cdot(d_{qk}-d_{Qk})/d \leq -\pi$ and $(\pi/2)\cdot(d_{qk}-d_{Qk})/d \geq \pi$. Consequently, the arguments $\arg[A''_{qp}(f)]$ of $A''_{qp}(f)$ represented by Equation (21) can be distributed over the range beyond $2\pi$, $\alpha_1 \leq \arg[A''_{qp}(f)] \leq \alpha_2$ ($\alpha_1 \leq -\pi$ and $\alpha_2 >$). Accordingly, the arguments of elements $A''_{qp}(f)$ of different normalized basis vectors can match and consequently the different normalized basis vectors $A''_p(f)$ can be clustered into the same cluster in the clustering described above. Therefore, it is desirable that $d > d_{max}/2$. However, if there is not a sample of the normalized basis vector $A''_p(f)$ that falls in an argument overlapping range, no problem arises even if $d_{max}/2 > d$.

Figure 7B:
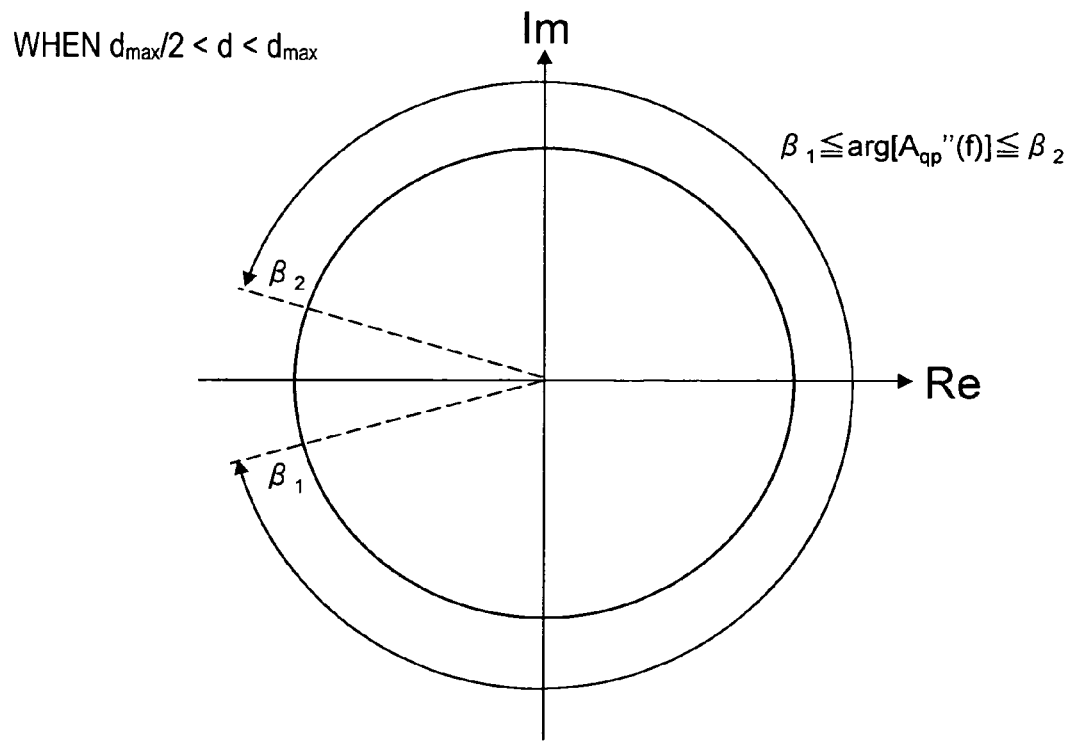
FIG. 7B is a complex plane used for illustrating the relation between an element $A_{qp}"(f)$ of a normalized basis vector for each value of parameter d and the element's argument $\arg[A_{qp}"(f)]$ when $d_{max}/2 < d < d_{max}$.

FIG. 7B shows a complex plane in the case where $d_{max}/2 < d < d_{max}$. In this case, the relations $-\pi < (\pi/2)\cdot(d_{qk}-d_{Qk})/d < -\pi/2$ and $\pi/2 < (\pi/2)\cdot(d_{qk}-d_{Qk})/d < \pi$ can hold. Consequently, the arguments $\arg[A''_{qp}(f)]$ of $A''_{qp}(f)$ represented by Equation (21) can be distributed over the range $\beta_1 \leq \arg[A''_{qp}(f)] \leq \beta_2$ ($-\pi < \beta_1 < -\pi/2$ and $\pi/2 < \beta_2 < \pi$). Therefore, in the ranges $-\pi < \arg[A''_{qp}(f)] < -\pi/2$ and $\pi/2 < \arg[A''_{qp}(f)] < \pi$, it is possible that the distance between different frequency-normalized vector elements does not monotonically increases with increasing difference between the arguments between the different frequency-normalized vector elements. This condition can degrade the accuracy of the clustering described above. Therefore, it desirable that $d \geq d_{max}$.

Figure 8A:
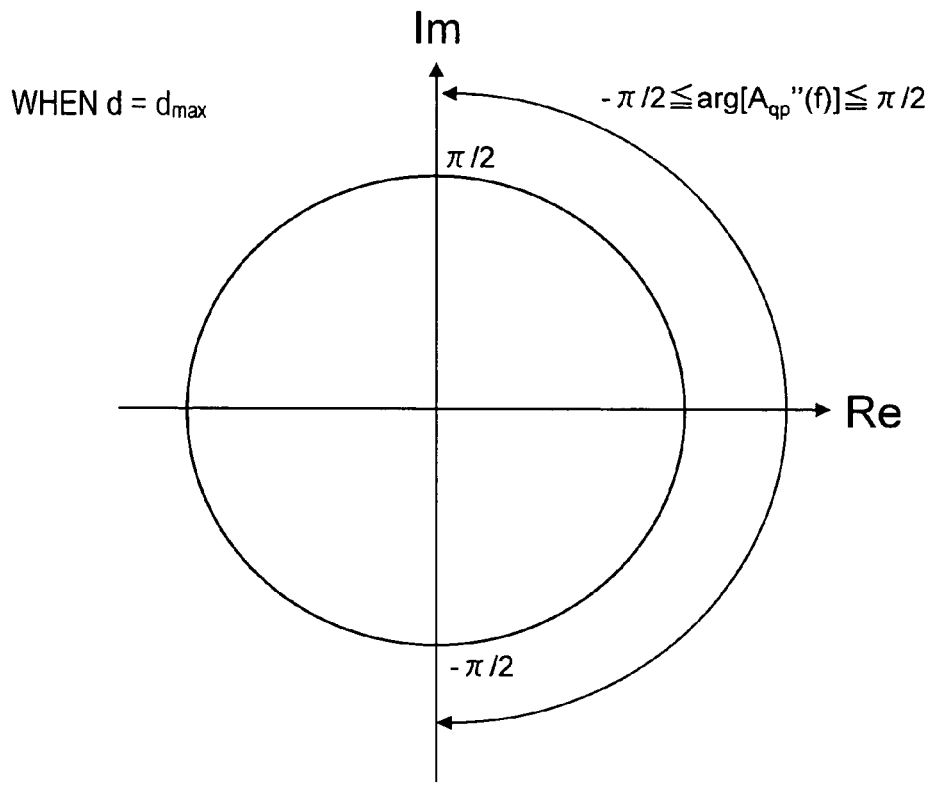
FIG. 8A is a complex plane used for illustrating the relation between an element $A_{qp}"(f)$ of a normalized basis vector for each value of parameter "d" and the element's argument $\arg[A_{qp}"(f)]$ when $d=d_{max}$.
Figure 8B:
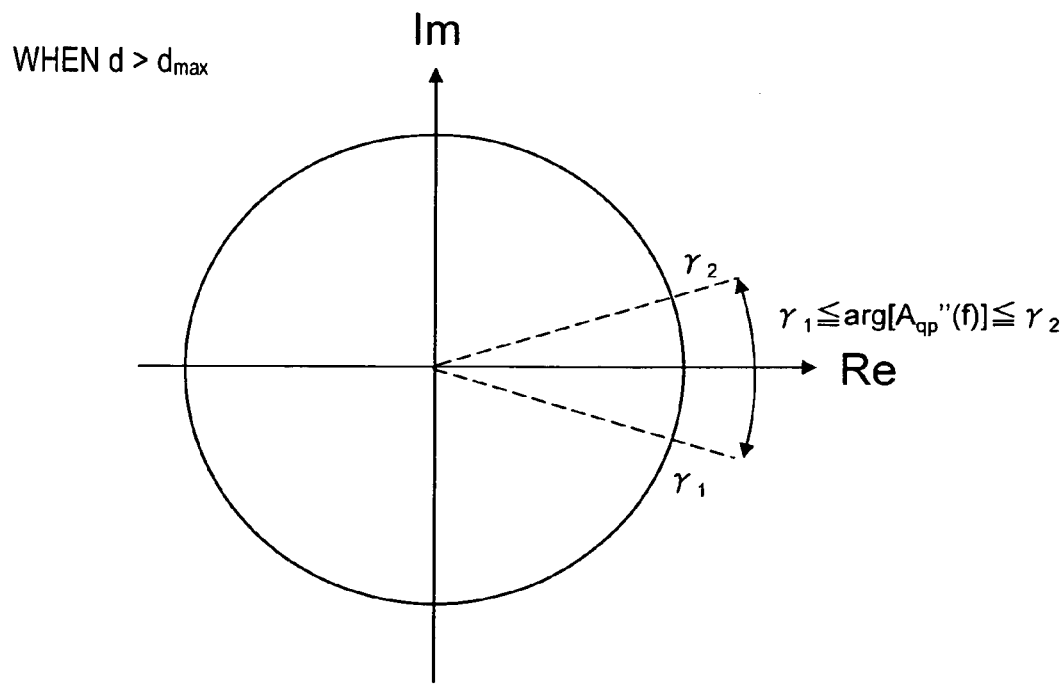
FIG. 8B is a complex plane used for illustrating the relation between an element $A_{qp}"(f)$ of a normalized basis vector for each value of parameter "d" and the element's argument $\arg[A_{qp}"(f)]$ when $d>d_{max}$.

FIG. 8A is a complex plane in the case where $d = d_{max}$. FIG. 8B is a complex plane in the case where $d > d_{max}$. If $d > d_{max}$, the relation $-\pi/2(\pi/2)\cdot(d_{qk}-d_{Qk})/d < 0$ and $0 < (\pi/2)\cdot(d_{qk}-d_{Qk})/d < \pi/2$ can hold. Consequently, the arguments $\arg[A''_{qp}(f)]$ of $A''_{qp}(f)$ represented by Equation (21) are distributed over the range $\gamma_1 \leq \arg[A''_{qp}(f)] \leq \gamma_2$ ($-\pi/2 < \gamma_1 < 0$ and $0 < \gamma_2 < \pi/2$) as shown in FIG. 8B. As d increases, the distribution range narrows and clusters are distributed more densely in the narrowed range. As a result, the accuracy of the clustering described above degrades.

In contrast, when $d = d_{max}$, the relations $-\pi/2 \leq (\pi/2)\cdot(d_{qk}-d_{Qk})/d < 0$ and $0 < (\pi/2)\cdot(d_{qk}-d_{Qk})/d < \pi/2$ can hold. Consequently, the arguments $\arg[A''_{qp}(f)]$ of $A''_{qp}(f)$ represented by Equation (21) are distributed over the range $-\pi/2 \leq \arg[A''_{qp}(f)] \leq \pi/2$ as shown in FIG. 8A. In this case the cluster can be distributed in a range as wide as possible while keeping the relation in which the distance between the frequency-normalized vector elements monotonically increases with increasing difference between the arguments of the elements. As a result, typically the accuracy of the clustering can be improved.

Second Embodiment (Example of the First Aspect of the Invention)

The second embodiment of the present invention will be described below.

In the first embodiment, the permutation problem has been solved by using information obtained from basis vectors. In the second embodiment, the permutation problem is solved more accurately by combining this information with information about envelopes of separated signals as described in Japanese Patent Application Laid-Open No. 2004-145172 and H. Sawada, R. Mukai, S. Araki, S. Makino, "A Robust and Precise Method for Solving the Permutation Problem of Frequency-Domain Blind Source Separation," IEEE Trans. Speech and Audio processing, Vol. 12, No. 5, pp. 530-538, September 2004 (hereinafter referred to as the "Reference literatures"). In these literatures, information about the directions of signal sources is used in stead of basis vectors.

The following description focuses on differences from the first embodiment and description of the same elements as those in the first embodiment will be omitted.

<Configuration>

Figure 9:
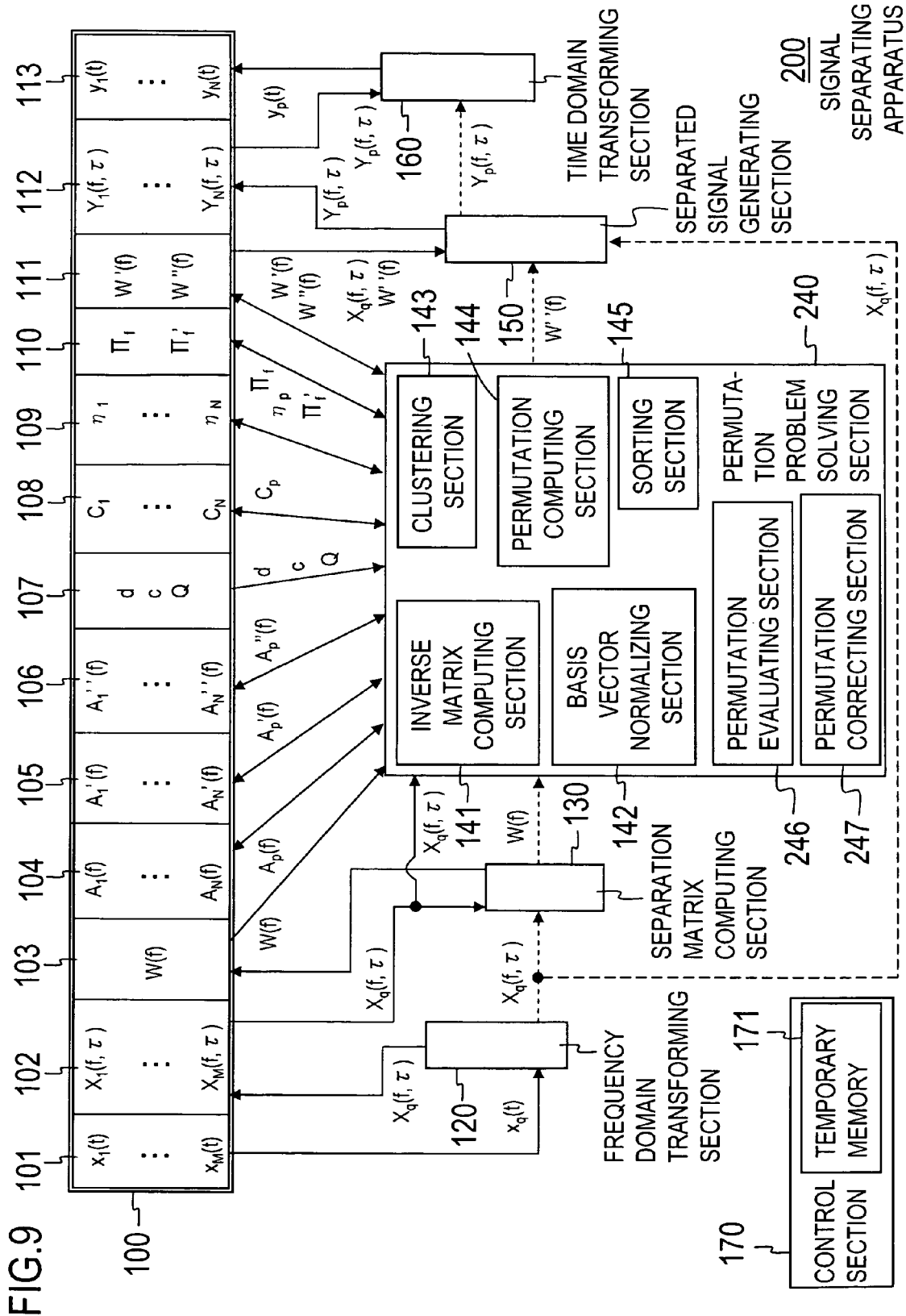
FIG. 9 is a block diagram illustrating a signal separating apparatus according to a second embodiment.
Figure 10A:
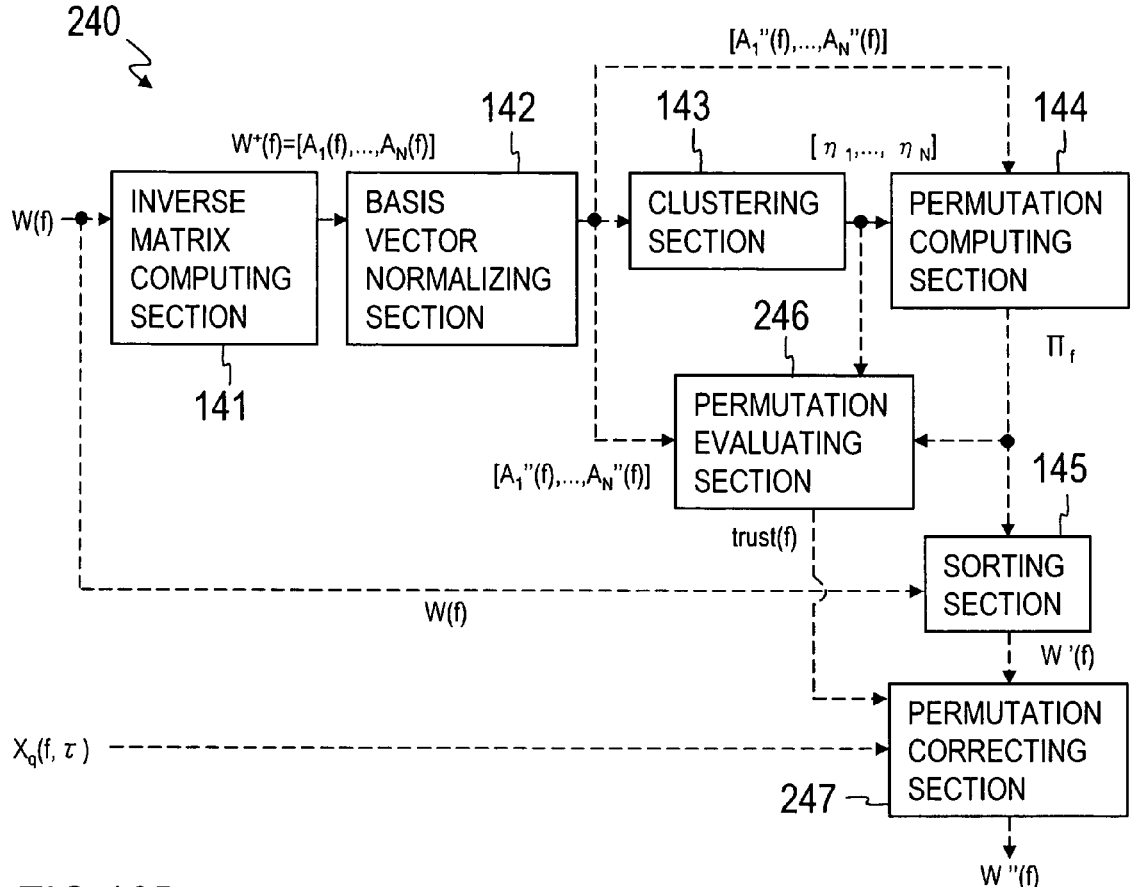
FIG. 10A is a block diagram illustrating details of a permutation problem solving section shown in FIG. 9.
Figure 10B:
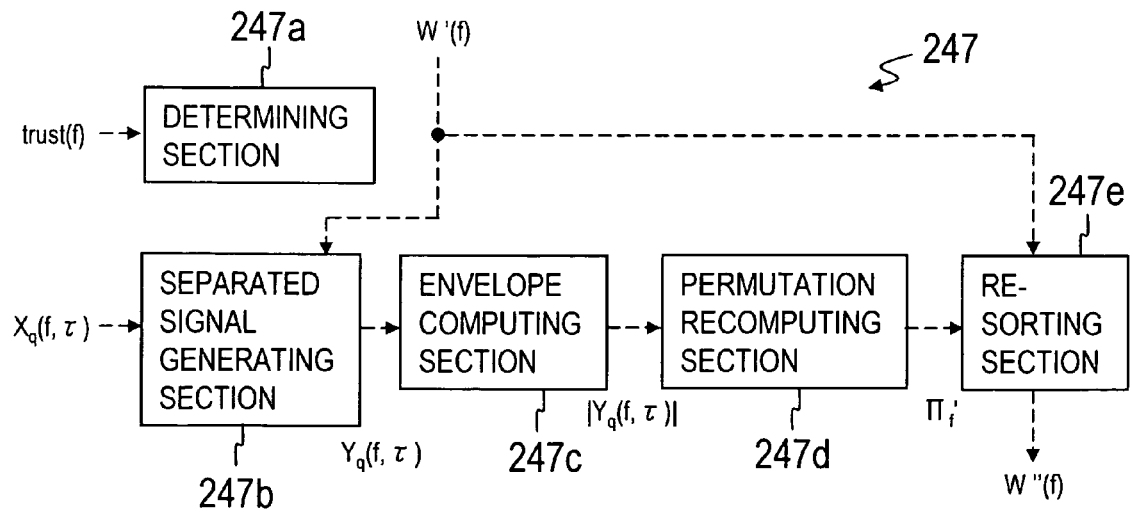
FIG. 10B is a block diagram illustrating details of a permutation correcting section shown in FIG. 10A.

FIG. 9 is a block diagram showing an example of a signal separating apparatus 200 according to the second embodiment. Like in the first embodiment, the signal separating apparatus 200 in the second embodiment is configured when a signal separating program is read into a CPU 10a (FIG. 2). FIG. 10A is a block diagram showing details of the permutation problem solving section 240 shown in FIG. 9 and FIG. 10B is a block diagram showing details of the permutation correcting section 247 shown in FIG. 10A. In FIGS. 9 and 10, the same elements as those in the first embodiment are labeled with the same reference numerals as those used in the first embodiment. The dashed arrows in FIGS. 9 and 10 represent theoretical information flows whereas the solid arrows represent actual data flows. Arrows representing flows of data inputted into and outputted from a control section 170 are omitted from FIGS. 9 and 10. Arrows representing actual data flows are also omitted from FIG. 10.

A major difference of the second embodiment from the first embodiment lies in the configuration of the permutation problem solving section 240. The permutation problem solving section 240 in the second embodiment is the same as the permutation problem solving section 140 in the first embodiment, except that a permutation evaluating section 246 and a permutation correcting section 247 are added in the second embodiment (FIGS. 9 and 10A). The permutation evaluating section 246 evaluates the reliability of a permutation on a frequency-by-frequency basis. If the reliability of a permutation at a frequency is evaluated as low, the permutation correcting section 247 calculates another permutation by using the envelope of separated signals. The permutation correcting section 247 includes a determining section 247a, a separated signal generating section 247b, an envelope computing section 247c, a permutation recomputing section 247d, and a resorting section 247e (FIG. 10B). In the second embodiment, the permutation computing section 144 and the permutation correcting section 247 make up a "permutation computing section" as set fourth in claim 4.

<Processing>

FIG. 11 is a flowchart outlining a whole process performed in the signal separating apparatus 200 according to the second embodiment. The process performed in the signal separating apparatus 200 in the second embodiment will be described with reference to the flowchart.

Steps S51 to S57 are the same as steps S1 to S7 in the first embodiment and therefore the description thereof will be omitted. In the second embodiment, after step S57, the reliability of a permutation $\Pi_f$ for each frequency is evaluated in the permutation evaluating section 246. For a frequency for which the reliability of the permutation $\Pi_f$ is evaluated as low, the envelope of separated signals is used to calculate another permutation $\Pi_f'$, rows of a second separation matrix W'(f), only for that frequency are rearranged in accordance with the permutation $\Pi_f'$ to generate a third separation matrix W" (f), and the third separation matrix W" (f) is stored in memory area 110 of a memory 100 (step S58). The processing will be detailed later.

Then, a separated signal generating section 150 reads mixed signals $X_q(f, \tau)$ in the frequency domain from memory area 102 of the memory 100 and the third separation matrix W"(f) from memory 111. The separated signal generating section 150 then uses a mixed-signal vector $X(f, \tau) = [X_1(f, \tau), \ldots, X_M(f, \tau)]^T$ consisting of the frequency-domain mixed signals $X_q(f, \tau)$ and the third separation matrix W"(f) to compute a separated signal vector $$Y(f,\tau) = W''(f) \cdot X(f,\tau)$$

and stores frequency-domain separated signals $Y_p(f, \tau)$ in memory area 112 of the memory 100 (step S59).

Finally, the time domain transforming section 160 reads the frequency-domain separated signals $Y_p(f,\tau)$ from memory area 112 of the memory 100, transforms them into separated signals $y_p(t)$ in the time domain for each individual suffix p, and stores the time-domain separated signals $y_p(t)$ in memory area 113 of the memory 100 (step S60).

[Details of Processing at Step S58]

Figure 12:
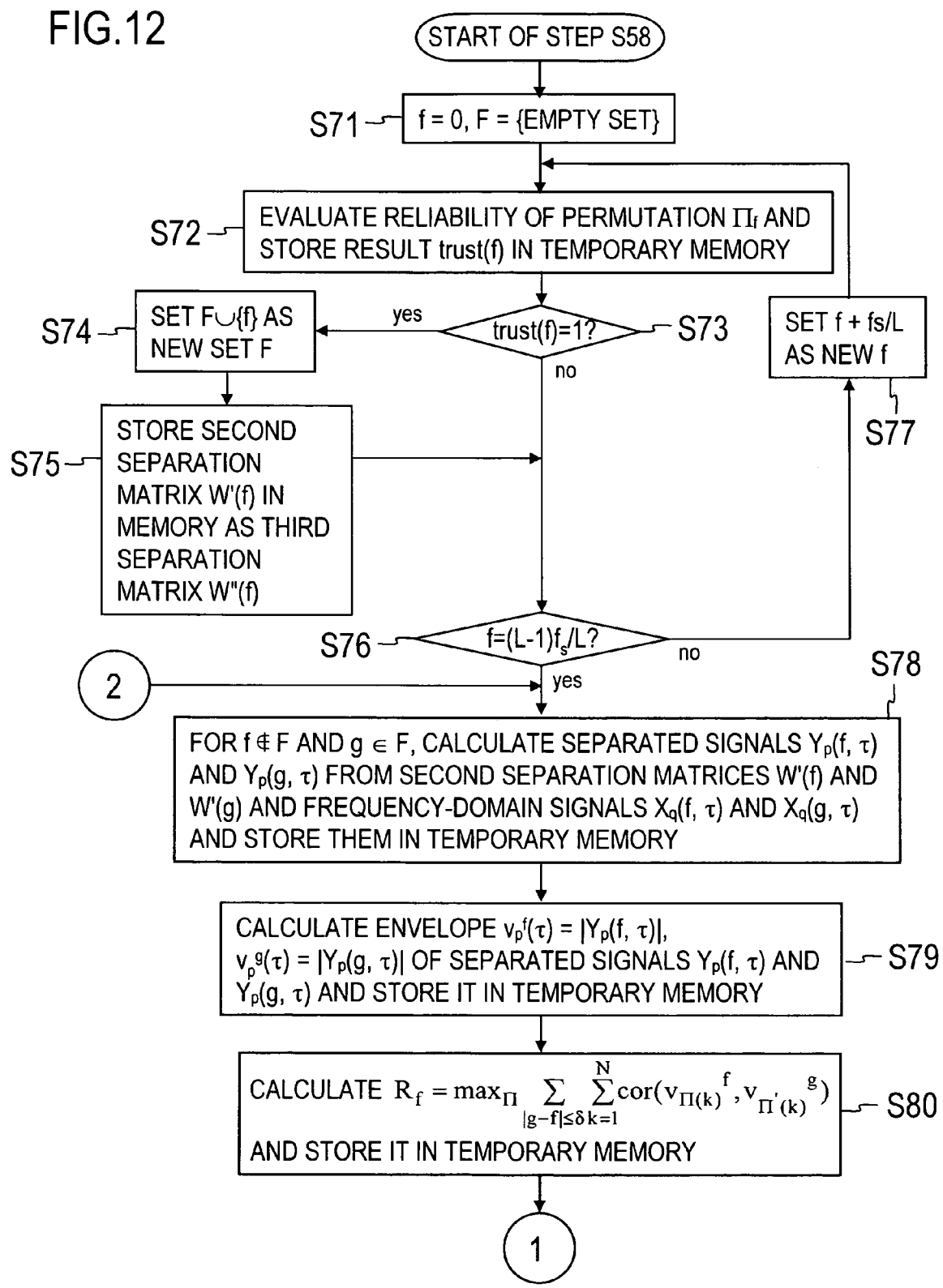
FIG. 12 is a flowchart illustrating an example of step S58 in FIG. 11.
Figure 13:
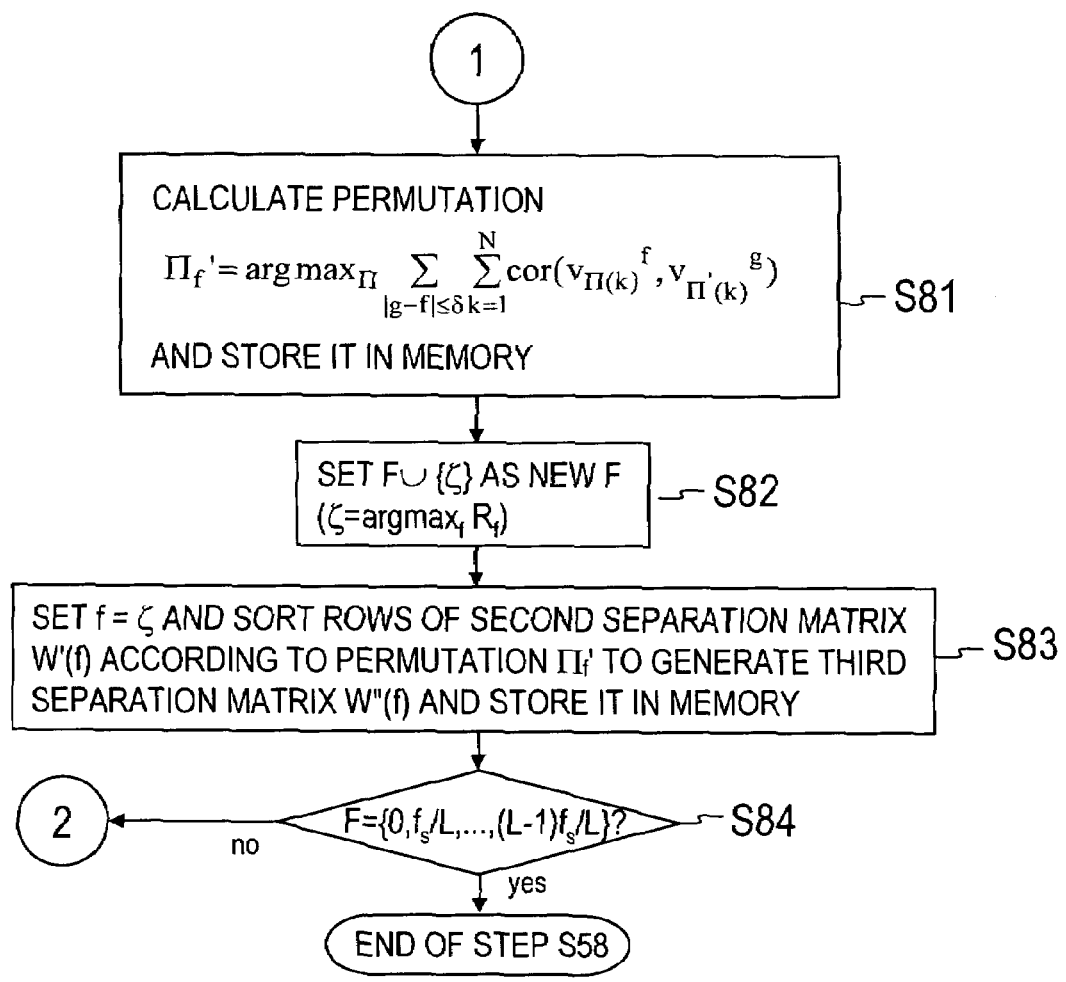
FIG. 13 is a flowchart illustrating an example of step S58 in FIG. 11.

FIGS. 12 and 13 show a flowchart illustrating an example of processing at step S58 in FIG. 11. Step S58 will be detailed with reference to the flowchart.

First, a control section 170 assigns 0 to parameter f, makes a set F an empty set, and stores information representing this in a temporary memory 171 (step S71). Then, the permutation evaluating section 246 evaluates the reliability of a permutation $\Pi_f$ stored in memory area 110 of the memory 100 for each frequency and stores the result of evaluation trust(f) in the temporary memory 171 (step S72). The reliability of a permutation $\Pi_f$ is said to be high if the normalized basis vector $A_p''(f)$ is sufficiently close to its corresponding centroid $\eta_k$. Whether a normalized basis vector $A_p''(f)$ is sufficiently close to its corresponding centroid $\eta_k$ can be determined on the basis of whether the distance between the normalized basis vector $A_p''(f)$ and the centroid $\eta_k$ is smaller than the variance $U_k/|C_k|$ of clusters $C_k$:

$$U_k/|C_k| > \|\eta_k - A_{\Pi(k)}''(f)\|^2 \quad (26)$$

At step S72, the permutation evaluating section 246 first reads the normalized basis vector $A_p''(f)$ from memory area 105 of the memory 100, the centroid $\eta_k$ from memory area 109, and the permutation $\Pi_f$ from memory area 110. The permutation evaluating section 246 then determines for each frequency f whether Equation 26 is satisfied. If it is satisfied, the permutation evaluating section 246 outputs and stores trust(f)=1 in the temporary memory 171; otherwise it outputs and stores trust(f)=0 in the temporary memory 171.

Then, the determining section 247a in the permutation correcting section 247 reads the evaluation result trust(f) for each frequency f from the temporary memory 171 and determines whether trust(f)=1 (step S73). If trust(f)=0, the process proceeds to step S76. On the other hand, if trust(f)=1, the control section 170 stores the sum of sets F and {f} in the temporary memory 171 as a new set F (step S74), and the re-sorting section 247e stores the second separation matrix W'(f) at the frequency f in memory area 111 of the memory 100 as a third separation matrix W"(f) (step S75), and then the proceeds to step S76.

At step S76, the control section 170 determines whether the value of parameter f stored in the temporary memory 171 satisfies the condition $f=(L-1)f_s/L$ (step S76). If it does not satisfy the condition, the control section 170 stores a calculation result $f+f_s/L$ as a new value of parameter f in the temporary memory 171 (step S77), and then returns to step S72.

On the other hand, if the value of parameter f satisfies the condition $f=(L-1)f_s/L$, the separated signal generating section 247b selects one frequency f that does not belong to set F.

For this frequency f and the frequencies g (where g∈F and |g−f|≦δ, and δ is a constant) that are in the vicinity of the frequency f and belong to set F, the separated signal generating section 247b reads mixed signals $X(f, \tau)=[X_1(f, \tau), \ldots, X_M(f, \tau)]^T$ and $X(g, \tau)=[X_1(g, \tau), \ldots, X_M(g, \tau)]^T$ in the frequency domain from memory area 102 of the memory 100, reads the second separation matrixes W'(f) and W'(g) from memory area 111, and use $$Y(f,\tau)=W'(f)\cdot X(f,\tau)$$

$$Y(g,\tau)=W'(g)\cdot X(g,\tau)$$

to compute separated signals $Y(f, \tau)=[Y_1(f, \tau), \ldots, Y_N(f, \tau)]^T$ and $Y(g, \tau)=[Y_1(g, \tau), \ldots, Y_N(g, \tau)]^T$, then stores them in the temporary memory 171 (step S78).

Then, the envelope computing section 247c reads all the frequency-domain separated signal $Y_p(f, \tau)$ and $Y_p(g, \tau)$ from the temporary memory 171, calculates their envelopes $$v_p^f(\tau)=|Y_p(f,\tau)|$$

$$v_p^g(\tau)=|Y_p(g,\tau)|$$

and stores them in the temporary memory 171 (step S79).

Then, the permutation recomputing section 247d computes the maximum sum of correlations "cor" in the vicinity less than or equal to the difference δ between the frequencies

[Formula 28]

$$R_f = \max_\Pi \sum_{|g-f|\leq\delta} \sum_{k=1}^{N} cor\left(v_{\Pi(k)}^f, v_{\Pi'(k)}^g\right)$$

and stores it in the temporary memory (step S80). Here, Π' is a predetermined permutation for frequency g. The correlation cor(Φ, Ψ) in the equation represents the correlation between two signals Φ and Ψ, defined as $$cor(\Phi,\Psi)=(<\Phi,\Psi>-<\Phi>\cdot<\Psi>)/(\sigma_\Phi\cdot\sigma_\Psi)$$

where <ζ> is the time average of ζ, $\sigma_\Phi$ is the standard deviation of Φ.

The permutation recomputing section 247d calculates a permutation that maximizes the sum of the correlations cor as

[Formula 29]

$$\Pi_f' = \text{argmax}_\Pi \sum_{|g-f|\leq\delta} \sum_{k=1}^{N} cor\left(v_{\Pi(k)}^f, v_{\Pi'(k)}^g\right)$$

and stores it in memory area 110 of the memory 100 (step S81). Here, Π' is a permutation predetermined for frequency g and argmax$_\Pi$ν represents Π that maximizes ν.

Then the control section 170 stores the sum of sets F and {ζ} (where $\zeta=\text{argmax}_f R_f$) in the temporary memory 171 as a new set F (step S82). Then, the re-sorting section 247e sets f=ζ and rearranges the rows of the second separation matrix W'(f) in accordance with permutation $\Pi_f'$ to generate a third separation matrix W''(f), and stores it in memory area 111 of the memory 100 (step S83).

The control section 170 then determines whether set F stored in the temporary memory 171 includes all discrete frequency elements f=0, $f_s/L, \ldots, f_s(L-1)$ (step S84). If set F does not include all discrete frequency elements f=0, $f_s/L, \ldots, f_s(L-1)/L$, the control section 170 returns to step S78. On the other hand, if set F includes all discrete frequency elements f=0, $f_s/L, \ldots, f_s(L-1)/L$, the control section 170 ends processing at step S58. It should be noted that, instead of the method described above, any of other methods such as the method described in Japanese Patent Application Laid-Open No. 2004-145172 or "Reference literature" may be used to perform processing at step S58.

<Experimental Results>

Results of experiments on sound source separation according to the first and second embodiments will be given below.

[Results of First Experiment]

Figure 14A:
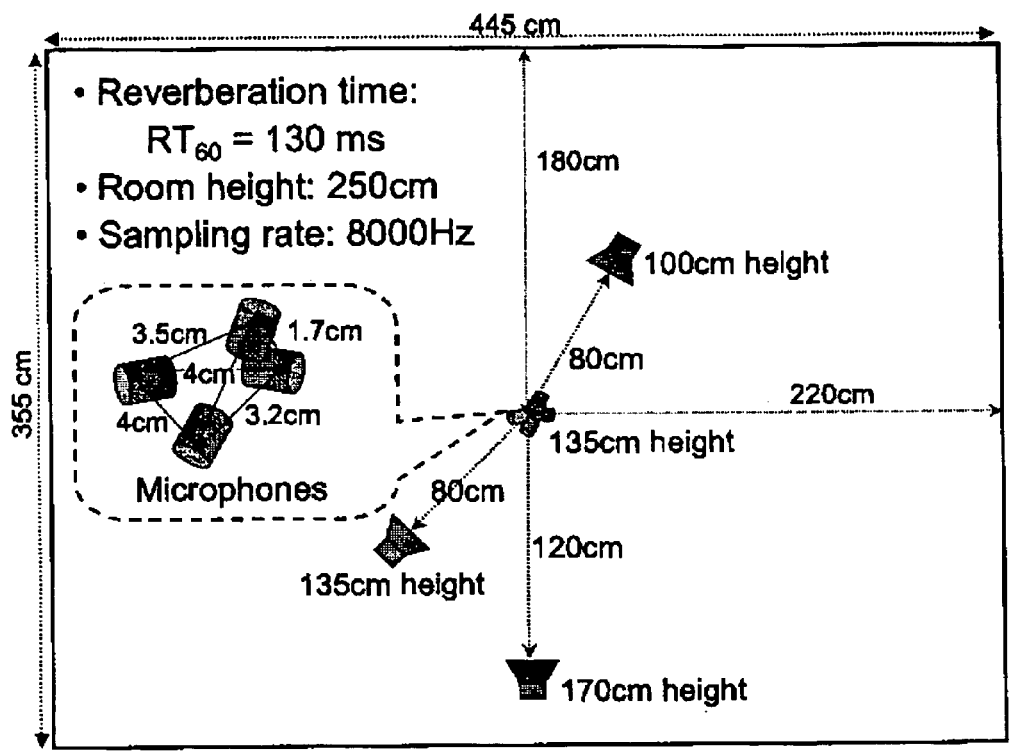
FIG. 14A shows conditions of sound source separation experiments according to the first and second embodiments.
Figure 14B:
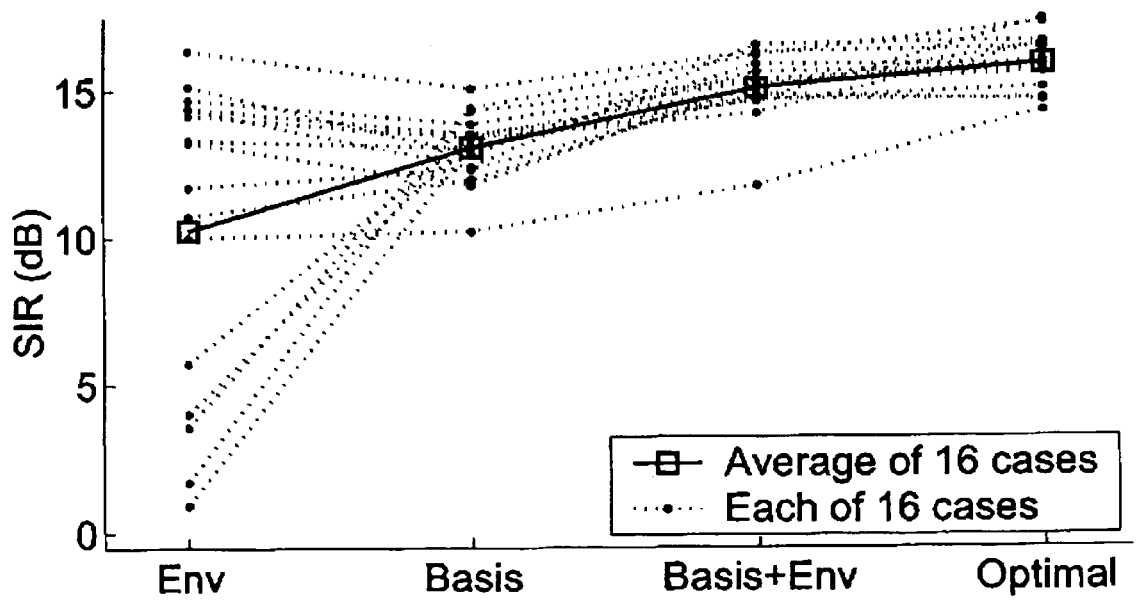
FIG. 14B shows the results of the sound source separation experiments according to the first and second embodiments.

A first experiment is conducted using randomly arranged sensors. The experimental conditions are as shown in FIG. 14A. Four omnidirectional microphones arranged randomly were used. However, all information about the arrangement of the sensors provided to the signal separating apparatus was the maximum distance between the microphones, which was 4 cm. Three sound sources were used: English speeches are emitted through loudspeakers for three seconds. FIG. 14B shows the results in terms of SIR (signal-to-interference ratio). The larger the SIR, the better the separation performance. The results of experiments using four methods for solving the permutation problem were compared. Env indicates the result of a method using only information about the envelope $|Y_p(f, \tau)|$ of separated signals, Basis indicates the result of a method using clustering of normalized basis vectors $A_p''(f)$ (the method according to the first embodiment), Basis+Env indicates the result of a method using the combination of these two items of information to solve the problem more accurately (the method according to the second embodiment), and Optimal indicates the result of a method using an optimum permutation obtained with the knowledge of source signals $s_k$ and impulse responses $h_{qk}(r)$.

Comparison of the results shows that the method using only Env provides varying separation performances whereas the method using Basis according to the first embodiment provides a sufficiently good separation performance. The results obtained using the combination of Basis and Env according to the second embodiment is almost as good as that of Optimal. Thus, a high performance of blind signal separation in the frequency domain was able to be achieved according to the present invention, even when the sensors were randomly arranged.

[Results of Second Experiment]

Figure 15A:
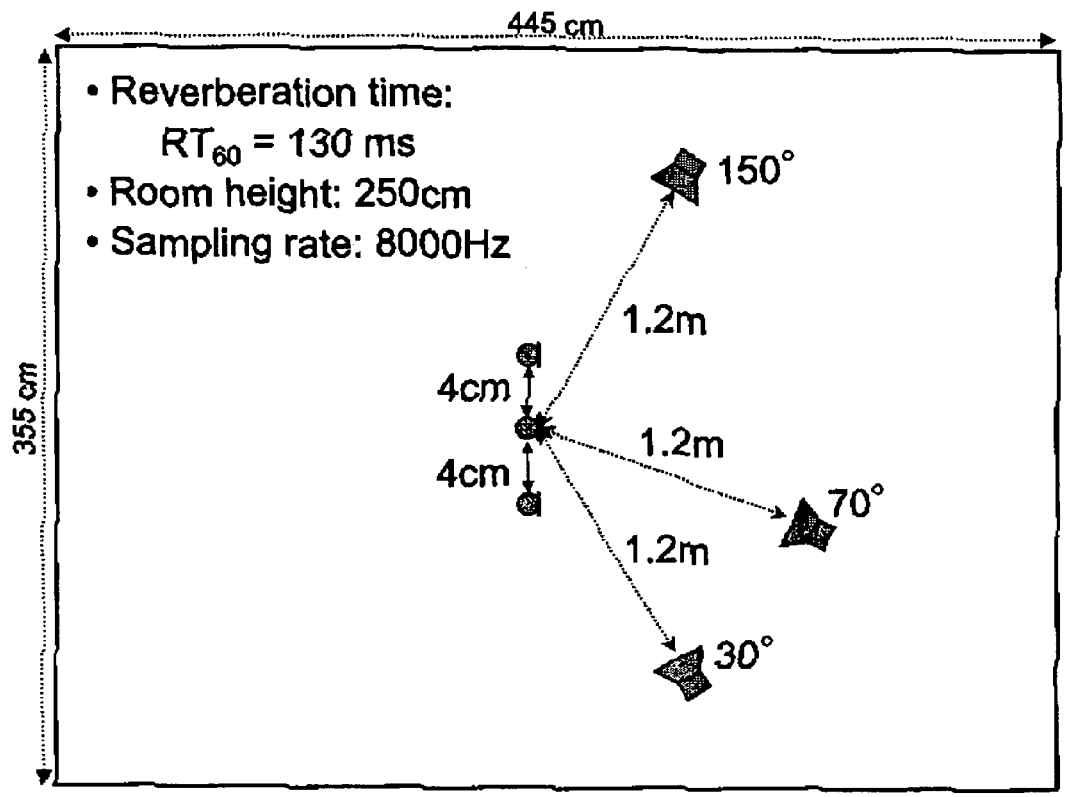
FIG. 15A shows conditions of sound source separation experiments according to the first and second embodiments.
Figure 15B:
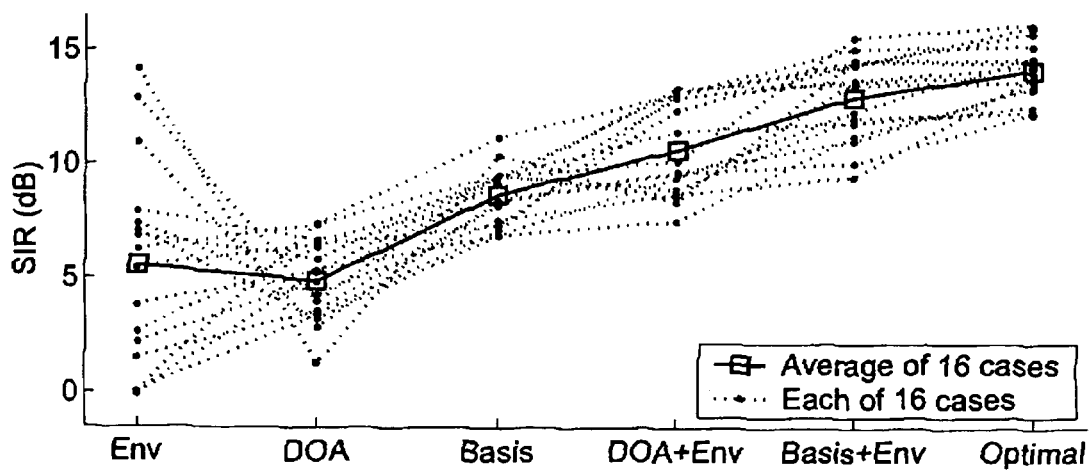
FIG. 15B shows the results of the sound source separation experiments according to the first and second embodiments.

A second experiment is conducted using orderly arranged sensors. FIG. 15A shows the experimental conditions. Three omnidirectional microphones are linearly spaced 4 cm apart. As in the first experiment, three sound sources were used: English speeches were emitted through loudspeakers for three seconds. FIG. 15B shows the results. In this experiment, comparison was made among the results obtained using six methods, including the conventional-art method described earlier in which estimates of signal source positions are clustered. DOA represents the result of a method in which the permutation problem was solved by using only estimations of DOA (direction-of-arrival) and DOA+Env represents the result obtained by using combination of estimates of DOA and information about the envelope of separated signals.

Comparison of the results of the method using DOA and the method using DOA+Env, which are conventional-art methods, with the results of the methods using Basis and Basis+Env of the present invention shows that the present invention generally provides improved performances in the orderly sensor arrangement to which the conventional approaches can be applied. It should be noted that computational cost was approximately equivalent to that in the prior-art methods.

<Features of the First and Second Embodiments>

Features of the first and second embodiments described above can be summarized as follows.

(1) Because precise information about the positions of sensors is not needed but only information about the upper limit of the distance between one reference sensor and another sensor, random arrangement of sensors can be used and positional calibration is not required; and (2) because all information obtained from basis vectors is used to perform clustering, the permutation problem can be solved more accurately, thus improving the signal separation performance.

The present invention is not limited to the embodiments described above. For example, while the Moore-Penrose generalized inverse matrix is used in the embodiments as the generalized matrix, any other generalized matrix may be used.

The first normalizing section 142aa of the frequency normalizing section 142a normalizes the argument of each element $A_{qp}(f)$ of a basis vector $A_p(f)$ on the basis of a particular element $A_{Qp}(f)$ of the basis vector $A_p(f)$ according to Equation (15) in the first embodiment. However, the first normalizing section 142aa may normalize the argument of each element $A_{qp}(f)$ of a basis vector $A_p(f)$ on the basis of a particular element $A_{Qp}(f)$ of the basis vector $A_p(f)$ in accordance with the following equations:

[Formula 30]

$$A_{qp}'''(f) = |A_{qp}(f)| \exp\{j \cdot (\arg[A_{qp}(f) \cdot A_{Qp}^*(f)])\} \quad (27\text{-}1)$$

$$A_{qp}'''(f) = |A_{qp}(f)| \exp\{j \cdot (\arg[A_{qp}(f)] - \arg[A_{Qp}(f)])\} \quad (27\text{-}2)$$

$$A_{qp}'''(f) = |A_{qp}(f)| \exp\{j \cdot \Psi(\arg[A_{qp}(f)/A_{Qp}(f)])\} \quad (27\text{-}3)$$

Here, ".*" is a complex conjugate and "$\Psi\{\cdot\}$" is a function, preferably a monotonically increasing function, from the viewpoint of improving the precision of clustering.

The frequency normalizing section 142a may use the following equations

[Formula 31]

$$A_{qp}'(f) = \rho \cdot \frac{\arg[A_{qp}(f)/A_{Qp}(f)]}{4fc^{-1}d} \quad (28\text{-}1)$$

$$A_{qp}'(f) = \rho \cdot \frac{\arg[A_{qp}(f) \cdot A_{Qp}*(f)]}{4fc^{-1}d} \quad (28\text{-}2)$$

$$A_{qp}'(f) = \rho \cdot \frac{\arg[A_{qp}(f)] - \arg[A_{Qp}(f)]}{4fc^{-1}d} \quad (28\text{-}3)$$

$$A_{qp}'(f) = \rho \cdot \frac{\Psi(\arg[A_{qp}(f)/A_{Qp}(f)])}{4fc^{-1}d} \quad (28\text{-}4)$$

instead of Equation (14) to perform frequency normalization. Here, $\rho$ is a constant (for example $\rho=1$).

While the norm normalizing section 142b in the above-described embodiments performs normalization so that the norm becomes equal to 1, it may perform normalization so that the norm becomes equal to a predetermined number other than 1. Furthermore, the norm normalizing section 142b may be not provided and therefore norm normalization may be omitted. In that case, the clustering section 143 performs clustering of frequency-normalized vectors $A_p'(f)$. However, the norms of frequency-normalized vectors $A_p'(f)$ are not equal. Accordingly, the clustering reference in this case is whether vectors are similar to each other only in direction, rather than both in direction and norm. This means evaluation using the degree of similarity. One example of the measure of similarity may be cosine distance $$\cos\theta = |A_p'^H(f) \cdot \eta_k|/(\|A_p'(f)\| \cdot \|\eta_k\|)$$

where $\theta$ is the angle between a frequency-normalized vector $A_p'(f)$ and the vector of the centroid $\eta_k$. If cosine distances are used, the clustering section 143 generates a cluster that minimizes the total sum of the cosine distances

[Formula 32]

$$U_i = \Sigma_{A_p'(f) \in C_i} |A_p'^H(f) \cdot \eta_i|/(\|A_p'(f)\| \cdot \|\eta_i\|)$$

Here, the centroid $\eta_k$ is the average among the members of each cluster.

In the second embodiment, the reliability of a permutation for each frequency is evaluated and, for a frequency for which the reliability of the permutation is evaluated as low, the envelope of separated signals is used to calculate a new permutation. However, a permutation for all frequencies may be generated by using the envelope of separated signals, the center vectors of clusters, and normalized basis vectors.

Furthermore, the envelope of separated signals are first used to compute a permutation, the reliability of the permutation is evaluated for each individual frequency, and then the method of the first embodiment is applied to a frequency evaluated as having a low reliability permutation to calculate a new permutation for the frequency.

While the second separation matrix W'(f) is used to compute the envelope of separated signals in the second embodiment, the first separation matrix W(f) or a matrix resulting from rearrangement of the rows of the first matrix W(f) may be used to compute the envelope.

The same value of parameter d may be used for all sensors q or different values may be set for different sensors q. For example, the distance between the reference sensor and each sensor q may be set as the value of parameter d for the sensor q.

Third Embodiment (Example of the Second Aspect of the Present Invention)

The third embodiment of the present invention will be described below.

The third embodiment uses the principles described above to extract a target signal from mixed signals in which signals originated from multiple sources are mixed, without having information about the direction of the target signal.

<Configuration>

Figure 16:
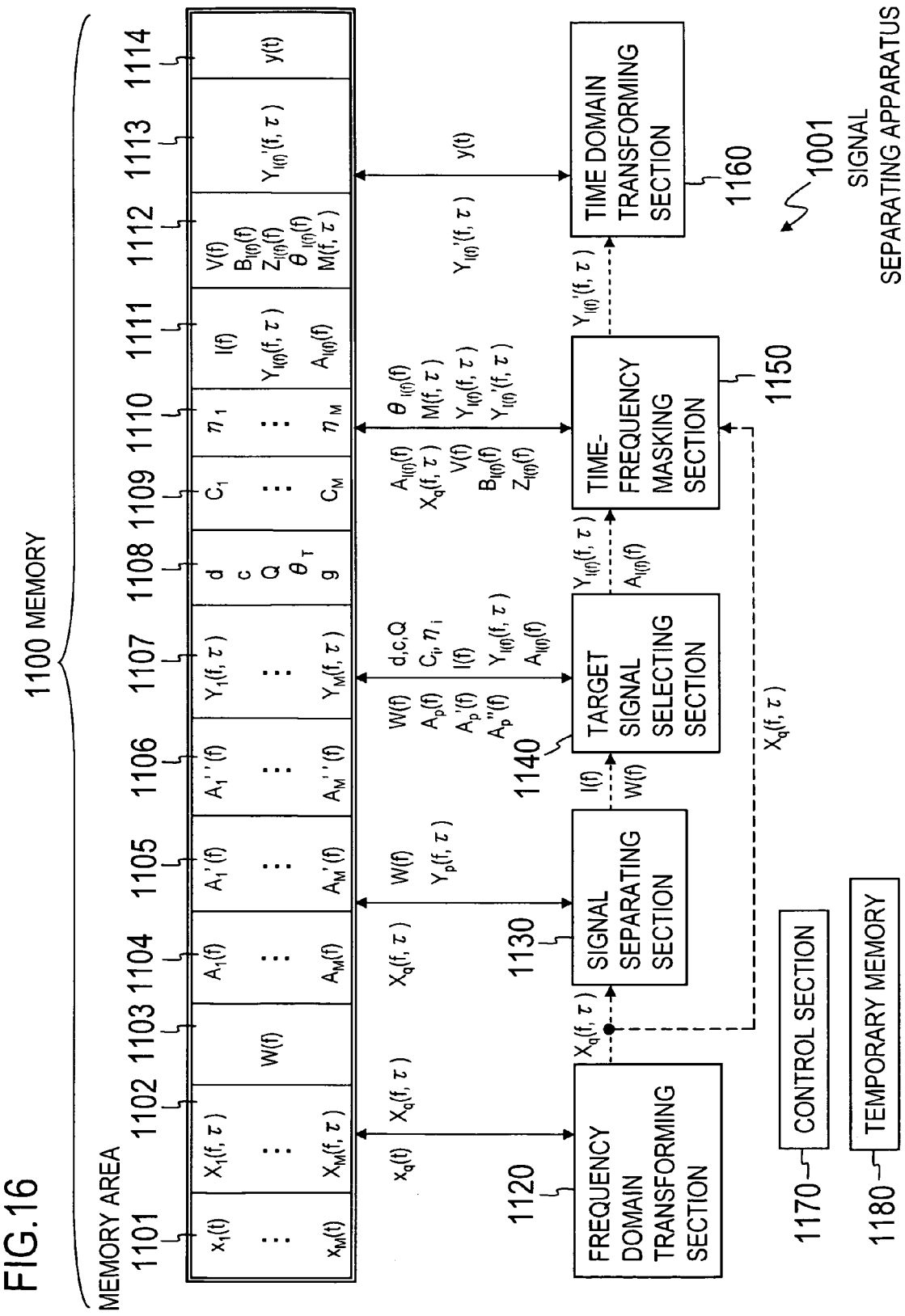
FIG. 16 is a block diagram illustrating a configuration of a signal separating apparatus according to a third embodiment.

Like the signal separating apparatus in the first embodiment, a signal separating apparatus of the present embodiment is configured by loading a signal separating program into a computer of well-known von Neumann-type. FIG. 16 is a block diagram illustrating a configuration of a signal separating apparatus 1001 according to the third embodiment.

As shown in FIG. 16, the signal separating apparatus 1001 has a memory 1100 including memory areas 1101-1114, a frequency domain transforming section 1120, a signal separating section 1130, a target signal selecting section 1140, a time-frequency masking section 1150 (which is equivalent to the "separated signal generating section"), a time domain transforming section 1160, a control section 1170, and a temporary memory 1180. The memory 1100 and the temporary memory 1180 may be, but not limited to, at least one of a register 10ac, a data area 10fb of an auxiliary storage device 10f, and a data area 10db of a RAM 10d (FIG. 2). The frequency domain transforming section 1120, the signal separating section 1130, the target signal selecting section 1140, the time frequency masking section 1150, the time domain transforming section 1160, the control section 1170, and the temporary memory 1180 are configured by an OS program and a signal separating program read into a CPU 10a (FIG. 2), for example.

Figure 17A:
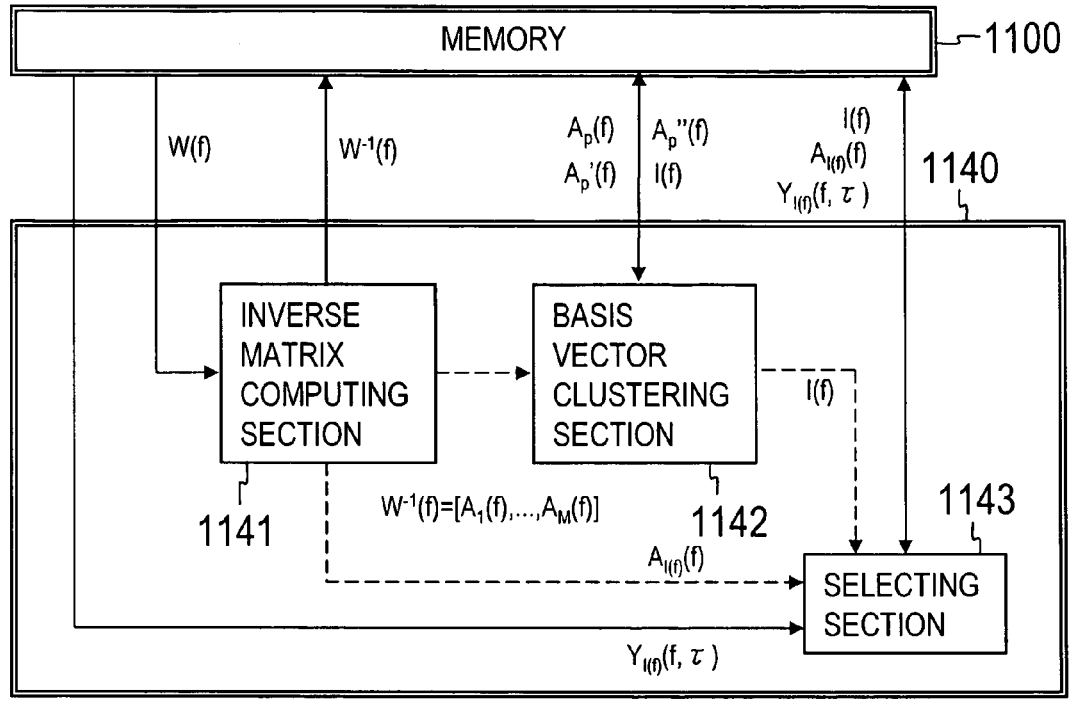
FIG. 17A is a block diagram illustrating a detailed configuration of a target signal selecting section in FIG. 16.
Figure 17B:
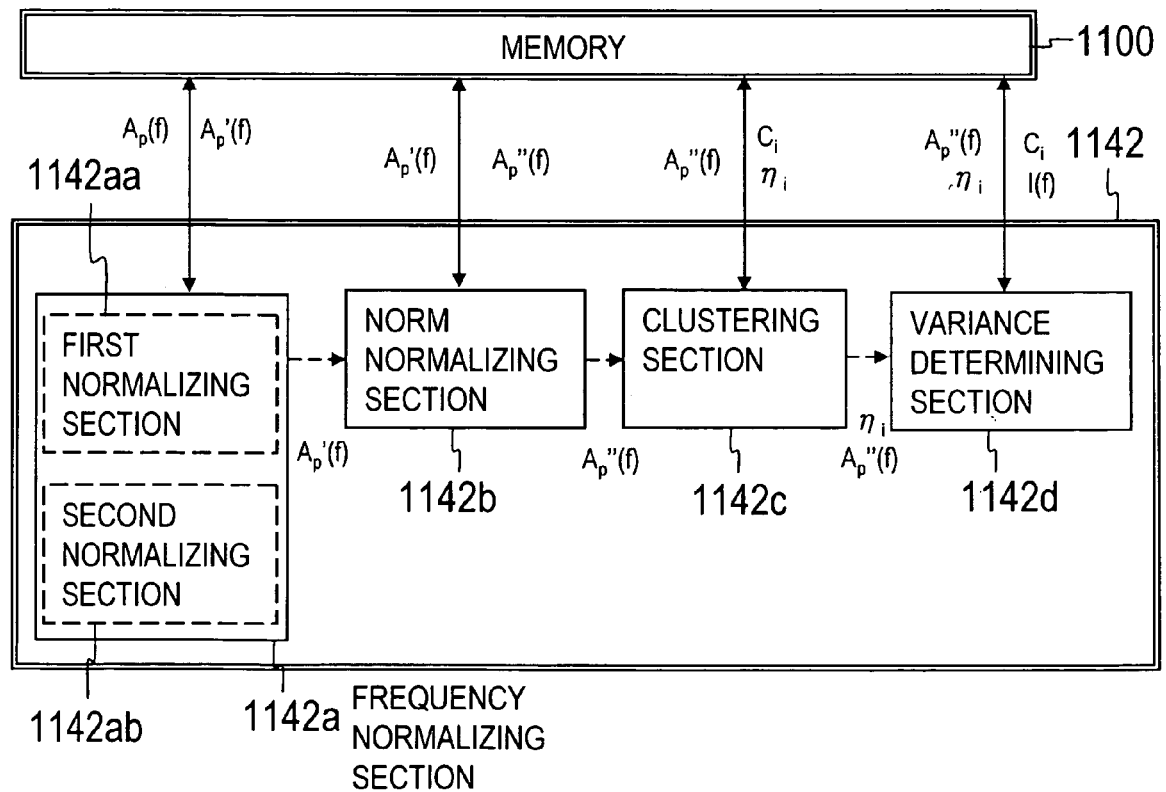
FIG. 17B is a block diagram illustrating a detailed configuration of a basis vector clustering section in FIG. 17A.

FIG. 17A is a block diagram illustrating a detailed configuration of the target signal selecting section 1140 shown in FIG. 16. FIG. 17B is a block diagram illustrating a detailed configuration of the basis vector clustering section 1142 in FIG. 17A.

As shown in FIGS. 17A and 17B, the target signal selecting section 1140 includes an inverse matrix computing section 1141 (which is equivalent to the "complex vector generating section"), a basis vector clustering section 1142, and a selecting section 1143. The basis vector clustering section 1142 includes a frequency normalizing section 1142a (which constitutes the "normalizing section"), a norm normalizing section 1142b (which constitutes the "normalizing section"), a clustering section 1142c, and a variance determining section 1142d. The frequency normalizing section 1142a includes a first normalizing section 1142aa and a second normalizing section 1142ab.

Figure 18A:
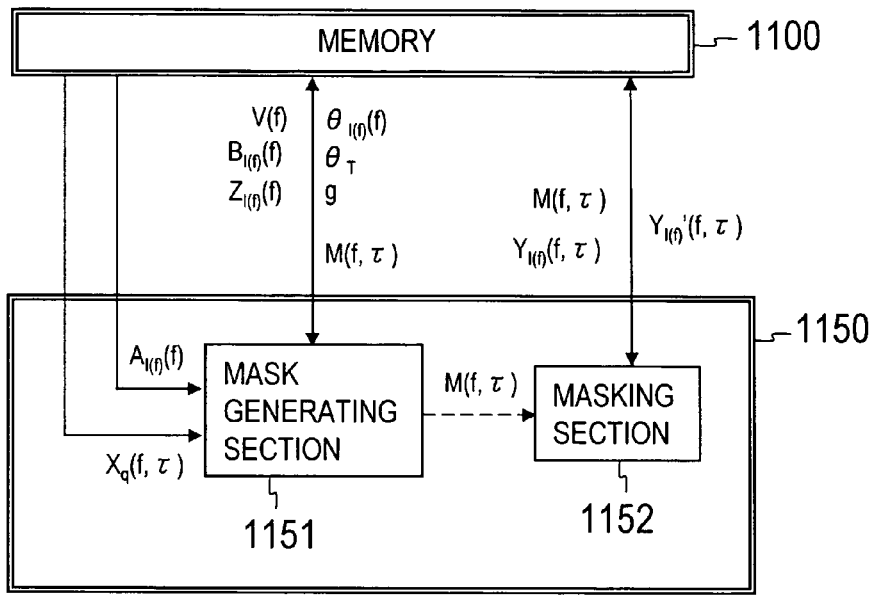
FIG. 18A is a block diagram illustrating a detailed configuration of a time-frequency masking section in FIG. 16.
Figure 18B:
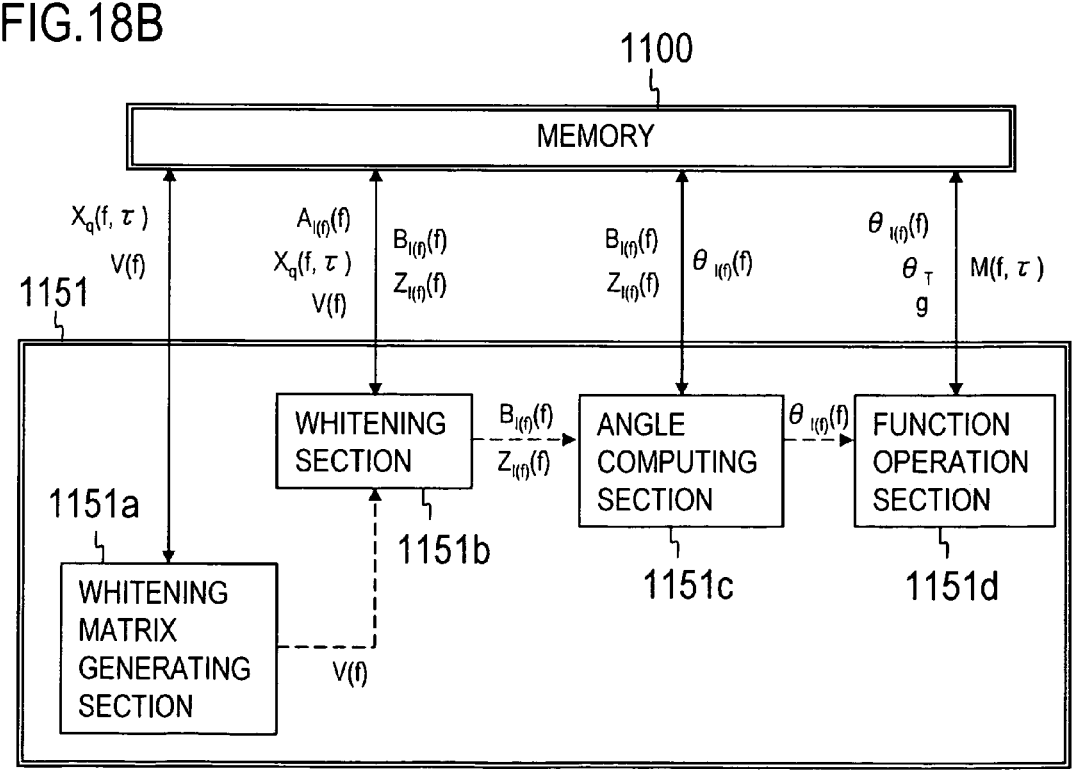
FIG. 18B is a block diagram illustrating details of a mask generating section in FIG. 18A.

FIG. 18A is a block diagram illustrating a detailed configuration of the time-frequency masking section 1150 shown in FIG. 16. FIG. 18B is a block diagram showing a detailed configuration of the mask generating section 1151 shown in FIG. 18A.

As shown in FIGS. 18A and 18B, the time-frequency masking section 1150 includes a mask generating section 1151 and a masking section 1152. The mask generating section 1151 includes a whitening matrix generating section 1151a, a whitening section 1151b, an angle computing section 1151c, and a function operation section 1151d.

The solid arrows in FIGS. 16 to 18 represents actual data flows and the dashed arrows represent theoretical information flows. Flows of data inputted to and outputted from the control section 1170 and the temporary memory 1180 are not depicted. The signal separating apparatus 1001 performs processes under the control of the control section 1170. Unless otherwise stated, the control section 1170 performs processing while reading and writing required data in the temporary memory 1180.

<Processing>

Processing performed in the signal separating apparatus 1001 according to the third embodiment will be described below.

The assumption is that N signal sources $k(k \in \{1, 2, \ldots, N\})$ exist in a space and their signals $s_k(t)$ (where "t" is sampling time) are mixed and are observed at M sensors q $(q \in \{1, 2, \ldots, M\})$ as mixed signals $x_q$. In the third embodiment, a target signal originating from any of the signal sources is extracted only from mixed signals $x_1(t), \ldots, x_M(t)$ and other interfering signals are suppressed to obtain a signal y(t). The number N of signal sources may be greater or less than or equal to the number M of sensors. Information about the number N of signal sources does not need to be obtained beforehand. The processing may be performed in a situation where signal sources cannot be counted.

[Outline of Processing]

Figure 19:
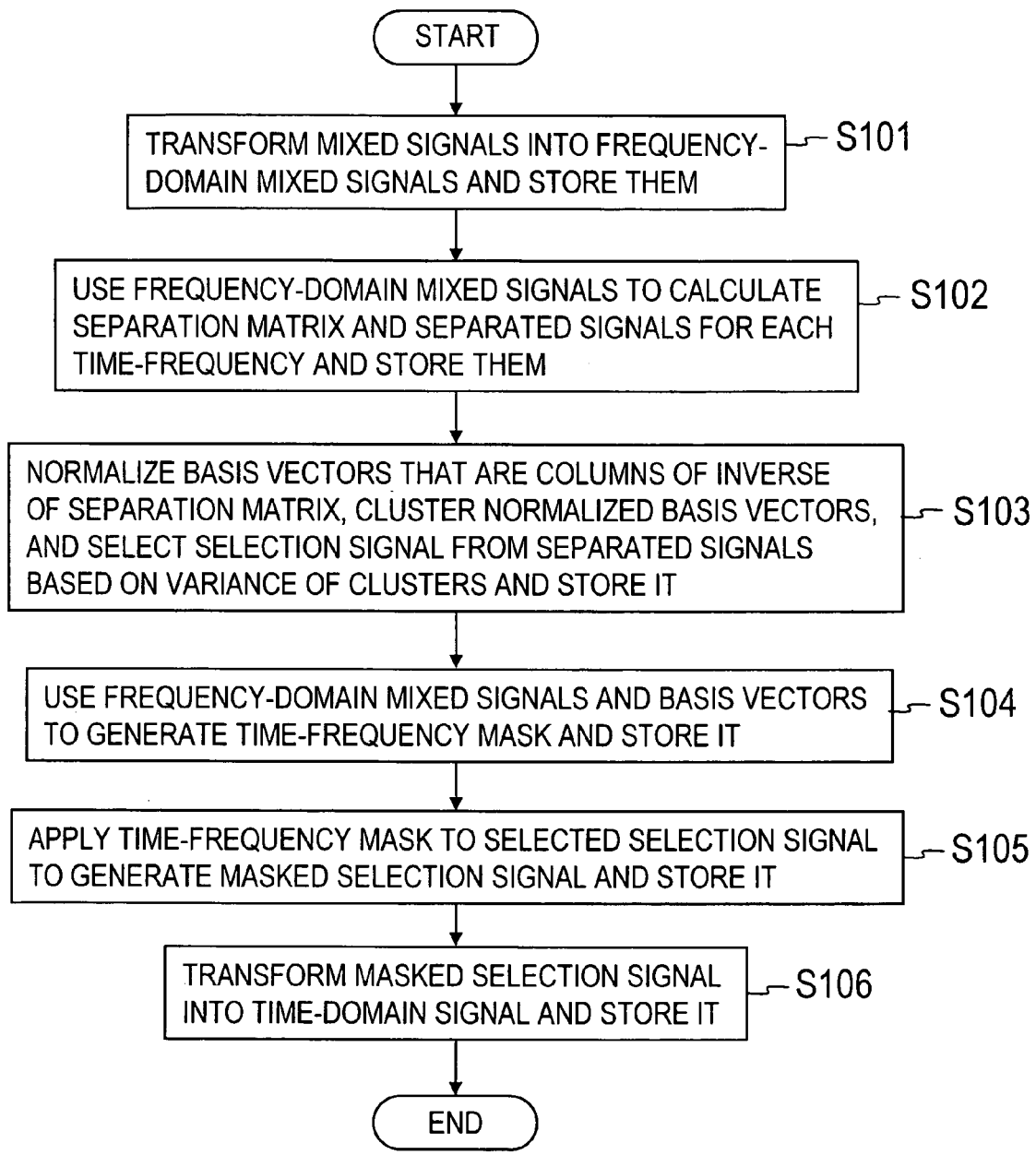
FIG. 19 is a flowchart outlining a whole signal separation process according to the third embodiment.

FIG. 19 is a flowchart outlining a whole signal separating process according to the third embodiment. The outline of the signal separating process in the third embodiment will be described with reference to FIG. 19.

First, mixed signals $x_q(t)(q \in \{1, \ldots, M\})$ in the time domain observed by M sensors are stored in memory area 1101 in the memory 1100 during preprocessing. Once the signal separation is started, the frequency domain transforming section 1120 reads the time-domain mixed signals $x_q(t)$ from memory area 1101 of the memory 1100. The frequency domain transforming section 1120 then transforms them into the frequency-domain mixed signals $X_q(f, \tau)$ by using such as a short-time Fourier transformation, and stores the frequency-domain mixed signals $X_q(f, \tau)$ in memory area 1102 of the memory 1100 (step S101).

Then, the signal separating section 1130 reads the frequency-domain mixed signals $X_q(f, \tau)$ from memory area 1102 of the memory 1100. The signal separating section 1130 in this example applies independent component analysis (ICA) to a mixed-signal vector $X(f, \tau) = [X_1(f, \tau), \ldots, X_M(f, \tau)]^T$ consisting of the read mixed signals $X_q(f, \tau)$ to calculate, for each individual frequency f, a separation matrix $W(f) = [W_1(f), \ldots, W_M(f)]^H$ of M rows and M columns (where "$*^H$" is a complex conjugate transposed matrix of a matrix $*$) and a separated signal vector $$Y(f, \tau) = W(f) \cdot X(f, \tau) \qquad (30)$$

(step S102). The calculated separation matrix W(f) is stored in memory area 1103 of the memory 1100. The separated signals $Y_p(f, \tau)$ $(p \in \{1, \ldots, M\})$ constituting the separated signal vector $Y(f, \tau) = [Y_1(f, \tau), \ldots, Y_M(f, \tau)]^T$ are stored in memory area 1107. The processing at step S102 will be detailed later.

Then, the target signal selecting section 1140 reads the separation matrix W(f) from memory area 1103 of the memory 1100, normalizes basis vectors which are columns of the generalized inverse matrix of the separation matrix W(f), and clusters the normalized basis vectors. The target signal selecting section 1140 selects, for each frequency f, selection signals $Y_{I(f)}(f, \tau)$ including the target signal and basis vectors $A_{I(f)}(f)$ corresponding to them from the separated signals in memory area 1107 of the memory 1100 on the basis of the variances of the clusters and stores them in memory area 1111 of the memory 1100 (step S103). In the third embodiment, a signal from a source which is near a sensor and therefore its power observed at the sensor is dominating over signals from the other sources and is useful as information is selected as the target signal. The processing at step S103 will be detailed later.

Then, the time-frequency masking section 1150 reads the frequency-domain mixed signals $X_q(f, \tau)$ from memory area 1102 of the memory 1100, reads the basis vectors $A_{I(f)}(f)$ corresponding to the selection signals $Y_{I(f)}(f, \tau)$ from memory area 1104, uses them to generate a time-frequency mask M(f, $\tau$), and stores it in memory area 1112 (step S104). The processing at step S104 (processing by the time-frequency masking section 1150) will be detailed later.

Then, time-frequency masking section 1150 reads the selection signals $Y_{I(f)}(f, \tau)$ selected by the target signal selecting section 1140 from memory area 1107 of the memory 1100 and the time-frequency mask M(f, $\tau$) from memory area 1112. The time-frequency masking section 1150 then applies the time frequency mask M(f, $\tau$) to the selection signals $Y_{I(f)}(f, \tau)$ to further suppress interfering signal components remaining in the selection signals $Y_{I(f)}(f, \tau)$ to generate masked selection signals $Y_{I(f)}'(f, \tau)$, and stores them in memory area 1113 of the memory 1100 (step S105). The processing at step S105 (processing by time-frequency masking section 1150) will be detailed later.

Finally, the time domain transforming section 1160 reads the selected separated signals $Y_{I(f)}'(f, \tau)$ in the frequency domain from memory area 1113 of the memory 1100, applies a transformation such as a short-time inverse Fourier transformation to them to generate separated signals $y(t)$ in the time domain, and stores them in memory area 1114 of the memory 1100 (step S106).

[Details of Processing at Step S102 (Processing by the Signal Separating Section 1130)]

As mentioned above, the signal separating section 1130 in this example uses independent component analysis (ICA) to compute separation matrices $W(f)=[W_1(f), \ldots, W_M(f)]^H$ consisting of M rows and M columns and separated signal vectors $Y(f, \tau)=[Y_1(f, \tau), \ldots, Y_M(f, \tau)]^T$ from the mixed-signal vectors $X(f, \tau)=[X_1(f, \tau), \ldots, X_M(f, \tau)]T$ (step S102). Independent component analysis (ICA) is a method for computing a separation matrix $W(f)$ such that the elements of a separated signal vector $Y(f, \tau)=[Y_1(f, \tau), \ldots, Y_M(f, \tau)]^T$ are then independent of one another. Various algorithms have been proposed, including the one described in Non-patent literature 4. Independent component analysis (ICA) can separate and extract more advantageously target signals of the third embodiment which are more powerful and more non-Gaussian than interfering signals, which are less powerful and more Gaussian.

[Details of Processing at Step S103 (Processing by the Target Signal Selecting Section 1140)]

Independent component analysis (ICA) exploits independence of signals to separate the signals. Therefore the separated signals $Y_p(f, \tau)$ have ambiguity of the order. This is because the independence is retained even if the order is changed. Therefore, a separated signal corresponding to a target signal must be selected at each frequency. The target signal selecting section 1140 performs this selection through the following process.

Figure 20:
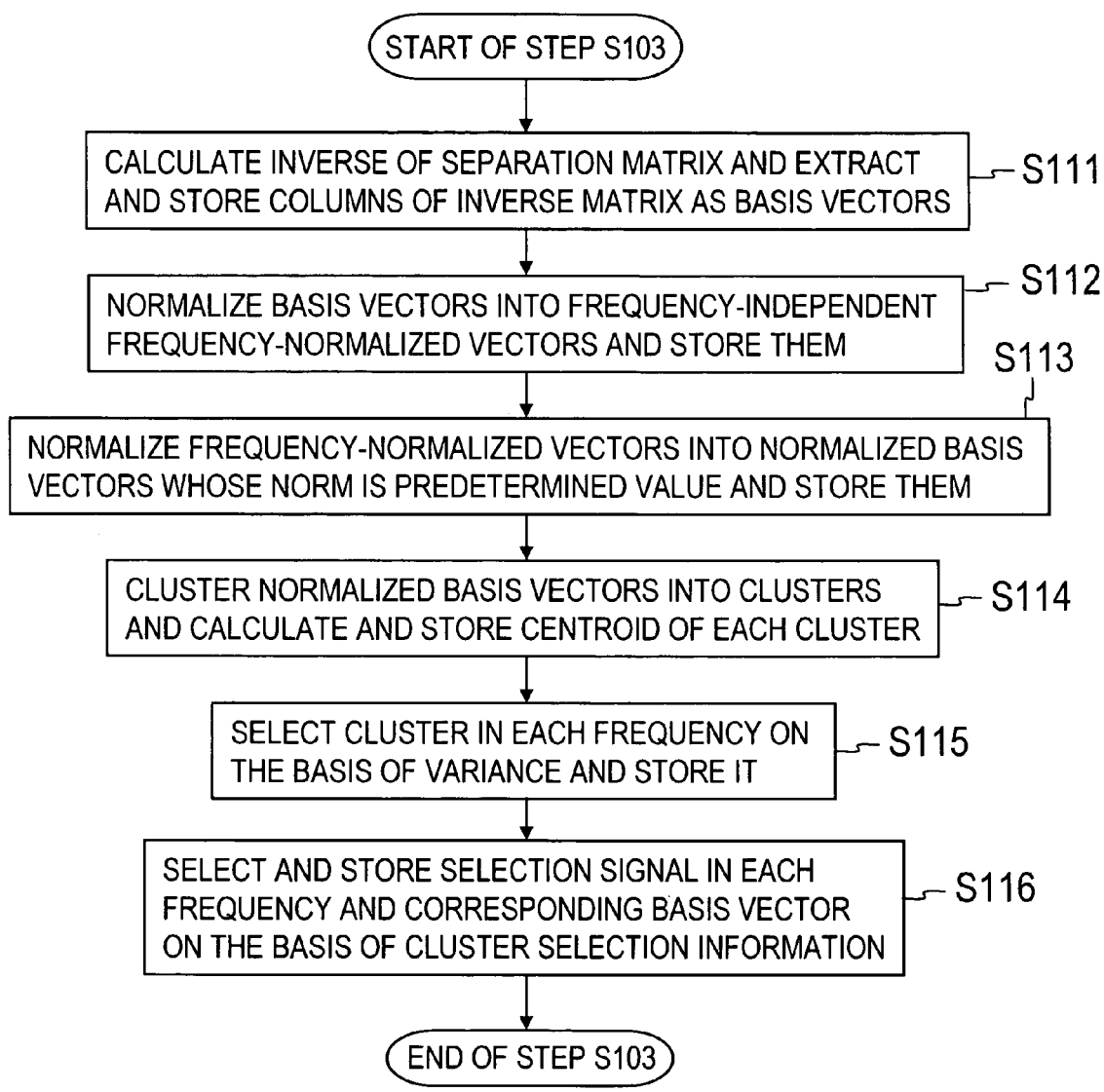
FIG. 20 is a flowchart illustrating details of processing in a target signal selection section according to the third embodiment.

FIG. 20 is a flowchart illustrating details of processing by the target signal selecting section 1140 in the third embodiment. With reference to FIG. 20, processing by the target signal selecting section 1140 will be detailed below.

First, the inverse matrix computing section 1141 reads, for each frequency, a separation matrix $W(f)$ consisting of M rows and M columns from memory area 1103 of the memory 1100 and computes its inverse matrix $$W(f)^{-1}=[A_1(f), \ldots, A_M(f)] \text{(where the rows are } A_p(f)=[A_{1p}(f), \ldots, A_{Mp}(f)]^T) \tag{31}$$

Here, the both sides of Equation (30) are multiplied by Equation (31) to obtain the decompositions of the frequency-domain mixed signals $X(f, \tau)$ as

[Formula 33]

$$X(f, \tau) = \sum_{p=1}^{M} A_p(f) Y_p(f, \tau) \tag{32}$$

Here, $A_p(f)$ denotes basis vectors, each of which corresponds to a separated signal $Y_p(f, \tau)$ at each frequency. The basis vectors $A_p(f)$ calculated according to Equation (31) are stored in memory area 1104 of the memory 1100 (step S111).

Then, the basis vector clustering section 1142 normalizes all basis vectors $A_p(f)$ ($p=1, \ldots, M$ and $f=0, F_s/L, \ldots,$ $f_s(L-L)/L$). The normalization is performed so that the normalized basis vectors $A_p(f)$ form clusters that are dependent only on the positions of multiple signal sources when the convolutive mixture of signals originated from the multiple sources are approximated as a given model (for example a near-field model). In this example, frequency normalization and norm normalization similar to those used in the first embodiment are performed.

The frequency normalization is performed by the frequency normalizing section 1142*a* of the basis vector clustering section 1142 (FIG. 17B). In particular, the frequency normalizing section 1142*a* reads basis vectors $A_p(f)$ ($p=1, \ldots, M$ and $f=0, f_s/L, \ldots, F_s(L-L)/L$) from memory area 1104 of the memory 1100 and normalizes them to frequency-normalized vectors $A_p'(f)$ that are independent of frequency and stores them in memory area 1105 of the memory 1100 (step S112). The normalization is performed for each element $A_{qp}(f)$ of the basis vector $A_p(f)$ (The normalization will be detailed later). The norm normalization is performed by the norm normalizing section 1142*b* of the basis vector clustering section 1142 (FIG. 17B). In particular, the norm normalizing section 1142*b* reads frequency-normalized vectors $A_p'(f)$ from memory area 1105 of the memory 1100, normalizes them to normalized basis vectors $A_p''(f)$ whose norm has a predetermined value (1 in this example), and stores them in memory area 1106 of the memory 1100 (step S113). The normalization is performed for each frequency-normalized vector $A_p'(f)$ (The normalization will be detailed later).

After the completion of the normalization of the basis vectors, the clustering section 1142*c* (FIG. 17B) identifies M clusters $C_i$ ($i \in \{1, \ldots, M\}$) formed by the normalized basis vectors $A_p''(f)$. In this example, the clustering section 1142*c* reads the normalized basis vectors $A_p''(f)$ from memory area 1106 of the memory 1100, clusters them into M clusters $C_i$ ($i=1, \ldots, M$), and stores information identifying each of the clusters $C_i$ (for example information indicating normalized basis vectors $A_p''(f)$ that belongs to the cluster) and the centroid (center vector) of the cluster $C_i$ in memory areas 1109 and 1110, respectively, of the memory 1100 (step S114). The clustering is performed so that the total sum U of sums of squares $U_i$ of the elements (normalized basis vectors $A_v''(f)$) of each cluster $C_i$ and the centroid $\eta_i$ of the cluster $C_i$

[Formula 34]

$$U = \sum_{i=1}^{M} U_i \tag{33}$$

$$U_i = \sum_{A_v''(f) \in C_i} \|A_v''(f) - \eta_i\|^2$$

is minimized. The minimization can be effectively performed by using the k-means clustering described in Non-patent literature 6, for example. The centroid $\eta_i$ of a cluster $C_i$ can be calculated as

[Formula 35]

$$\eta_i = \frac{\sum_{A_v''(f) \in C_i} A_v''(f)/|C_i|}{\left\| \sum_{A_v''(f) \in C_i} A_v''(f)/|C_i| \right\|} \tag{34}$$

where $|C_i|$ is the number of elements (normalized basis vectors $A_v''(f)$) of a cluster $C_i$ and $\|*\|$ is the norm of a vector "*". While the square of the Euclidean distance is used as the distance, it may be its generalized distance, such as the Minkowski distance.

Once M clusters $C_i$ are obtained, the variance determining section 1142d (FIG. 17B) selects a cluster that corresponds to the target signal and stores selection information I(f) indicating the selected cluster in memory area 1111 of the memory 1100 (step S115). In the third embodiment, the variance $U_i/|C_i|$ of clusters is used as an indicator to select separated signals including the target signal. That is, the normalization of basis vectors in the third embodiment is performed in such a manner that, when the convolutive mixture of signals originated from multiple sources are approximated as a predetermined model, the normalized basis vectors are dependent only on the positions of the sources. However, there are various factors in a real environment that are not reflected in such a model. The discrepancy between a real environment and a model increases as the distance from a signal source to a sensor increases. For example, wave components reflected by objects such as walls are not taken into consideration in a near-field model and the ratio of the reflected wave components to a direct wave component increases as the distance between the signal source and a sensor increases. Therefore, a model becomes improper as the signal goes away from the sensor. Consequently, signals closer to a sensor can be normalized under conditions closer to the real environment and therefore the variance of clusters caused by a discrepancy between the real environment and the model can be reduced. In the third embodiment, a signal near a sensor is selected as the target signal. Therefore, a cluster that has a smaller variance is simply selected as the cluster corresponding to the target signal. The selection procedure (step S1115) will be detailed later.

After the selection information I(f) for each frequency f is computed, a selection signal $Y_{I(f)}(f, \tau)$ at each frequency f and its corresponding basis vector $A_{I(f)}(f)$ are selected. In particular, the selecting section 1143 first reads the selection information I(f) from memory area 1111 of the memory 1100. The selecting section 1143 then reads a separated signal corresponding to the selection information I(f) from memory area 1107 as the selection signal $Y_{I(f)}(f, \tau)$, reads its corresponding basis vector $A_{I(f)}(f)$ from memory area 1104, and stores them in memory area 1111 (step S116).

The normalizations at step S112 and S113 (FIG. 20) will be detailed below.

[Details of Step S112 (Frequency Normalization)]

Figure 21A:
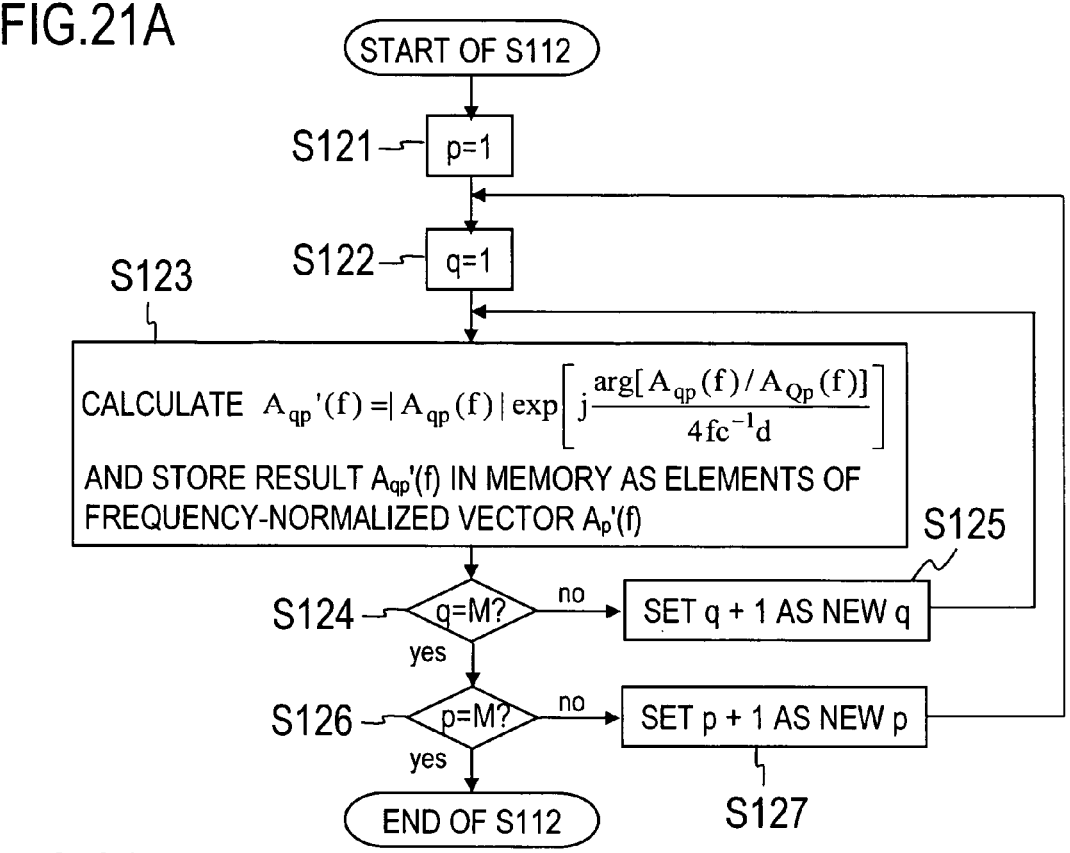
FIG. 21A is a flowchart illustrating details of frequency normalization at step S112.

FIG. 21A is a flowchart illustrating details of the frequency normalization performed at step S112.

First, the control section 1170 (FIG. 16) assigns 1 to parameter p and stores it in the temporary memory 1180 (step S121). The control section 1170 also assigns 1 to parameter q and stores it in the temporary memory 1180 (step S122). Then, the frequency normalizing section 1142a (FIG. 17B) reads the parameters d, c, and Q described above from memory area 1108 of the memory 1100, reads the elements $A_{qp}(f)$ of the basis vector $A_p(f)$ from memory area 1104, and reads the parameters p and q from the temporary memory 1180. The frequency normalizing section 1142a then performs on the elements $A_{qp}(f)$ of the basis vector $A_p(f)$ the following calculation

[Formula 36]

$$A'_{qp}(f) = |A_{qp}(f)| \exp\left[ j \frac{\arg[A_{qp}(f)/A_{Qp}(f)]}{4 f c^{-1} d} \right] \quad (35)$$

and stores the results $A_{qp}'(f)$ in memory area 1105 of the memory 1100 as the elements $A_{qp}'(f)$ of a frequency-normalized vector $A_p'(f)$ (step S123). Here, arg[·] represents an argument, exp is Napier's number, and j is an imaginary unit. In particular, the normalization is performed according to Equations (15) and (16) given earlier.

Then, the control section 1170 determines whether the value of parameter q stored in the temporary memory 1180 satisfies q=M (step S124). If not q=M, the control section 1170 sets a calculation result q+1 as a new value of parameter q, stores it in the temporary memory 1180 (step S125), and then returns to step S123. On the other hand, if q=M, the control section 1170 further determines whether p=M (step S126).

If not p=M, the control section 1170 sets a calculation result p+1 as a new value of parameter p, stores it in the temporary memory 1180 (step S127), and then returns to step S122. On the other hand, if p=M, the control section 1170 terminates processing at step S12. (End of the detailed description of step S112 (frequency normalization))

[Details of Step S113 (Norm Normalization)]

Figure 21B:
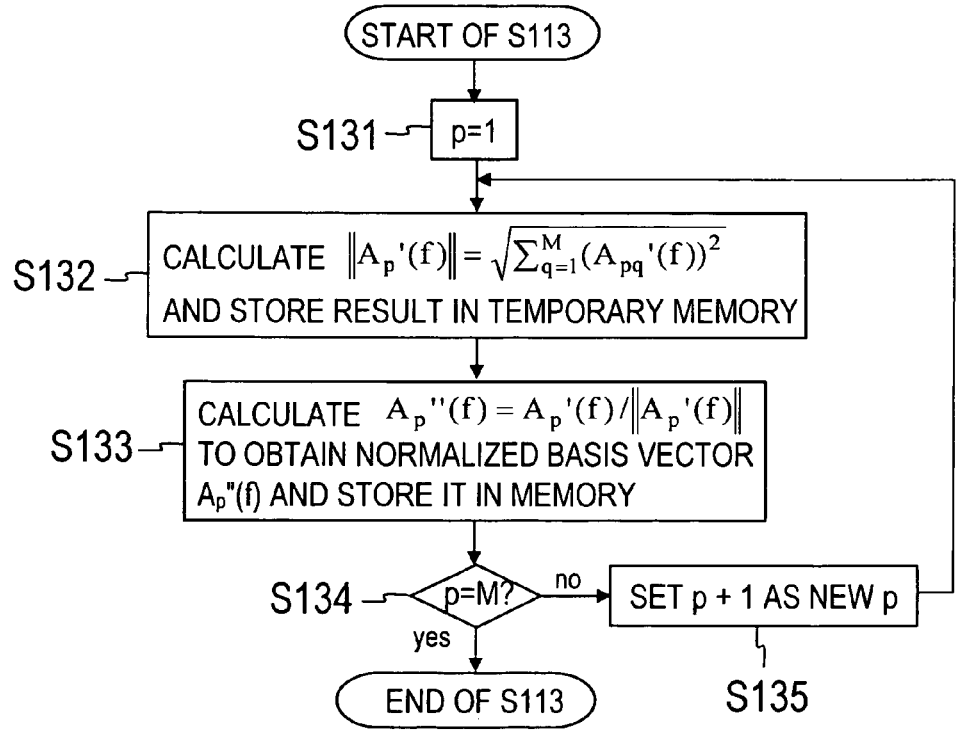
FIG. 21B is a flowchart illustrating details of norm normalization at step S113.

FIG. 21B is a flowchart illustrating details of the norm normalization performed at step S113.

First, the control section 1170 assigns 1 to parameter p and stores it in the temporary memory 1180 (step S131). Then, the norm normalizing section reads the elements $A_{qp}'(f)$ of the frequency-normalized vector $A_p'(f)$ from memory area 1105 of the memory 1100, calculates

[Formula 37]

$$\|A'_p(f)\| = \sqrt{\sum_{q=1}^{M} (A'_{pq}(f))^2} \quad (38)$$

to obtain the norm $\|A_p'(f)\|$ of the frequency-normalized vector $A_p'(f)$, and stores the frequency-normalized vector $A_p'(f)$ and its norm $\|A_p'(f)\|$ in the temporary memory 1180 (step S132).

Then, the norm normalizing section 1142b reads the frequency-normalized vector $A_p'(f)$ and its norm $\|A_p'(f)\|$ from the temporary memory 1180, calculates $$A_p''(f) = A_p'(f)/\|A_p'(f)\| \quad (39)$$

and stores the calculated normalized basis vector $A_p''(f)$ in memory area 1106 of the memory (step S133). Then, the control section 1170 determines whether the value of parameter p stored in the temporary memory 1180 satisfies p=M (step S134). If not p=M, the control section 1170 sets a calculation result p+1 as a new value of parameter p, stores it in the temporary memory 1180 (step S135), and then returns to step S132. On the other hand, if p=M, the control section 1170 terminates processing at step S113. The reason why the normalized basis vectors $A_p''(f)$ form clusters has been described with respect to the first embodiment. (End of the detailed description of step S113 (norm normalization))

The normalized basis vectors $A_p''(f)$ thus generated are independent of frequency and are dependent only on the positions of signal sources as described in the first embodiment.

[Details of Procedure for Selecting Selection Signals (Step S115)]

Details of the procedure for selecting selection signals (step S115) mentioned above will be illustrated below.

Cluster Selection Procedure 1

Figure 22:
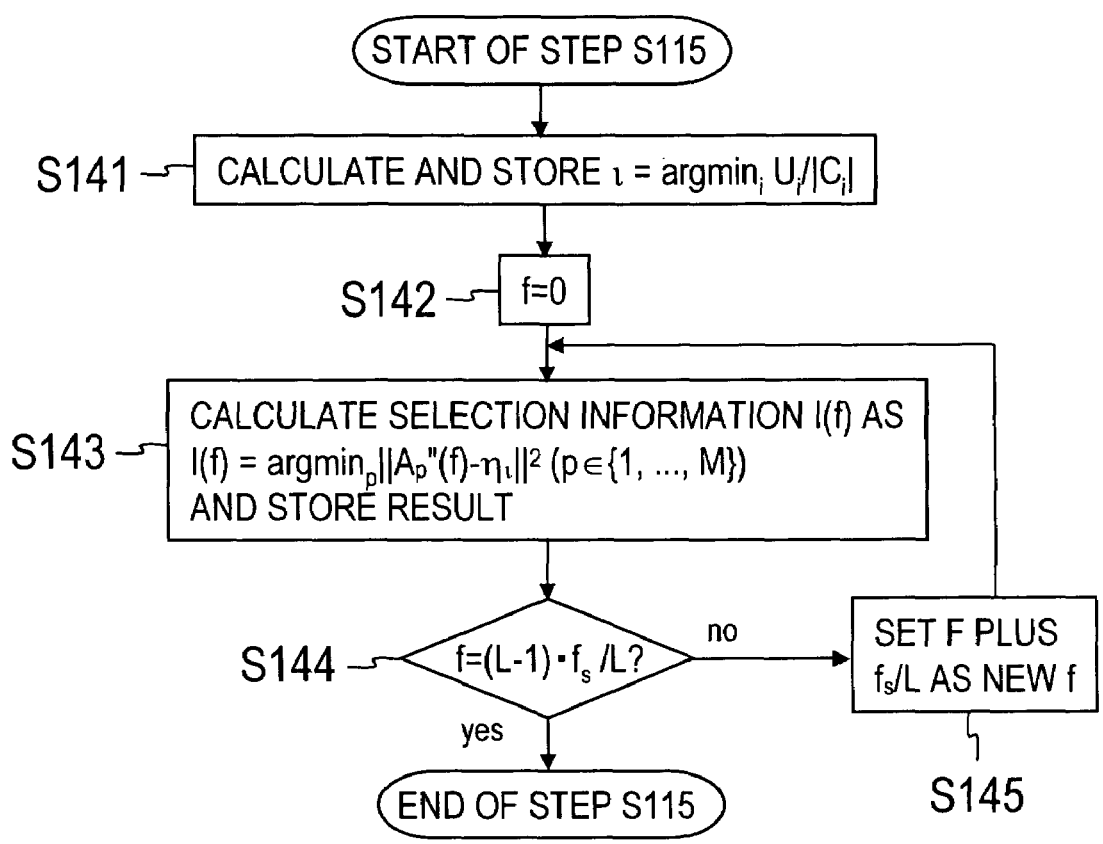
FIG. 22 is a flowchart illustrating details of a process for selecting a selection signal (step S115)

A first example selects the cluster that has the smallest variance as the cluster corresponding to a target signal. FIG. 22 is a flowchart illustrating the first example.

First, the variance determining section 1142d (FIG. 17B) reads information identifying clusters $C_i$ ($i \in \{1, \ldots, M\}$) from memory area 1109 of the memory 1100 and also reads normalized basis vectors $A_p''(f) \in C_i$ and their centroids $\eta_i$ from memory areas 1106 and 1110, respectively. The variance determining section 1142d then calculates $U_i$ for each "i" according to Equation (33), counts the elements (normalized basis vectors $A_v''(f)$) that belong to $C_i$ to obtain $|C_i|$, calculates the variance of cluster $C_i$, $U_i/|C_i|$, and stores it in the temporary memory 1180. Then, the variance determining section 1142d selects the smallest one of the variances $U_i/|C_i|$ stored in the temporary memory 1180 and stores information indicating the cluster corresponding to the smallest variance in the temporary memory 1180 as cluster selection information $$\iota = \mathrm{argmin}_i U_i/|C_i| \qquad (40)$$

(step S141). In Equation (40), $\mathrm{argmin}_i *$ represents i that minimizes the value of "*".

Then, the control section 1170 (FIG. 16) assigns 0 to parameter f and stores it in the temporary memory 1180 (step S142).

Then, the variance determining section 1142d reads the cluster selection information $\iota$ from the temporary memory 1180 and reads the centroid $\eta_\iota$ that corresponds to the cluster selection information t from memory area 1110 of the memory 1100. The variance determining section 1142d also reads the normalized basis vectors $A_p''(f)$ $\{p \in \{1, \ldots, M\}\}$ from memory area 1106 of the memory 1100. The variance determining section 1142d then calculates, for each frequency f, selection information $$I(f) = \mathrm{argmin}_p \|A_p''(f) - \eta_\iota\|^2 \qquad (41)$$

and stores it in memory area 1111 (step S143).

Then, the control section 11170 reads parameter f from the temporary memory 1180 and determines whether $f = (L-1) \cdot f_s/L$ (step S144). If not $f = (L-1) \cdot f_s/L$, the control section 1170 adds $f_s/L$ to the value of parameter f, stores the result in the temporary memory 1180 as a new value of parameter f (step S145), and then returns to step S143. On the other hand, if $f = (L-1) \cdot f/L$, the control section 1170 terminates step S115.

Cluster Selection Procedure 2

A second example selects clusters that have variances smaller than a predetermined threshold value as the clusters corresponding to a target signal. The threshold value is for example an empirically determined value or a value based on experimental results and is stored in the memory 1100 beforehand.

The variance determining section 1142d sorts the variances $U_i/|C_i|$ of clusters in ascending or descending order by using any of well-known sorting algorithms, instead of performing step S141 (FIG. 22). The variance determining section 1142d then reads the threshold value stored in the memory 1100, selects clusters that have variances $U_i/|C_i|$ smaller than the threshold value, and stores the set of suffixes i that correspond to the selected clusters in the temporary memory 1180 as cluster selection information $\iota$. The rest of the procedure is the same as cluster selection procedure 1.

Cluster Selection Procedure 3

A third example selects not only the cluster that has the smallest variance but also a predetermined number of clusters in ascending order of variance $U_i/|C_i|$ (for example, three clusters in ascending order of variance) as clusters corresponding to a target cluster.

The variance determining section 1142d sorts the variances $U_i/|C_i|$ of clusters in ascending or descending order using any of well-known sorting algorithms, instead of performing processing at step S141 (FIG. 22). The variance determining section 1142d then selects a predetermined number of clusters in ascending order of variance $U_i/|C_i|$. Then, the variance determining section 1142d stores the set of suffixes i corresponding to the selected clusters in the temporary memory 1180 as cluster selection information $\iota$. The rest of the procedure is the same as cluster selection procedure 1.

In stead of cluster selection procedure 1, a procedure which selects any of the clusters that have the second smallest variance or larger may be used, or a combination of parts of the cluster selection procedures described above may be used. (End of the description of Step S115 and of details of step S103 (processing by the target signal selecting section 1140)

[Details of Processing by the Time-Frequency Masking Section 1150 (Steps S104 and S105)]

Processing by the time-frequency masking section 1150 will be described below. As mentioned earlier, the time-frequency masking section 1150 suppresses interfering signal components remaining in selection signals $Y_{I(f)}(f, \tau)$ selected by the target signal selecting section 1140. The reason why interfering signals remain in the selection signals $Y_{I(f)}(f, \tau)$ will be described first.

Focusing only on selection signals, equation (30) given above can be rewritten as $$Y_{I(f)}(f,\tau) = W_{I(f)}^H(f) \cdot X(f,\tau) \qquad (42)$$

If Equation (4) is substituted in Equation (42) and frequency f is omitted, the equation can be rewritten as.

[Formula 38]

$$Y_I(\tau) = W_I^H \cdot H_I \cdot S_I(\tau) + \sum_{k=1,\ldots,I-1,I+1,\ldots,N} W_I^H \cdot H_k \cdot S_k(\tau) \qquad (43)$$

If $N \leq M$, $W_1$ that satisfies $W_1^H \cdot H_k = 0$, $\forall k \in \{1, \ldots, I-1, I+1, \ldots, N\}$ can be set by using independent component analysis (ICA). Then, the second term in Equation (43) will be 0. However, if the number N of signal sources is greater than the number M of sensors, which is a more common situation, there is $\kappa \subseteq \{1, \ldots, I-1, I+1, \ldots, N\}$ that results in $W_1^H \cdot H_k \neq 0$, $\forall k \in \kappa$. In this case, selection signals $Y_1(f)$ include unnecessary residual components (residual components of interfering signals)

[Formula 39]

$$\sum_{k \in K}^{N} W_I^H \cdot H_k \cdot S_k(\tau)$$

(hereinafter f is not omitted).

The purpose of using the time-frequency masking section 1150 is to suppress such unnecessary residual components included in selection signals $Y_1(f, \tau)$, thereby generating masked selection signals $Y_1'(f, \tau)$ including less residual interfering signal components. For this purpose, the mask generating section 1151 (FIG. 18) of the time-frequency masking section 1150 generates a time-frequency mask $0 \leq M(f, \tau) \leq 1$ that takes on a smaller value for a time-frequency slot containing more residual interfering signal components and a greater value for a time-frequency slot containing less residual interfering signal components. Then, the masking section 1152 performs masking in accordance with $$Y_{I(f)}'(f,\tau) = M(f,\tau) \cdot Y_{I(f)}(f,\tau) \tag{44}$$

and outputs masked selection signals $Y_{I(f)}'(f, \tau)$. The mask generation will be detailed below.

[Details of Step S104 (Processing by Mask Generating Section 1151)]

Figure 23:
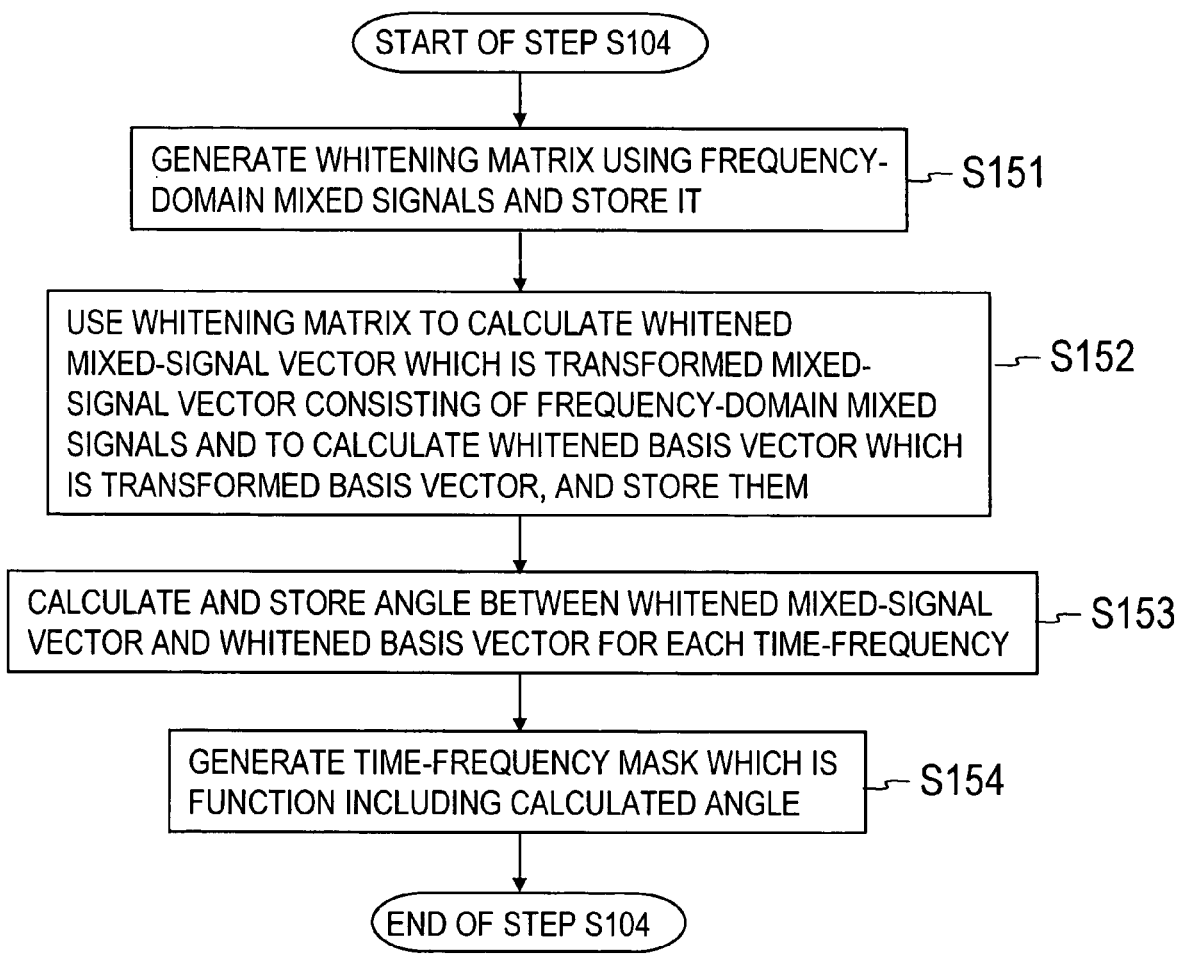
FIG. 23 is a flowchart illustrating details of step S104 in FIG. 19.

FIG. 23 is a flowchart illustrating details of step S104 in FIG. 19. With reference to the flowchart, step S104 (processing by the mask generating section 1151) will be detailed below.

The mask generating section 1151 in this example obtains the angle $\theta_{I(f)}(f, \tau)$ between a mixed-signal vector $X(f, \tau)$ and a basis vector $A_{I(f)}(f)$ corresponding to a selection signal in a space in which the frequency-domain mixed-signal vector $X(f, \tau)$ is whitened (a whitening space), and generates a time-frequency mask based on the angle $\theta_{I(f)}(f, \tau)$. Whitening transforms a mixed-signal vector $X(f, \tau)$ into a linear form so that its covariance matrix becomes equal to an identity matrix.

For that purpose, first the whitening matrix generating section 1151a uses frequency-domain mixed signals $X_q(f, \tau)$ to generate a whitening matrix $V(f)$ which transfers a mixed-signal vector $X(f, \tau)$ into a whitening space (step S151). In this example, the whitening matrix generating section 1151a reads the mixed signals $X_q(f, \tau)$ from memory area 1102 of the memory 1100, computes $V_{(f)} = R(f)^{-1/2}$, where $R(f) = \langle X(f, \tau) \cdot X(f, \tau)^H \rangle_\tau$, as a whitening matrix $V(f)$, and stores it in memory area 1112. Here, $\langle * \rangle_\tau$ represents the time-averaged vector of a vector "*", "*$^H$" represents the complex conjugate transposed matrix of the vector "*", $R^{-1/2}$ represents a matrix that satisfies $R^{-1/2} \cdot R \cdot (R^{-1/2})^H = I$ (where I is the identity matrix). A typical method for calculating the whitening matrix $V(f)$ is to decompose $R(f)$ into eigenvalues as $R(f) = E(f) \cdot D(f) \cdot E(f)^H$ (where $E(f)$ is an unitary matrix and $D(f)$ is a diagonal matrix) and calculate $V(f) = D(f)^{-1/2} \cdot E(f)^H$. Here, $D(f)^{-1/2}$ is equivalent to a diagonal matrix obtained by raising each element of the diagonal matrix $D(f)$ to the $(-\frac{1}{2})$-th power and therefore can be calculated by raising each element to the $(-\frac{1}{2})$-th power.

Then, the whitening section 1151b uses the whitening matrix $V(f)$ to map the mixed-signal vector $X(f, \tau)$ to the whitening space to obtain a whitened mixed-signal vector $Z(f, \tau)$ and map the basis vector $A_{I(f)}(f)$ to the whitening space to obtain a whitened basis vector $B_{I(f)}(f)$ (step S152). In this example, the whitening section 1151b first reads mixed signals $X_q(f, \tau)$ from memory area 1102 of the memory 1100, the basis vectors $A_{I(f)}(f)$ corresponding to selection signals $Y_{I(f)}(f, \tau)$ from memory area 1111, and the whitening matrix $V(f)$ from memory area 1112. The whitening section 1151b then calculates a whitened mixed-signal vector $Z(f, \tau)$ using the operation $Z(f, \tau) = V(f) \cdot X(f, \tau)$, calculate a whitened basis vector $B_{I(f)}(f)$ using the operation $B_{I(f)}(f) = V(f) \cdot A_{I(f)}(f)$, and then stores them in memory area 1112 of the memory 1100.

Then, the angle computing section 1151c computes the angle $\theta_{I(f)}(f, \tau)$ between the whitened mixed-signal vector $Z(f, \tau)$ and the whitened basis vector $B_{I(f)}(f)$ for each time-frequency (step S153). In this example, the angle computing section 1151c first reads the whitened mixed-signal vector $Z(f, \tau)$ and the whitened basis vector $B_{I(f)}(f)$ from memory area 1112 of the memory 1100. The angle computing section 1151c then calculates the angle $\theta_{I(f)}(f, \tau)$ in each time-frequency slot as $$\theta_{I(f)}(f,\tau) = \cos^{-1}(|B_{I(f)}^H(f) \cdot Z(f,\tau)| / \|B_{I(f)}(f)\| \cdot \|Z(f,\tau)\|) \tag{45}$$

and stores it in memory area 1112. In Equation (45), |*| represents the absolute value of a vector "*" and ||*|| represents the norm of the vector "*".

Figure 24A:
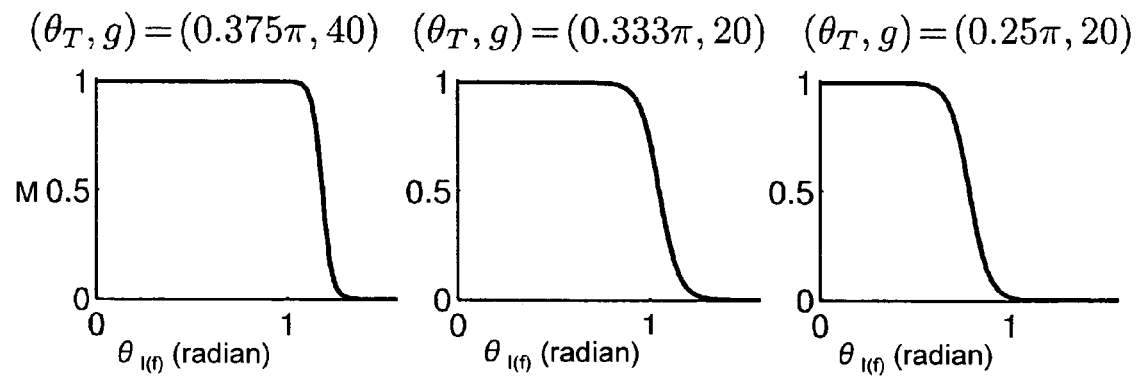
FIG. 24A illustrates time-frequency masks $M(f, \tau)$ calculated for two real-number parameters $\theta_T$, g according to Equation (46)

Then, the function operation section 1151d generates a time-frequency mask $M(f, \tau)$, which is a function including the angle $\theta_{I(f)}(f, \tau)$ as an element (step S154). In this example, the function operation section 1151d first reads real-number parameters $\theta_T$ and g from memory area 1108 of the memory 1100 and the angle $\theta_{I(f)}(f, \tau)$ from memory area 1112. The function operation section 1151d then calculates a logistic function $$M(\theta(f, \tau)) = \frac{1}{1 + e^{g \cdot (\theta(f,\tau) - \theta_T)}} \tag{46}$$

as the time-frequency mask $M(f, \tau)$. The real-number parameters $\theta_T$ and g are parameters that specify the turning point and gradient, respectively, of the time-frequency mask $M(f, \tau)$, and are stored in memory area 1108 during preprocessing. FIG. 24A shows an exemplary time-frequency mask $M(f, \tau)$ calculated using the two real-number parameters $\theta_T$, and g according to Equation (46). As shown, the smaller the real-number parameter $\theta_T$, the narrower the area where the time-frequency mask $M(f, \tau)$ takes on a large value (1 in this example). This appears in the tendency that, as the value of the real-number parameter $\theta_T$ decreases, the quantity of interfering signal components remaining in the masked selection signal $Y_{I(f)}'(f, \tau)$ decreases but at the same time the masked selection signal $Y_{I(f)}'(f, \tau)$ becomes unnatural. For example, if the target signal is a speech signal, musical noise increases as the value of the real-number parameter $\theta_T$ decreases. Furthermore, the waveform of the time-frequency mask $M(f, \tau)$ (transition from a large value (1 in this example) to a small value (0 in this example)) steepens with increasing value of the real-number parameter g. To minimize interfering signal components remaining in the masked selection signal $Y_{I(f)}'(f, \tau)$ while keeping the masked selection signal $Y_{I(f)}'(f, \tau)$ natural, it is desirable to smoothen the waveform of the time-frequency mask $M(f, \tau)$ by minimizing the value of the real-number parameter g.

Values of the real-number parameters $\theta_T$ and g may be set for each frequency. An additional real-number parameter $\alpha$ may be introduced and the logistic function $$M(\theta(f,\tau)) = \frac{\alpha}{1+e^{g\cdot(\theta(f,\tau)-\theta_T)}} \quad (47)$$

may be used as the time-frequency mask $M(f, \tau)$. Any other function may be used as the time-frequency mask $M(f, \tau)$ that takes on a larger value in a region where the angle $\theta_{I(f)}(f, \tau)$ is close to 0 and takes on a smaller value in a region where the angle $\theta_{I(f)}(f, \tau)$ is large, that is, $0 \leq M(\theta(f, \tau)) \leq 1$. (End of the detailed description of step S104 (processing by the mask generating section 1151))

[Details of Step S105 (Processing by the Masking Section 1152)]

The masking section 1152 reads the selection signal $Y_{I(f)}'(f, \tau)$ from memory area 1111 of the memory 1100 and the time-frequency mask $M(f, \tau)$ from memory area 1112. The masking section 1152 then calculates a masked selection signal $Y_{I(f)}'(f, \tau)$ as $$Y_{I(f)}'(f,\tau) = M(f,\tau) \cdot Y_{I(f)}(f,\tau) \quad (48)$$

and stores it in memory area 1113 of the memory 1100. (End of the detailed description of step S105 (processing by the masking section 1152))

[Effects of the Time-Frequency Masking]

Effects of the time-frequency mask $M(f, \tau)$ described above will be described next.

If the sparseness of signal sources is so high that the signal sources $S_k(f, \tau)$ is likely to approach 0, Equation (4) can be approximated as

[Formula 40]

$$X(f,\tau) \approx H_k(f) \cdot S_k(f,\tau), k \in \{1,\ldots,N\} \quad (49)$$

where k is the suffix associated with each signal source and is determined by each time-frequency position $(f, \tau)$. Accordingly, in a time-frequency position $(f, \tau)$ where only or practically only the target signal is active, the whitened mixed vector $Z(f, \tau)$ can be approximated as

[Formula 41]

$$Z(f,\tau) \approx V(f) \cdot H_{I(f)}(f) \cdot S_{I(f)}(f,\tau) \approx V(f) \cdot A_{I(f)}(f) \cdot Y_{I(f)}(f,\tau)$$

where $Y_{I(f)}(f, \tau)$ is a scalar. As mentioned above, the whitened basis vector $B_{I(f)}(f)$ is $$B_{I(f)}(f) = V(f) \cdot A_{I(f)}(f) \quad (50)$$

It can be seen from the foregoing that the angle $\theta_{I(f)}(f, \tau)$ between a whitened mixed-signal vector $Z(f, \tau)$ and a whitened basis vector $B_{I(f)}(f)$ approaches 0 at a time-frequency position $(f, \tau)$ where only or practically only the target signal is active. As stated above, the time-frequency mask $M(f, \tau)$ takes on a larger value in a region where the angle $\theta_{I(f)}(f, \tau)$ is closer to 0. Therefore, the time-frequency mask $M(f, \tau)$ extracts a selection signal $Y_{I(f)}(f, \tau)$ at a time-frequency position $(f, \tau)$ where only or practically only the target signal is active as a masked selection signal $Y_{I(f)}'(f, \tau)$ (see Equation (48)).

On the other hand, if $I(f)=1$, the whitened mixed-signal vector $Z(f, \tau)$ in a time-frequency position $(f, \tau)$ where the target signal is almost inactive can be approximated as

[Formula 42]

$$Z(f,\tau) \approx \sum_{k=2}^{N} V(f) \cdot H_k(f) \cdot S_k(f,\tau) \quad (51)$$

Here, if the number N of signal sources is equal to or less than the number M of sensors, vectors $V(f) \cdot H_1(f), \ldots, V(f) \cdot H_k(f)$ in a whitening space are orthogonal to each other. $S_k(f, \tau)$ in Equation (51) is a scalar value. Thus, it can be seen that the angle $\theta_{I(f)}(f, \tau)$ between the whitened mixed-signal vector $Z(f, \tau)$ and the whitened basis vector $B_{I(f)}(f)$ increases. If N>M, the whitened basis vector $B_I(f)(I(f)=1)$ tends to form a large angle with vectors $V(f) \cdot H_2(f), \ldots, V(f) \cdot H_k(f)$ other than the target signal. It can be seen from the foregoing that the angle $\theta_{I(f)}(f, \tau)$ takes on a large value at a time-frequency position $(f, \tau)$ where the target signal is almost inactive. Because the time-frequency mask $M(f, \tau)$ takes on a small value in a region where the angle $\theta_{I(f)}(f, \tau)$ is far from 0, the time-frequency mask $M(f, \tau)$ excludes a selection signal $Y_{I(f)}(f, \tau)$ at a time-frequency position $(f, \tau)$ where the target signal is almost inactive from a masked selection signal $Y_{I(f)}'(f, \tau)$ (see Equation (28)).

It can be seen from the foregoing that the time-frequency masking using the time-frequency mask $M(f, \tau)$ further suppresses interfering signal components remaining in the selection signal $Y_{I(f)}(f, \tau)$.

Figure 24B:
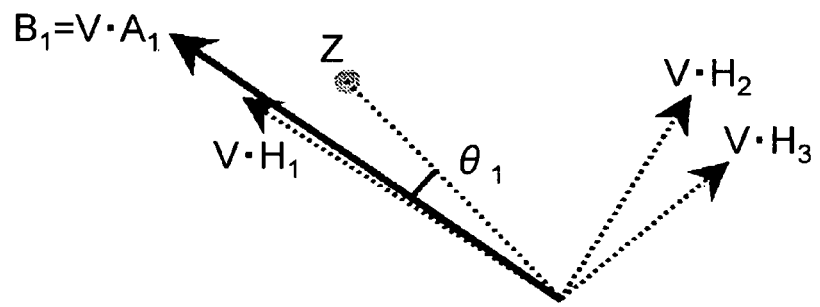
FIG. 24B shows coexistence of a vector $V(f) \cdot H_1(f)$ corresponding to a target signal ($I(f)=1$) with a vector $V(f) \cdot H_2(f)$, $V(f) V(f) \cdot H_3(f)$ that correspond to interfering signals at a certain time-frequency position $(f, \tau)$.

The time-frequency masking is effective especially for signals having sparseness such as speech or music. Less sparse signals contain a large quantity of other interfering signal components even in a time-frequency position $(f, \tau)$ where a target signal is active, therefore the approximation by Equation (49) cannot hold and the angle $\theta_{I(f)}(f, \tau)$ will be far from 0. That is, if a signal is not sparse, vectors $V(f) \cdot H_2(f)$ and $V(f) \cdot H_3(f)$ corresponding to interfering signals exist together with the vector $V(f) \cdot H_1(f)$ corresponding to the target signal $(I(f)=1)$ in a time-frequency position $(f, \tau)$ as shown in FIG. 24B, for example. In this example, the whitened mixed-signal vector $Z(f, \tau)$ is

[Formula 43]

$$Z(f,\tau) \approx \sum_{k=1}^{3} V(f) \cdot H_k(f) \cdot S_k(f,\tau) \quad (52)$$

Therefore, the angle $\theta_{I(f)}(f, \tau)$ between the whitened mixed-signal vector $Z(f, \tau)$ and the whitened basis vector $B_{I(f)}(f)$ is also far from 0. This shows that a signal at a time-frequency position $(f, \tau)$ where the target signal is active can be excluded from masked selection signals $Y_{I(f)}'(f, \tau)$.

The time-frequency masking is also especially effective in a case where the power of a target signal is sufficiently large compared with that of interfering signals. That is, even in a situation where sparseness is low and other interfering signal components exist at a time-frequency position $(f, \tau)$ where the target signal is active, the approximation by Equation (49) is relatively likely to hold and the angle $\theta_{I(f)}(f, \tau)$ approaches 0 if the power of the target signal is sufficiently large compared with that of the interfering signals. For example, if the power of the target signal is sufficiently large compared with the power of interfering signals, the contribution of the interfering signals in Equation (52) is low and the angle $\theta_{I(f)}(f, \tau)$ between the whitened mixed-signal vector $Z(f, \tau)$ and the whitened basis vector $B_{I(f)}(f)$ approaches 0. This shows that the possibility that the signals at time-frequency position $(f, \tau)$ where the target signal is active will be excluded from the masked selection signals $Y_{I(f)}'(f, \tau)$ can be decreased. It also means that interfering signal components remaining in the masked selected signal $Y_{I(f)}'(f, \tau)$ can be reduced to a relatively low level. (End of detailed description of Step S105 (processing by the masking section 1152)

Fourth Embodiment (Example of the Second Aspect of the Invention)

The fourth embodiment of the present invention will be described below.

The fourth embodiment is a variation of the third embodiment and is the same as the third embodiment except that time-frequency masking using a time-frequency mask is not performed. The following description will focus on differences from the third embodiment and the description of the same elements as those in the third embodiment will be omitted.

<Configuration>

FIG. 25 is a block diagram showing an exemplary signal separating apparatus 1200 according to the fourth embodiment.

As shown in FIG. 25, the signal separating apparatus 1200 of the fourth embodiment differs from the signal separating apparatus 1001 in that the memory 1100 does not include memory areas 1112 and 1113 and the time-frequency masking section 1150 is not provided.

<Processing>

Processing performed in the signal separating apparatus 1200 according to the fourth embodiment will be described below.

Figure 26:
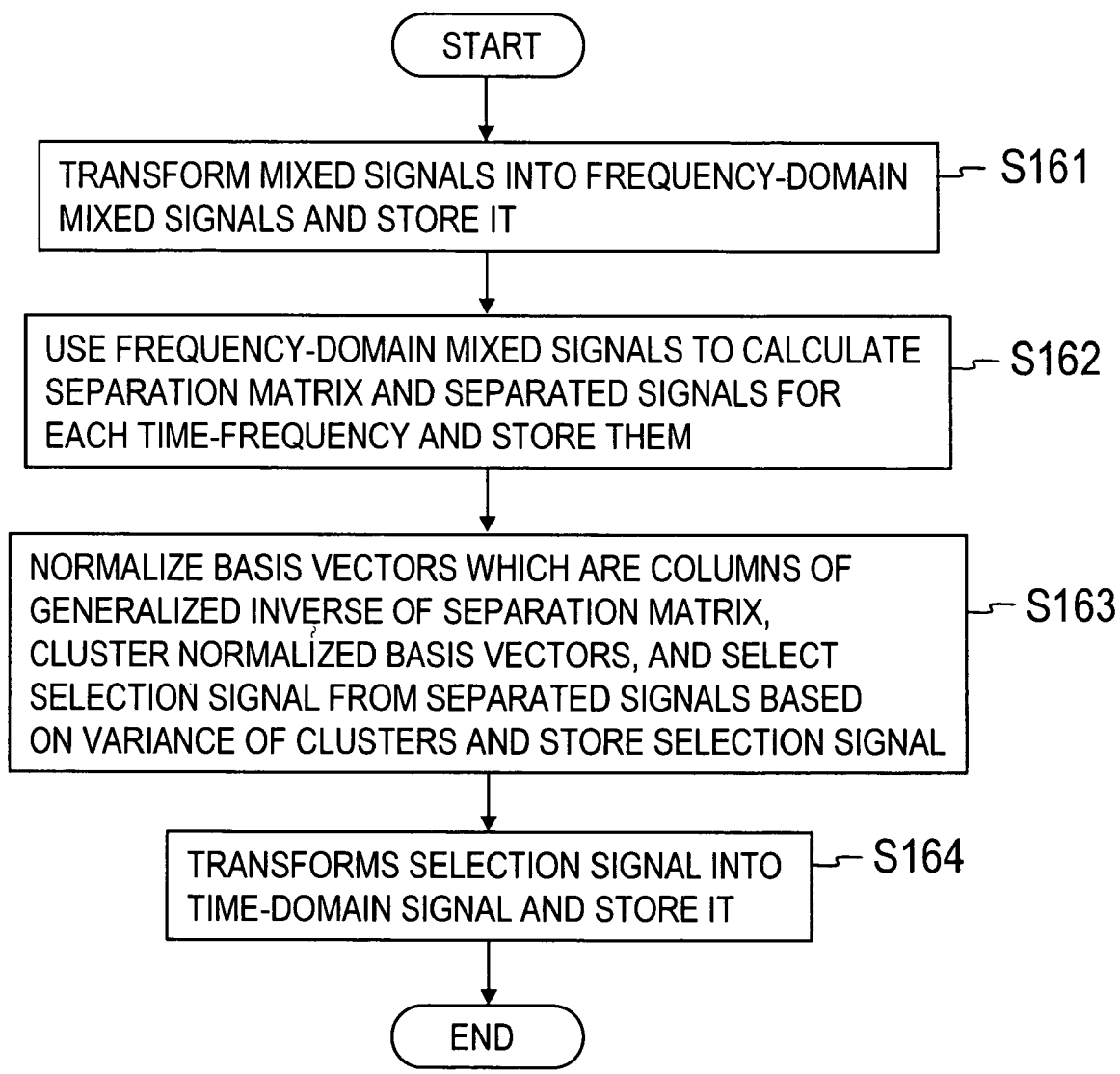
FIG. 26 is a flowchart illustrating a process performed in the signal separating apparatus according to the fourth embodiment.

FIG. 26 is a flowchart illustrating processing performed in the signal separating apparatus 1200 according to the fourth embodiment. The following description focuses on differences from the third embodiment.

First, as in the third embodiment, a frequency domain transforming section 1120 reads time-domain mixed signals $x_q(t)$ from memory area 1101 of a memory 1100. The frequency domain transforming section 1120 then transforms them into frequency-domain mixed signals $X_q(f, \tau)$ using a transformation such as a short-time Fourier transformation and stores them in memory area 1102 of the memory 1100 (step S161).

Then, a signal separating section 1130 reads the frequency-domain mixed signals $X_q(f, \tau)$ from memory area 1102 of the memory 1100. The signal separating section 1130 in this example applies independent component analysis (ICA) to a mixed-signal vector $X(f, \tau)=[X_1(f, \tau), \ldots, X_M(f, \tau)]^T$ consisting of the read mixed signals $X_q(f, \tau)$ to calculate a separation matrix of M rows and M columns $W(f)=[W_1(f), \ldots, W_M(f)]^H$ (where "$*^H$" is the complex conjugate transposed matrix of a matrix "$*$") and a separated signal vector $Y(f, \tau)=W(f) \cdot X(f, \tau)$ for each frequency f (step S162). The calculated separation matrix $W(f)$ is stored in memory area 1103 of the memory 1100. The separated signals $Y_p(f, \tau)(p \in \{1, \ldots, M\})$ constituting the separated signal vector $Y(f, \tau)=[Y_1(f, \tau), \ldots, Y_M(f, \tau)]^T$ are stored in memory area 1107.

Then, a target signal selecting section 1140 reads the separation matrix $W(f)$ from memory area 1103 of the memory 1100, normalizes basis vectors which are rows of its generalized inverse matrix, and clusters the normalized basis vectors. The target signal selecting section 1140 then selects selection signals $Y_{I(f)}(f, \tau)$ from the separated signals in memory area 1107 of the memory 1100 for each frequency using the variance of the clusters as the reference and stores them in memory area 1111 of the memory 1100 (step S1163).

Then, a time domain transforming section 1160 reads the selected separated signals $Y_{I(f)}(f, \tau)$ from memory area 1111 of the memory 1100 and applies a transformation such as a short-time inverse Fourier transformation to them to generate time-domain separated signals $y(t)$, and stores them in memory area 1114 of the memory 1100 (step S164).

Fifth Embodiment (Example of the Second Aspect of the Invention)

The fifth embodiment of the present invention will be described below.

The fifth embodiment is a variation of the third embodiment. The only difference from the third embodiment is the method for generating a time-frequency mask. The following description will focus on differences from the third embodiment and description of the same elements as those in the third embodiment will be omitted.

<Configuration>

Figure 27:
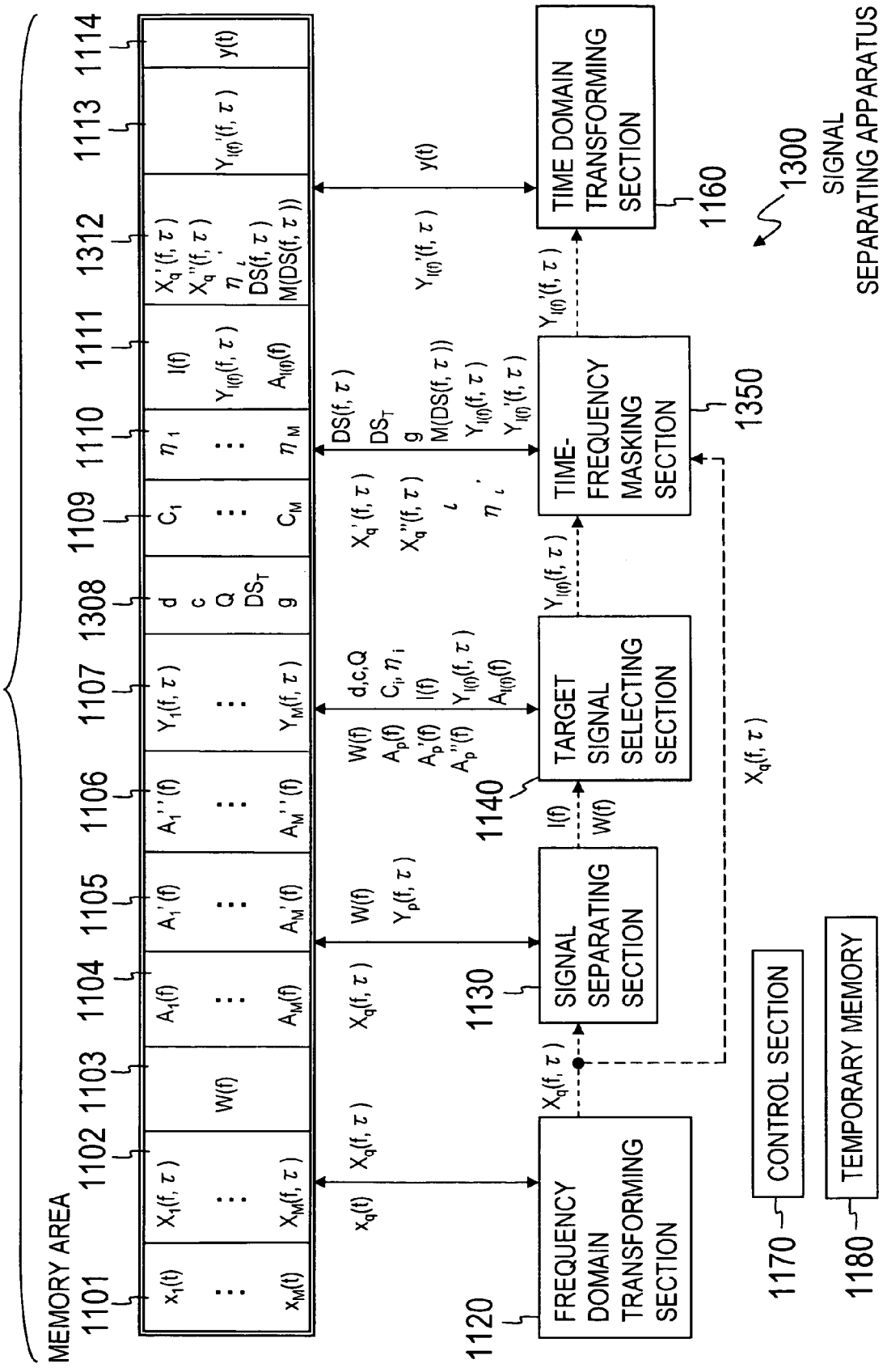
FIG. 27 is a block diagram illustrating a signal separating apparatus according to a fifth embodiment.
Figure 28A:
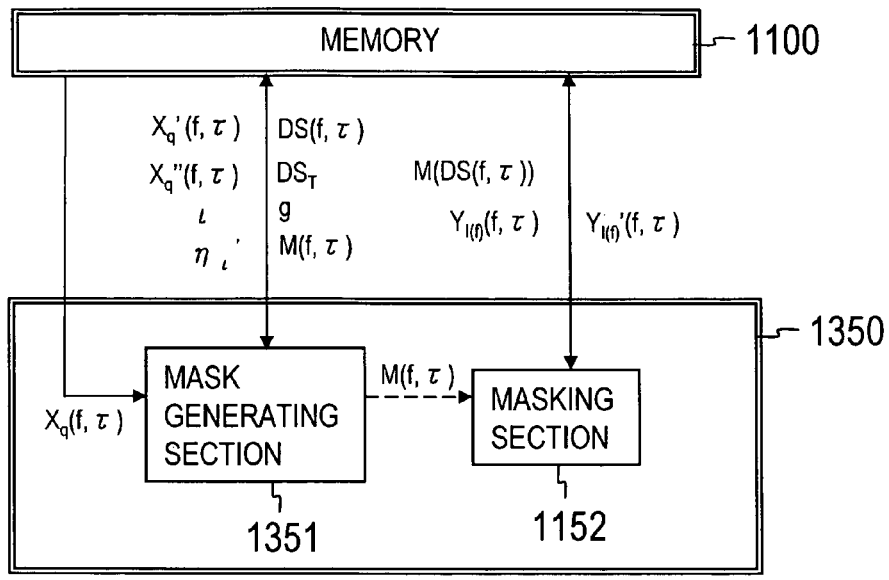
FIG. 28A is a block diagram showing a detailed configuration of a time-frequency masking section in FIG. 27.
Figure 28B:
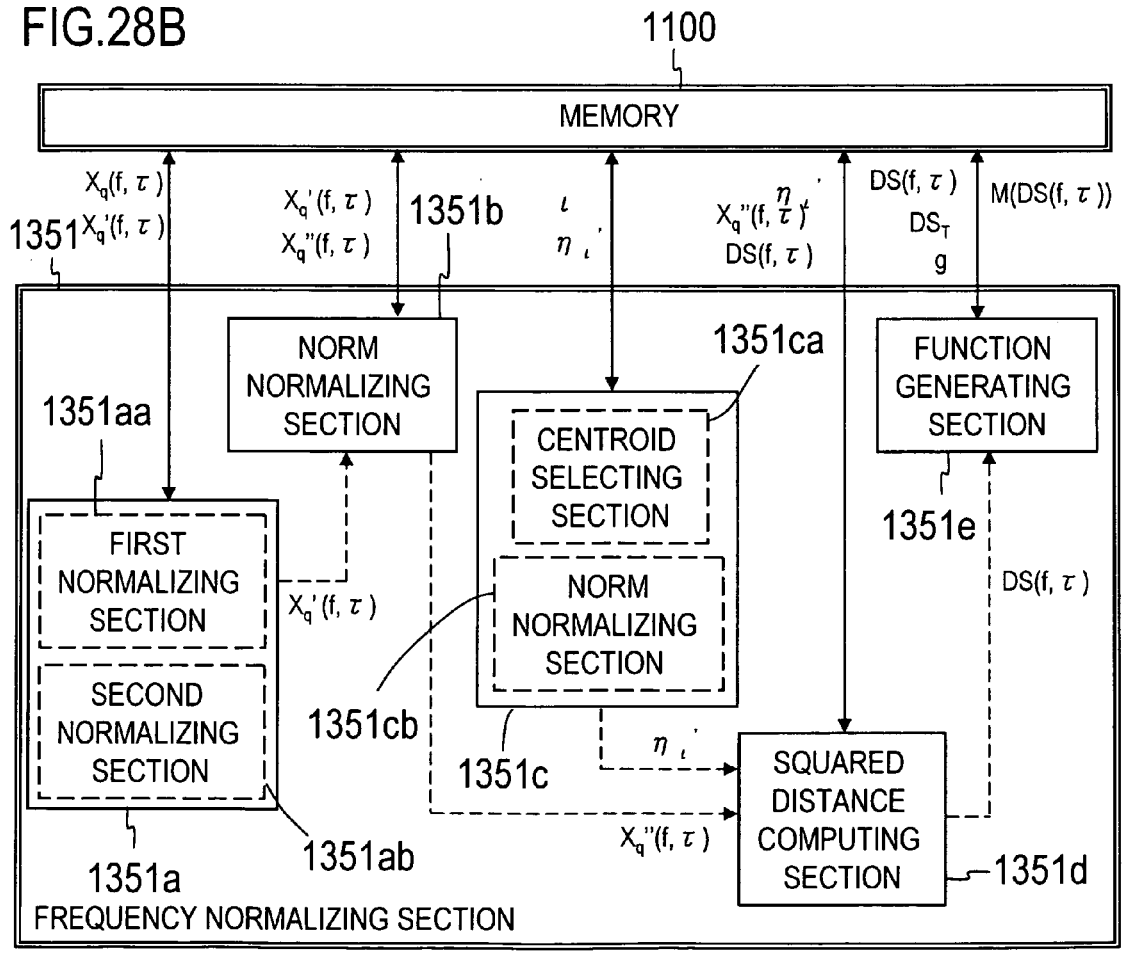
FIG. 28B is a block diagram showing a detailed configuration of a mask generating section in FIG. 28A.

FIG. 27 is a block diagram showing an exemplary signal separating apparatus 1300 according to the fifth embodiment. FIG. 28A is a block diagram showing a detailed configuration of a time-frequency masking section 1350 shown in FIG. 27. FIG. 28B is a block diagram showing a detailed configuration of a mask generating section 1351 shown in FIG. 28A. In these drawings, the same elements as those in the third embodiments are labeled with the same reference numerals used in the drawings of the third embodiment.

As shown in FIG. 27, the signal separating apparatus 1300 of the fifth embodiment differs from the signal separating apparatus 1001 in that the signal separating apparatus 1300 has the time-frequency masking section 1350 instead of the time-frequency masking section 1150, and that the memory 1100 has memory areas 1308 and 1312 instead of memory areas 1108 and 1112. As shown in FIG. 28A, the time-frequency masking section 1350 includes the mask generating section 1351 and the masking section 1152. As shown in FIG. 28B, the mask generating section 1351 includes a frequency normalizing section 1351a, a norm normalizing section 1351b, a centroid extracting section 1351c, a squared-distance computing section 1351d, and a function generating section 1351e. The frequency normalizing section 1351a includes a first normalizing section 1351aa and a second normalizing section 1351ab. The centroid extracting section 1351c includes a centroid selecting section 1351ca and a norm normalizing section 1351cd.

<Mask Generation>

The fifth embodiment differs from the third embodiment only in time-frequency mask generation (step S104). The time-frequency mask generation of the fifth embodiment will be described below.

Figure 29:
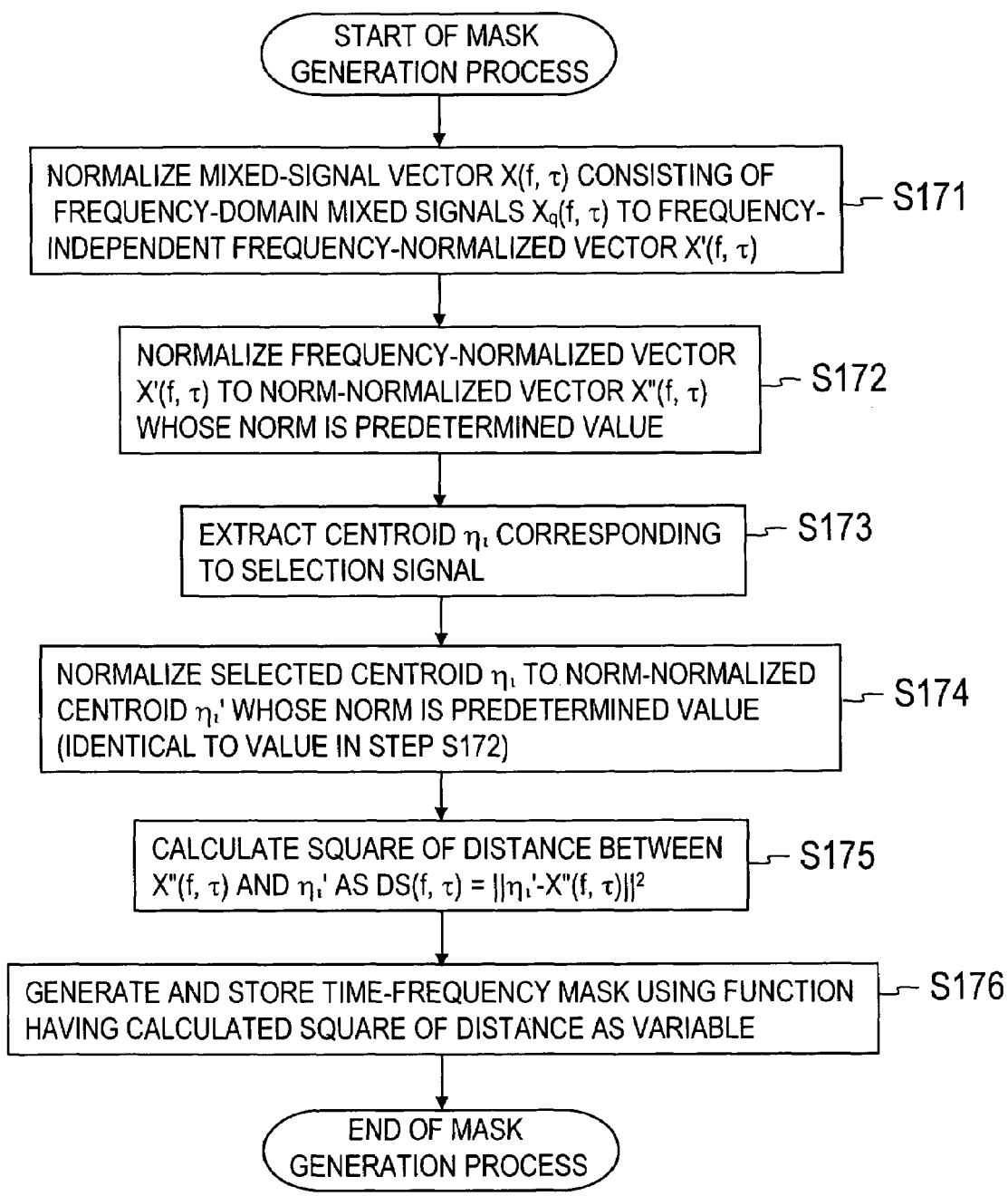
FIG. 29 is a flowchart illustrating a process for generating a time-frequency mask according to a fifth embodiment.
Figure 30A:
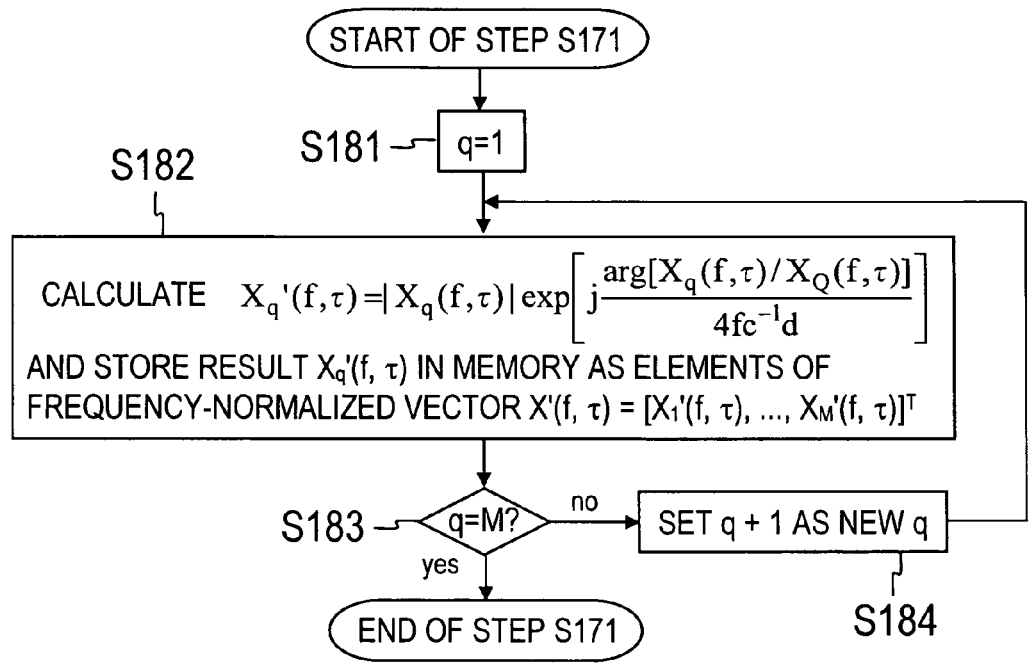
FIG. 30A is a flowchart illustrating details of step S171 in FIG. 29.
Figure 30B:
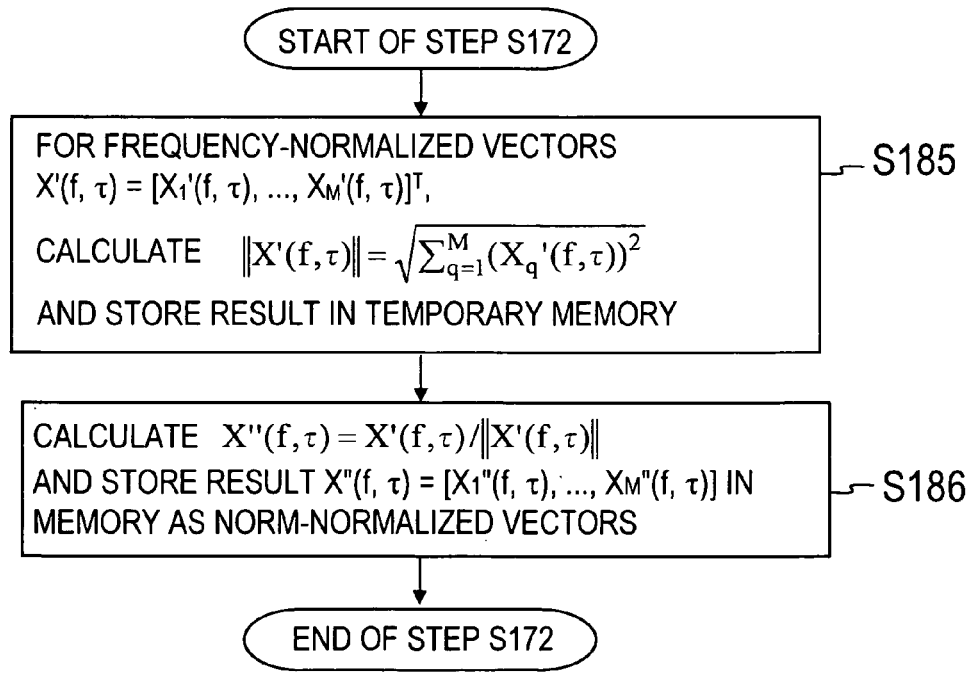
FIG. 30B is a flowchart illustrating details of step S172 in FIG. 29.

FIG. 29 is a flowchart illustrating a process for generating a time-frequency mask according to the fifth embodiment. FIG. 30A is a flowchart illustrating details of step S171 in FIG. 29. FIG. 30B is a flowchart illustrating details of step S172 in FIG. 29. Referring to these flowcharts, the time-frequency mask generating process will be described below.

First, the frequency normalizing section 1351a of the mask generating section 1351 normalizes a mixed-signal vector $X(f, \tau)$ consisting of frequency-domain mixed signals $X_q(f, \tau)$ stored in memory area 1102 of the memory 1100 to a frequency-normalized vector $X'(f, \tau)$ that is independent of frequency (frequency normalization) and stores the elements $X_q'(f, \tau)$ of the frequency-normalized vector $X'(f, \tau)$ in memory area 1312 of the memory 1100 (step S171).

[Details of Frequency Normalization (Step S171)]

The frequency normalization (step S171) will be detailed below.

First, a control section 1170 (FIG. 27) assigns 1 to parameter q and stores it in a temporary memory 1180 (step S181). Then, the frequency normalizing section 1351a (FIG. 28B) reads parameters d, c, and Q described earlier from memory area 1308 of the memory 1100, reads the elements $X_q(f, T)$ of the mixed-signal vector $X(f, \tau)$ corresponding to each $(f, \tau)$ from memory area 1102, and reads the parameter q from the temporary memory 1180. The frequency normalizing section 1351a then calculates

[Formula 44]

$$X_q'(f, \tau) = |X_q(f, \tau)| \exp\left[ j \frac{\arg[X_q(f, \tau)/X_Q(f, \tau)]}{4fc^{-1}d} \right] \quad (53)$$

and stores the result in memory area 1312 of the memory 1100 as each element of a frequency-normalized vector $X'(f, \tau) = [X_1'(f, \tau), \ldots, X_M'(f, \tau)]^T$ (step S182). Here, arg[·] represents an argument and j represents an imaginary unit.

In particular, the first normalizing section 1351aa of the frequency normalizing section 1351a normalizes the argument of each element $X_q(f, \tau)$ of a mixed-signal vector $X(f, \tau)$ by using one particular element $X_q(f, \tau)$ of the mixed-signal vector $X(f, \tau)$ as a reference according to the following operation.

[Formula 45]

$$X_q'''(f, \tau) = |X_q(f, \tau)| \exp\{j \cdot \arg[X_q(f, \tau)/X_Q(f, \tau)]\} \quad (54)$$

Then, the second normalizing section 1351ab of the frequency normalizing section 1351a divides the argument of each of the elements $X_q'''(f, \tau)$ normalized by the first normalizing section 1351aa by a value $4fc^{-1}$ proportional to the frequency f, as follows.

[Formula 46]

$$X_q'(f, \tau) = |X_q'''(f, \tau)| \exp\left[ j \frac{\arg[X_q'''(f, \tau)]}{4fc^{-1}d} \right] \quad (55)$$

Then, the control section 1170 determines whether the value of parameter q stored in the temporary memory 1180 satisfies q=M (step S183). If not q=M, the control section 1170 sets a calculation result q+1 as a new value of the parameter q, stores it in the temporary memory 1180 (step S184), and then returns to step S182. On the other hand, if q=M, the control section 1170 terminates processing at step S171 and causes processing at step S172, described below, to be performed. (End of the detailed description of the frequency normalization (step S171)

Then, the norm normalizing section 1351b of the mask generating section 1351 normalizes a frequency-normalized vector $X'(f, \tau)$ consisting of the elements $X_q'(f, \tau)$ stored in memory area 1312 of the memory 1100 to a norm-normalized vector $X''(f, \tau)$ whose norm has a predetermined value (1 in this example) (norm normalization) and stores the elements $X_q''(f, \tau)$ in memory area 1312 (step S172).

[Details of Norm Normalization (step S172)]

The norm normalization (step S172) will be detailed below.

First, the norm normalizing section 1351b (FIG. 28B) reads the frequency-normalized vectors $X'(f, \tau) = [X_1'(f, \tau), \ldots, X_M'(f, \tau)]^T$ each of which corresponds to $(f, \tau)$, from memory area 1312 of the memory 1100. The norm normalizing section 1351b then calculates their norms $\|X'(f, \tau)\|$ as

[Formula 47]

$$\|X'(f, \tau)\| = \sqrt{\sum_{q=1}^{M} (X_q'(f, \tau))^2}$$

and stores the frequency-normalized vectors $X'(f, \tau)$ and the norms $\|X'(f, \tau)\|$ in the temporary memory 1180 (step S185).

Then, the norm normalizing section 1351b reads the frequency-normalized vector $X'(f, \tau)$ corresponding to each $(f, \tau)$ and its norm $\|X'(f, \tau)\|$ from the temporary memory 1180 and calculates a norm-normalized vector $X''(f, \tau)$ as $$X''(f, \tau) = X'(f, \tau) / \|X'(f, \tau)\|$$

(step S186).

The calculated norm-normalized vector $X''(f, \tau)$ is stored in memory area 1312 of the memory 1100. With this, step S172 ends. (End of the detailed description of the norm normalization (step S172))

Then, a centroid selecting section 1351ca of a centroid extracting section 1351c reads cluster selection information $\iota$ from the temporary memory 1180 (see step S141) and reads a centroid $\eta_\iota$, corresponding to the cluster selecting information t from memory area 1110 of the memory 1100 (step S173). Then, the norm normalizing section 1351cb normalizes the norm of the centroid, read by the centroid selecting section 1351ca to a predetermined value (the value at step S172, which is 1 in this example). The centroid $\eta_\iota$ after norm normalization is referred to as a norm-normalized centroid $\eta_{76}'$ (step S174). The procedure for norm normalization is the same as the procedure at steps S185 and S186. The norm-normalized centroid $\eta_\iota'$ is stored in memory area 1312 of the memory 1100.

Then, the squared distance computing section 1351d reads the norm-normalized vector $X''(f, \tau)$ and the norm-normalized centroid $\eta_\iota'$ from memory area 1312 of the memory 1100 and computes the squared distance between them as $$DS(f, \tau) = \|\eta_\iota' - X''(f, \tau)\|^2$$

(step S175) and stores the squared distance $DS(f, \tau)$ in memory area 1312.

Then, the function generating section 1351e reads the squared distance $DS(f, \tau)$ from memory area 1312 of the memory 1100, uses a function having the squared distance $DS(f, \tau)$ as its variable to generate a time-frequency mask $M(f, \tau)$, and stores it in memory area 1312 of the memory 1100 (step S176). In particular, the function generating section 1351e reads real-number parameters g and $D_T$ from memory area 1308 of the memory 1100 and generates a time-frequency mask $M(DS(f, \tau))$, which is a logistic function as given below. Here, the parameter DT has been stored previously in memory area 1308 and "e" is Napier's number.

[Formula 48]

$$M(DS(f, \tau)) = \frac{1}{1 + e^{g \cdot (DS(f,\tau) - D_T)}} \quad (56)$$

The time-frequency mask M(DS(f, τ)) thus generated is used in masking in the masking section 1152 as in the third embodiment.

[Experimental Results]

Figures 31A, 31B:
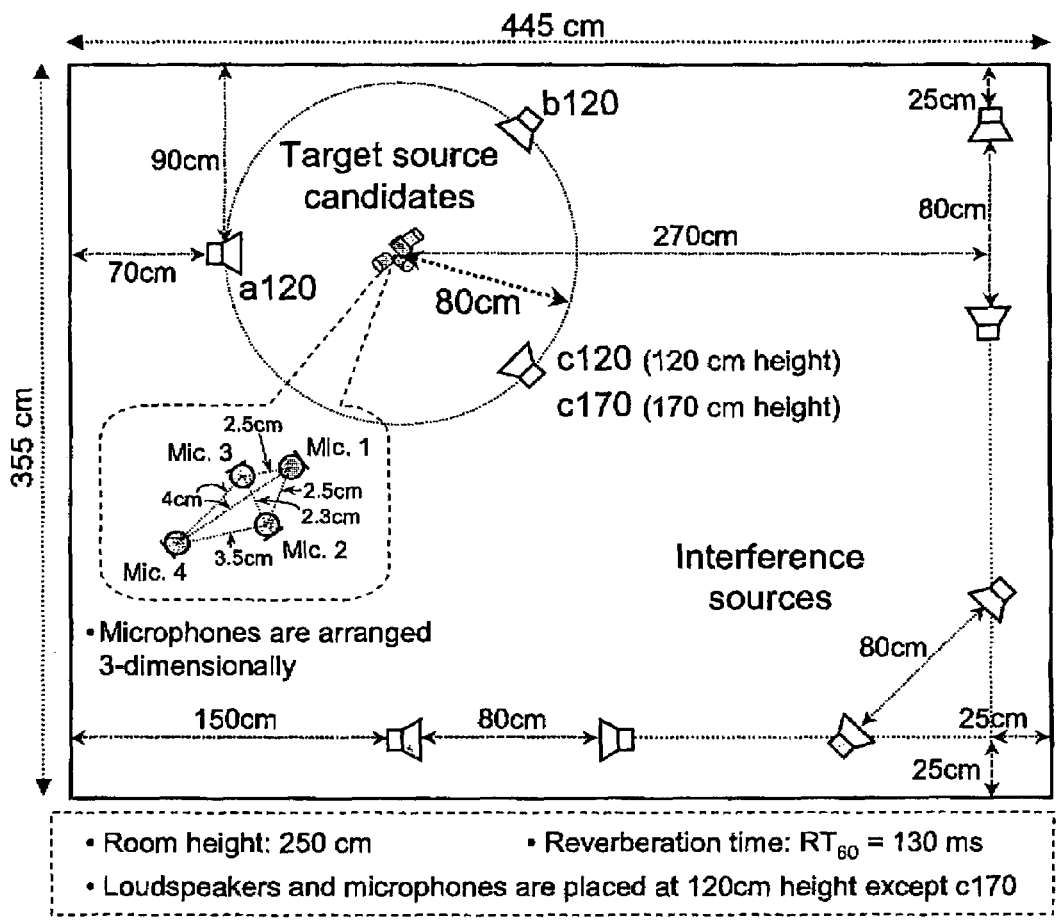
FIG. 31A shows conditions of experiments for demonstrating effects of the third and fourth embodiments.
FIG. 31B is a table showing average improvements in SIR when only ICA is used (the fourth embodiment) and when time-frequency masking is used in combination with ICA (the third embodiment)

In order to demonstrate effects of the third and fourth embodiments, experiments were conducted to enhance and extract main speech emitted near microphones. In the experiments, impulse responses $h_{qk}(r)$ were measured under the conditions shown in FIG. 31 A. Loudspeakers were arranged in such a manner that a cocktail party situation is simulated. Furthermore, the sound levels of all loudspeakers were set to approximately equal values so that a particular loudspeaker did not output sound at a significantly higher volume level than the others. Mixing at the microphones was generated by convolving English speech sampled at 8 kHz for 6 seconds with measured impulse responses. The microphones were arranged three-dimensionally as shown in FIG. 31A. A system (apparatus) containing the signal separating apparatus was supplied with only information about the maximum distance (3.5 cm) between the reference microphone (Mic.2) and other microphones but not with further information about the layout of the microphones. In each experiment, one of the four loudspeaker positions (a120, b120, c120, and c170) near the microphones was selected as a target sound source and the other three loudspeakers were kept silent. Six loudspeakers distant from the microphones were outputting interfering sounds at all times during the experiments. The results of the extraction were evaluated on the basis of improvements in the signal-to-interference ratio, Input SIR-Output SIR. Greater values mean better extraction of a target speech and therefore higher levels of suppression of the other interfering sounds. The two kinds of SIR are defined by

[Formula 49]

$$InputSIR = 10\log_{10} \frac{\left\langle \left| \sum_r h_{11}(r) \cdot s_1(t-r) \right|^2 \right\rangle_t}{\left\langle \left| \sum_{k \neq 1} \sum_r h_{1k}(r) \cdot s_k(t-r) \right|^2 \right\rangle_t} \text{(dB)}$$

$$OutputSIR = 10\log_{10} \frac{\left\langle \left| \sum_r u_{11}(r) \cdot s_1(t-r) \right|^2 \right\rangle_t}{\left\langle \left| \sum_{k \neq 1} \sum_r u_{1k}(r) \cdot s_k(t-r) \right|^2 \right\rangle_t} \text{(dB)}$$

where $$u_{1k}(r) = \sum_{q=1}^{M} \sum_{\tau=0}^{L-1} w_{1q}(\tau) \cdot h_{qk}(r-\tau)$$

is an impulse response from $s_k(t)$ to $y_1(t)$.

Sixteen combinations, each consisting 7 speeches (1 target speech and 6 interfering speeches), were created for each target sound source position for the experiments. FIG. 31B is a table showing average improvements in SIR in the case where only ICA was used (the fourth embodiment) and in the case where both ICA and time-frequency masking were used (the third embodiment). Generally good improvements in SIR were yielded, with slight variations depending on the positions of the target sound sources. The good results were obtained at positions a120 and b120 because the interfering sounds came from different positions. From a two-dimensional perspective, positions c120 and c170 appear to be positions where it is difficult to extract the target speech because many interfering sounds come from the same direction. Actually, the results obtained at a position c170 were excellent, however. This is because position c170 was placed at a height different from those of interfering sounds and the system automatically uses the difference in height to extract signals with the three dimensionally arranged microphones. The table in FIG. 31B shows that the performance is improved by the time-frequency masking. Three parameters shown in FIG. 31A were used in Equation (46) that determines a time-frequency mask. By using smaller values of $\theta_T$, greater SIR improvements are achieved. However, some of sounds obtained using smaller $\theta_T$ were accompanied by unnatural noise (musical noise). The experiments showed that parameters $(\theta_T, g) = (0.333\pi, 20)$ sufficiently suppressed interfering sounds while providing natural sound.

[Variations]

The present invention is not limited to the third to fifth embodiments described above. For example, while the signal separating section 1130 computes a separation matrix W(f) consisting of M rows and M columns in the embodiments described above, it may compute a non-square separation matrix W(f) such as a matrix consisting of N rows and M columns. In that case, basis vectors are the columns of a generalized inverse matrix $W^+(f)$ (for example, a Moore-Penrose generalized matrix) of the separation matrix W(f).

While a time-frequency mask is used to further suppress interfering signal components in selection signals $Y_{I(f)}(f, \tau)$ to generate masked selection signals $Y_{I(f)}'(f, \tau)$ in the third embodiment, any other method may be used to suppress interfering signal components to generate masked selection signal $Y_{I(f)}'(f, \tau)$. For example, if there are only two signal sources, a time-frequency mask may be generated that compares the magnitude of extracted separated signals $Y_1(f, \tau)$ and $Y_2(f, \tau)$, and extracts $Y_1(f, \tau)$ as the masked selection signal $Y_{I(f)}'(f, \tau)$ if $|Y_1(f, \tau)| > |Y_2(f, \tau)|$, or extracts the signal $Y_2(f, \tau)$ as the masked selection signal $Y_1(f)'(f, \tau)$ if $|Y(f, \tau)| < |Y_2(f, \tau)|$. Then, vectors consisting of the separated signals $Y_1(f, \tau)$ and $Y_2(f, \tau)$ is multiplied by the generated time-frequency mask.

While the signal separating section 1130 uses independent component analysis (ICA) to compute a separation matrix and separated signals in the third embodiment, it may use a time-frequency mask (which is a mask for each time frequency, for example a binary mask that takes on the value 1 or 0) to extract separated signals from observed signals (for example see O. Yilmaz and S. Richard, "Blind separation of speech mixtures via time-frequency masking," IEEE Trans. an SP. vol. 52, no. 7, pp. 1830-1847, 2004) and may generate a separation matrix from the result. The first normalizing section 1142aa of the frequency normalizing section 1142a in the third embodiment normalizes the arguments of the components $A_{qp}(f)$ of a basis vector $A_p(f)$ by using one particular element $A_{Qp}(f)$ of that basis vector $A_p(f)$ as the reference according to Equation (15), which is a part of Equation (35). However, the first normalizing section 1142aa may use a particular element $A_{Qp}(f)$ of a basis vector $A_p(f)$ as the reference to normalize the arguments of the components $A_{qp}(f)$ of that basis vector $A_p(f)$ according to Equations (27-1) to (27-3) described above.

Furthermore, the frequency normalizing section 1142a may perform frequency normalization by calculating Equations (28-1) to (28-4) given above, instead of Equation (35).

While the norm normalizing section 1142b performs normalization such that a norm has a value of 1 in the third embodiment, it may perform normalization such that a norm has a predetermined value other than 1. Furthermore, the norm normalizing section 1142b is not provided and therefore norm normalization may be omitted. In this case, clustering is performed on the basis of the similarity in the directions of vectors as described above.

The same value of parameter d may be set for all sensors q or different values may be set for different sensors q. For example, the distance between the reference sensor and a sensor q may be set the value of parameter d at the sensor q.

Sixth Embodiment (Example of the Third Aspect of the Invention)

The sixth embodiment of the present invention will be described below.

The sixth embodiment uses the principles described above and uses information obtained from all observed signals in a simple and efficient manner to perform signal separation without needing precise positional information about sensors. In the sixth embodiment, a "mixed-signal vector" which will be described later corresponds to the "complex vector" described above.

<Configuration>

Figure 32:
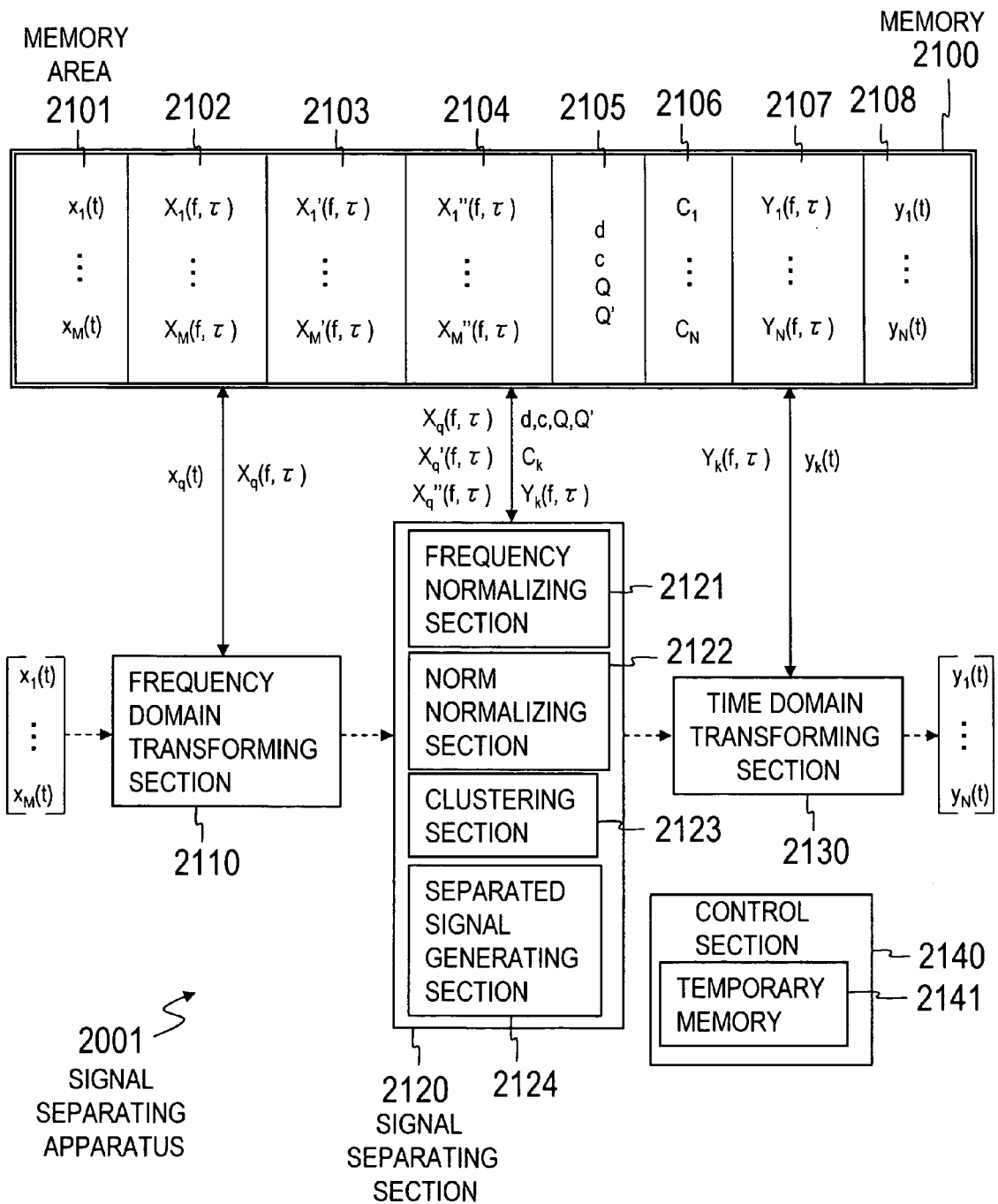
FIG. 32 is a block diagram illustrating a signal separating apparatus according to a sixth embodiment.
Figure 33:
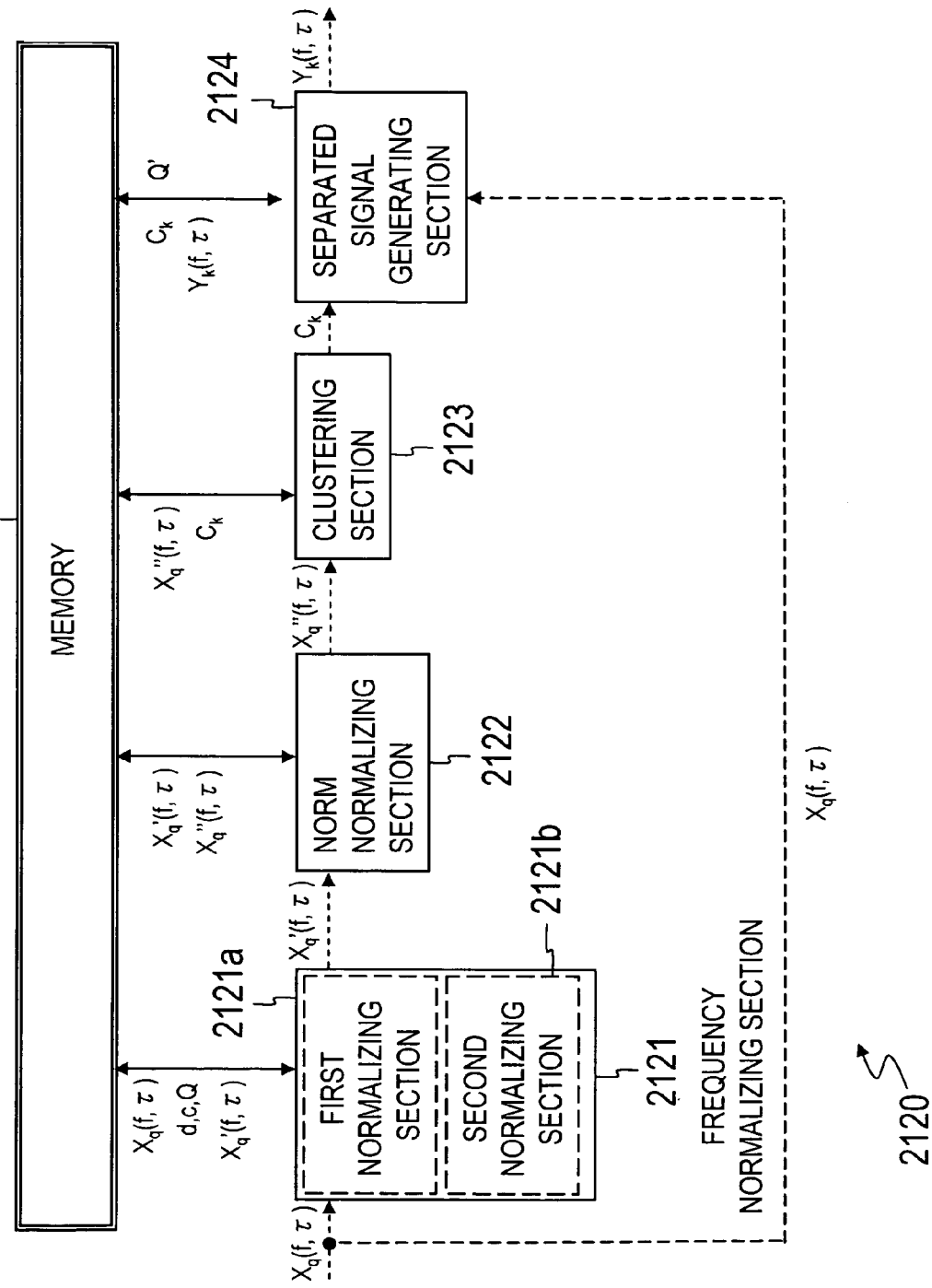
FIG. 33 is a block diagram illustrating details of a signal separating section in FIG. 32.

Like the signal separating apparatus of the first embodiment, a signal separating apparatus 2001 of the sixth embodiment is configured by loading a signal separating program into a computer of well-known von Neumann-type. FIG. 32 is a block diagram showing an exemplary configuration of the signal separating apparatus 2001 in the sixth embodiment. FIG. 33 is a block diagram illustrating details of a signal separating section 2120 shown in FIG. 32. The solid arrows in FIGS. 32 and 33 represent actual data flows and the dashed arrows represent theoretical information flows. Arrows representing flows of data inputted in and outputted from a control section 2140 are omitted from FIGS. 32 and 33.

As shown in FIGS. 32 and 33, the signal separating apparatus 2001 includes a memory 2100, a frequency domain transforming section 2110 (including the functions of the "complex vector generating section"), the signal separating section 2120, a time frequency transforming section 2130, and the control section 2140. The signal separating section 2120 includes a frequency normalizing section 2121 (constituting the "normalizing section"), a norm normalizing section 2122 (constituting the "normalizing section"), a clustering section 2123, and a separated signal generating section 2124. The frequency normalizing section 2121 includes a first normalizing section 2121a and a second normalizing section 2121b. The control section 2140 has a temporary memory 2141.

The memory 2100 and the temporary memory 2141 correspond to storage such as a register 10ac, an auxiliary storage device 10f, and a RAM 10d. The frequency domain transforming section 2110, the signal separating section 2120, the time domain transforming section 2130, and the control section 2140 are configured when an OS program and the signal separating program are read in the CPU 10a and the CPU 10a executes them.

<Processing>

Processing performed in the signal separating apparatus 2001 will be described below. In the following description, a situation will be dealt with in which N source signals are mixed and observed by M sensors. The assumption is that mixed signals $X_q(t)$ (q=1, . . . , M) in the time domain observed at the sensors are stored in memory area 2101 of the memory 2100 and signal transmission speed c, reference values Q and Q' selected from natural numbers less than or equal to M (each being the suffixes indicating reference sensors selected from among the M sensors) and values of real-number d parameters are stored in memory area 2105.

Figure 34:
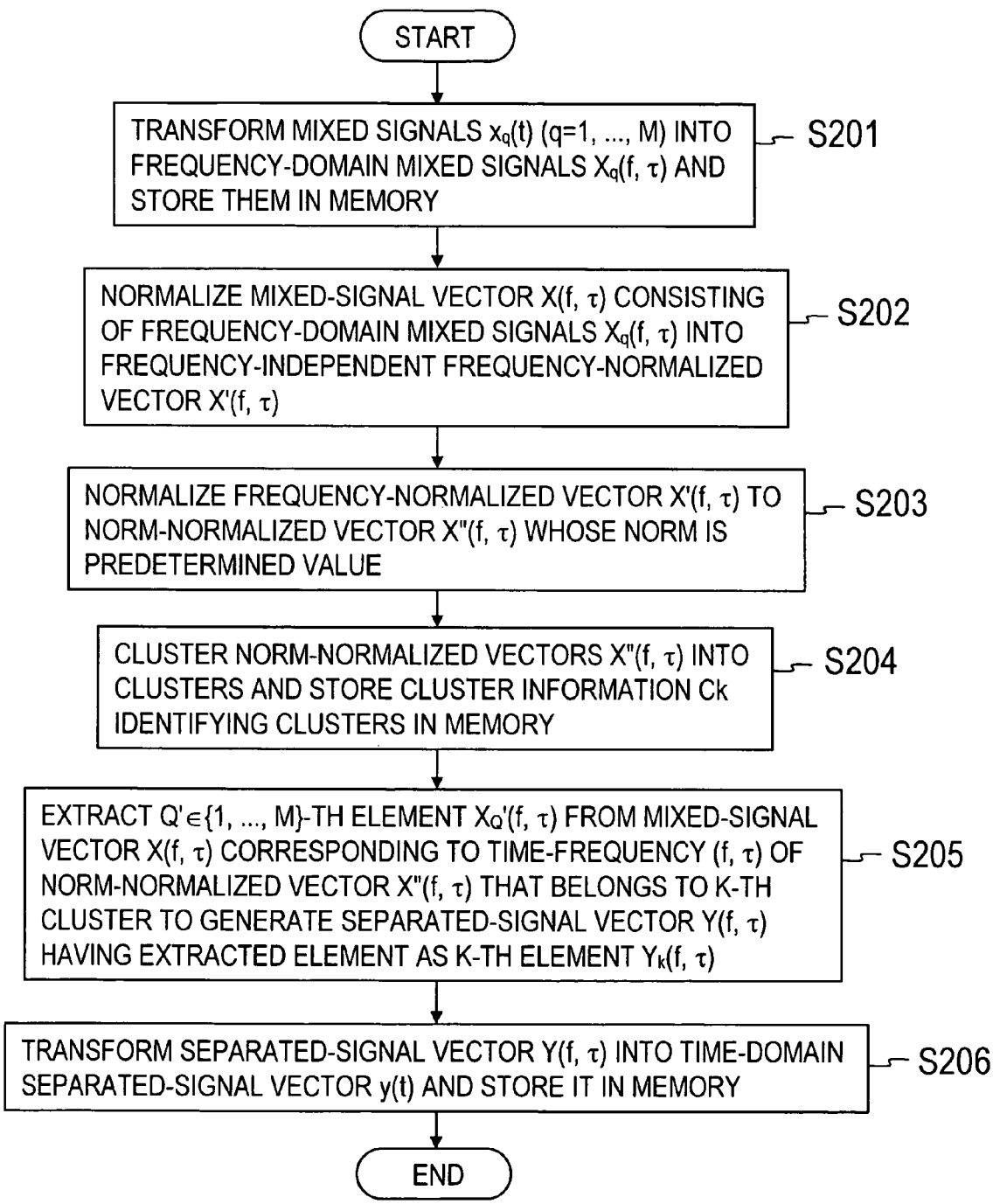
FIG. 34 is a flowchart outlining a whole process performed in the signal separating apparatus according to the sixth embodiment.

FIG. 34 is a flowchart outlining whole processing in the signal separating apparatus 2001 according to the sixth embodiment. The processing by the signal separating apparatus 2001 of the sixth embodiment will be described with reference to the flowchart.

[Overview of Processing]

First, the frequency domain transforming section 2110 reads mixed signals $X_q(t)$ in the time domain from memory area 2101 of the memory 2100, transforms them into time-series signals of individual frequency (referred to as "frequency-domain mixed signals) $X_q(f, \tau)$(q=1, . . . , M and f=0, $f_s/L$, . . . , $f_s(L-1)L$, where $f_s$ is a sampling frequency) by applying a transformation such as a short-time discrete Fourier transformation, and stores them in memory area 2102 of the memory 2100 (step S201).

Then, the frequency normalizing section 2121 of the signal separating section 2120 reads the frequency-domain mixed signals $X_q(f, \tau)$ from memory area 2102 of the memory 2100. After reading the frequency-domain mixed signals $X_q(f, \tau)$, the frequency normalizing section 2121 normalizes a mixed-signal vector $X(f, \tau)=[X_1(f, \tau), \ldots, X_M(f, \tau)]^T$ consisting of those signals into a frequency-normalized vector $X'(f, \tau)$ that is independent of frequency f (step S202). The generated frequency-normalized vectors $X'(f, \tau)$ are stored in memory area 2103 of the memory 2100. Details of step S202 will be described later.

Then, the norm normalizing section 2122 of the signal separating section 2120 read the frequency-normalized vectors $X'(f, \tau)$ from memory area 2103 of the memory 2100 and normalizes them into a norm-normalized vectors $X''(f, \tau)$ whose norm has a predetermined value (for example 1). The norm normalizing section 2122 then stores the generated norm-normalized vectors $X''(f, \tau)$ in memory area 2104 of the memory 2100 (step S203). Details of this operation will be described later.

Then, the clustering section 2123 of the signal separating section 2120 reads the norm-normalized vectors $X''(f, \tau)$ from memory area 2104 of the memory 2100, clusters them and generates clusters. The clustering section 2123 then stores cluster information $C_k$ identifying each cluster (information identifying the members $X''(f, \tau)$ of the k-th cluster (k=1, . . . , N), in memory area 2106 of the memory 2100 (step S204). Details of this operation will be described later.

Then, the separated signal generating section 2124 of the signal separating section 2120 reads the cluster information $C_k$ and the reference value Q' from memory areas 2106 and 2105, respectively, of the memory 2100. The separated signal generating section 2124 then uses the cluster information $C_k$ and the reference value Q' to extract from memory area 2120 the Q'-th element $X_{Q'}(f, \tau)$ of the mixed-signal vector $X(f, \tau)$ corresponding to the norm-normalized vector $X''(f, \tau)$ belonging to the k-th cluster and generates a separated signal vector $Y(f, \tau)$ having the element as its k-th element $Y_k(f, \tau)$. The separated signal generating section 2124 then stores the generated separated signal vector $Y(f, \tau)$ in memory area 2107 of the memory 2100 (step S205). Details of this operation will be described later.

Finally, the time domain transforming section 2130 reads the separated signal vector Y(f, τ) from memory area 2107 of the memory 2100 and transforms each of its separated signal components $Y_k$(f, τ) by using a transformation such as a short-time inverse Fourier transformation into a time-domain separated signal $Y_k$(t) for each suffix k. The time domain transforming section 2130 then stores the transformed, time-domain separated signals $y_k$(t) in memory area 2108 of the memory 2100 (step S206).

Details of the operations will be described below.

[Details of Processing by the Frequency Normalizing Section 2121 and the Norm Normalizing Section 2122]

The frequency normalizing section 2121 and the norm normalizing section 2122 normalize all mixed-signal vectors $X(f,\tau)=[X_1(f,\tau), \ldots, X_M(f,\tau)]^T$ (f=0, $f_s$/L, ..., $f_s$(L−1)/L) to norm-normalized vectors X"(f, τ) that are independent of frequency but dependent only on the positions of signal sources. This normalization ensures that each cluster formed by clustering at step S204 corresponds only to a signal source. If this normalization is not properly performed, clusters are not formed. As described earlier, normalization in the sixth embodiment consists of frequency normalization and norm normalization. The frequency normalization is performed by the frequency normalizing section 2121 to normalize mixed-signal vectors X(f, τ) into frequency-normalized vectors X'(f, τ) that are independent of frequency. The norm normalization is performed by the norm normalizing section 2122 to normalize the frequency-normalized vectors X'(f, τ) into norm-normalized vectors X"(f, τ) whose norm has a predetermined value (1 in this example). These normalizations will be detailed below.

[Details of Processing by the Frequency Normalizing Section 2121 (Processing at Step S202)]

Figure 35A:
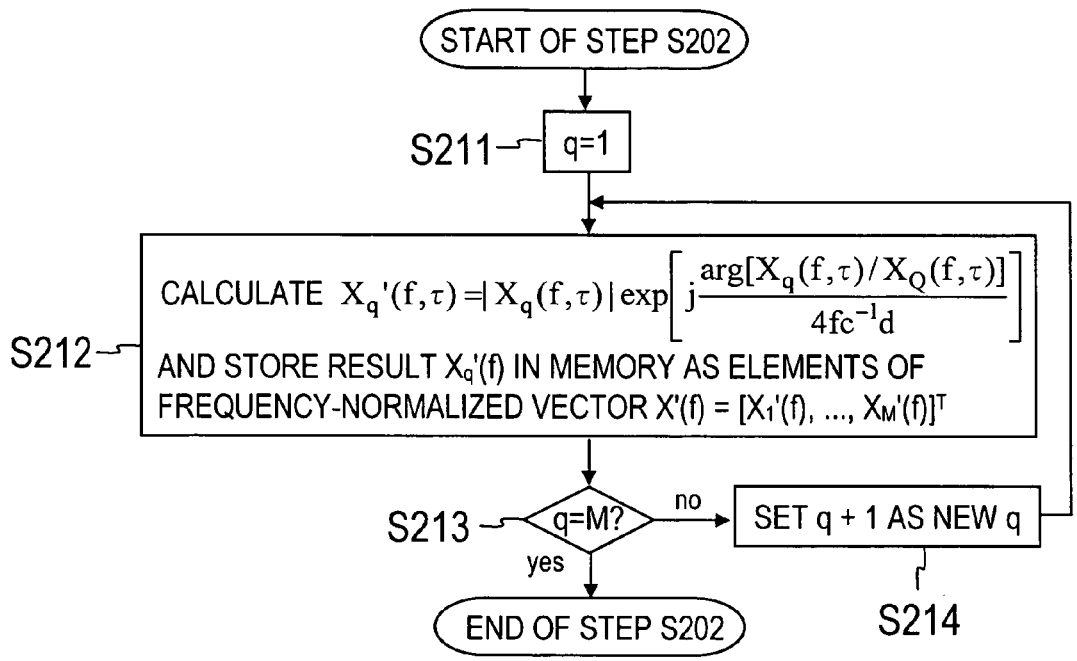
FIG. 35A is a flowchart illustrating details of processing at step S202 shown in FIG. 34.

FIG. 35A is a flowchart illustrating details of processing at step S202 shown in FIG. 34. With reference to the flowchart, details of processing at step S202 will be described below.

First, the control section 2140 (FIG. 32) assigns 1 to parameter q and stores it in the temporary memory 2141 (step S211). Then, the frequency normalizing section 2121 (FIGS. 32 and 33) reads the parameters d, c, and Q described earlier from memory area 2105 of the memory 2100, reads the element $X_q$(f, τ) of the mixed-signal vector X(f, τ) corresponding to each (f, τ) from memory area 2102, and reads parameter q from the temporary memory 2141. The frequency normalizing section 2121 then calculates

[Formula 50]

$$X'_q(f,\tau) = |X_q(f,\tau)| \exp\left[j\frac{\arg[X_q(f,\tau)/X_Q(f,\tau)]}{4fc^{-1}d}\right] \quad (60)$$

and stores the result in memory area 2103 of the memory 2100 as the components of a frequency-normalized vector $X'(f,\tau)=[X'(f,\tau), \ldots, X_M'(f,\tau)]^T$ (step S212). Here, arg[·] represents an argument and j represents an imaginary unit.

In particular, the first normalizing section 2121a of the frequency normalizing section 2121 first normalizes the argument of each component $X_q$(f, τ) of the mixed-signal vector X(f, τ) on the basis of a particular element $X_Q$(f, τ) of the mixed signal vector X(f, τ) by the following operation:

[Formula 51]

$$X_q'''(f,\tau) = |X_q(f,\tau)| \exp\{j \cdot \arg[X_q(f,\tau)/X_Q(f,\tau)]\} \quad (61)$$

Then, the second normalizing section 2121b of the frequency normalizing section 2121 divides the argument of each element $X_q'''$(f, τ) normalized by the first normalizing section 2121a by a value $4fc^{-1}d$ proportional to frequency f as given below.

[Formula 52]

$$X_q'(f,\tau) = |X_q'''(f,\tau)| \exp\left[j\frac{\arg[X_q'''(f,\tau)]}{4fc^{-1}d}\right] \quad (62)$$

Then, the control section 2140 determines whether the value of parameter q stored in the temporary memory 2141 satisfies q=M (step S213). If not q=M, the control section 2140 sets a calculation result q+1 as a new value of parameter q, stores it in the temporary memory 2141 (step S214), and then returns to step S212. On the other hand, if q=M, the control section 2140 terminates step S202, and causes step S203 to be executed.

[Details of Processing by the Norm Normalizing Section 2122 (Details of Step S203)]

Figure 35B:
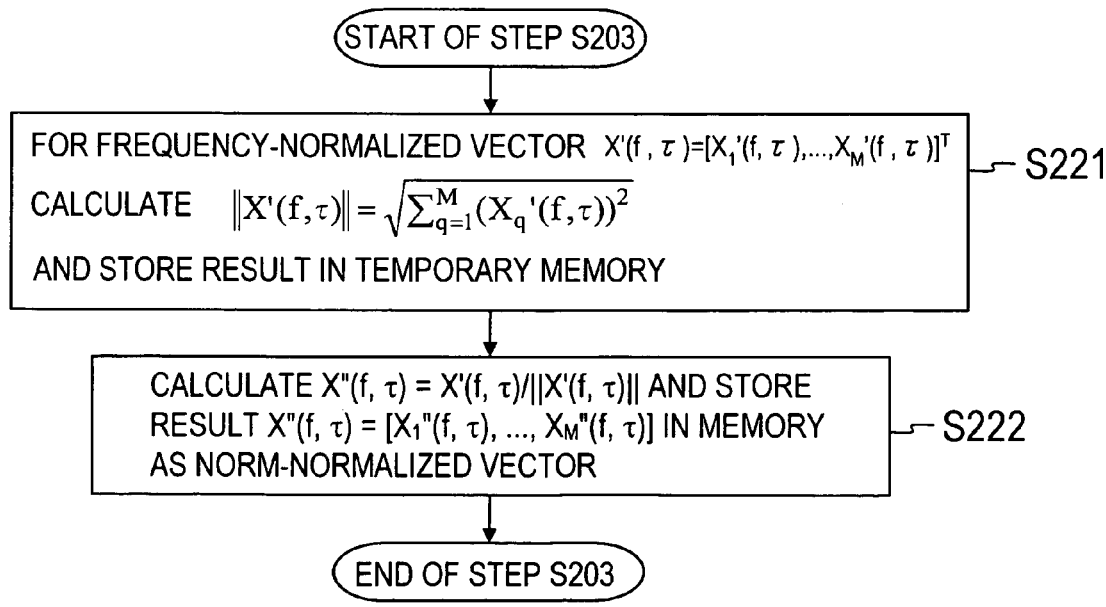
FIG. 35B is a flowchart illustrating details of processing at step S203 shown in FIG. 34.

FIG. 35B is a flowchart illustrating details of processing at step S203 shown in FIG. 34. With reference to the flowchart, processing at step S203 will be detailed below.

The norm normalizing section 2122 (FIGS. 32 and 33) reads the frequency-normalized vectors $X'(f, \tau)=[X_1'(f, \tau), \ldots, X_M'(f, \tau)]^T$ corresponding to (f, τ) from memory area 2103 of the memory 2100. The norm normalizing section 2122 then calculates their norms ∥X'(f, τ)∥ as

[Formula 53]

$$\|X'(f,\tau)\| = \sqrt{\sum_{q=1}^{M}(X_q'(f,\tau))^2}$$

and stores the frequency-normalized vectors X'(f, τ) and their norms ∥X'(f, τ)∥ in the temporary memory 2141 (step S221).

Then, the norm normalizing section 2122 reads the frequency-normalized vectors X'(f, τ) corresponding to each (f, τ) and their norms ∥X'(f, τ)∥ from the temporary memory 2141 and calculates norm-normalized vectors X"(f, τ) as $$X''(f,\tau) = X'(f,\tau)/\|X'(f,\tau)\| \quad (63)$$

(step S222). The calculated norm-normalized vectors X"(f, τ) are stored in memory area 2104 of the memory 2100 and, with this, the processing at step S203 ends.

The norm-normalized vectors X" (f, τ) thus generated are independent of frequency and dependent only on the positions of the signal sources. Consequently, the norm-normalized vectors X" (f, τ) form clusters. The reason why they form clusters will be described below.

[Reason Why Norm-Normalized Vectors X"(f, τ) form Clusters]

Because the sixth embodiment assumes the sparseness of source signals, each of the components $X_q$(f, τ) of a mixed-signal vector X(f, τ) is proportional to (multiplied by a source signal $S_k$(f, τ) which is a complex scalar) the frequency response $H_{qk}$ from the signal source k corresponding to the source signal p to a sensor q ($X_q(f,\tau)=H_{qk}(f,\tau) \cdot S_k(f,\tau)$).

These source signals $S_k$(f, τ) change with discrete time (that is, with phase). Of course, if the frequency f is the same, the relative value between the argument of a source signal $S_k$(f, τ) observed at a sensor q and the argument of the source signal $S_k$(f, τ) observed at reference sensor Q does not vary with discrete time.

As described above, the first normalizing section 2121*a* of the frequency normalizing section 2121 normalizes the argument of each $X_q(f, \tau)$ of a mixed-signal vector $X(f, \tau)$ on the basis of a particular element $X_Q(f, \tau)$ of the mixed-signal vector $X(f, \tau)$ as a reference.

In this way, uncertainty due to the phase of the source signals $S_k(f, \tau)$ is eliminated. Thus the argument of each element $X_q(f, \tau)$ of the mixed-signal vector $X(f, \tau)$ that corresponds to the source signal p and sensor q is represented as a value relative to the argument of the element $X_Q(f, \tau)$ of the mixed-signal vector $X(f, \tau)$ that corresponds to the source signal p and reference sensor Q (corresponding to reference value Q). In this case, the relative value corresponding to the argument of the element $X_Q(f, \tau)$ is represented as 0.

The frequency response from the signal source k to the sensor q is approximated by using a direct-wave model without reflections and reverberations. Then, the argument normalize by the first normalizing section 2121*a* described above will be proportional to both of the arrival time difference of a wave from a signal source k to sensors and the frequency f. Here, the arrival time difference is the difference between the time at which a wave from a signal source k reaches the sensor q and the time at which the wave reaches the sensor Q.

As described above, the second normalizing section 2121*b* divides the argument of each component $X_q'''(f, \tau)$ normalized by the first normalizing section 2121*a* by a value proportional to frequency f. Thus, the each element $X_q'''(f, \tau)$ is normalized to an element $X_q'(f, \tau)$ excluding the dependence of the argument on frequency. Consequently, the normalized elements $X_q'(f, \tau)$ will be dependent only on the arrival time difference of the wave from the signal sources k to the sensors. Here, the arrival time difference of the wave from the signal source k to the sensors is only dependent on the relative positions of the signal sources k, sensors q, and reference sensor Q. Therefore, for the same signal sources k, sensors q, and reference sensor Q, the elements $X_q'(f, \tau)$ have the same argument even if the frequency f differs. Thus, the frequency-normalized vector $X'(f, \tau)$ is independent of frequency f but is dependent only on the position of the signal source k. Therefore, clustering of norm-normalized vectors $X''(f, \tau)$ generated by normalization of the norms of the frequency-normalized vectors $X'(f, \tau)$ generates clusters each of which corresponds to the same signal source. In a real environment, the direct-wave model is not exactly satisfied because of the effects of reflections and reverberations. However, it provides a sufficiently good approximation as shown by experimental results, which will be given later.

The reason why the norm-normalized vectors $X''(f, \tau)$ form clusters will be described with respect to a model.

The impulse responses $h_{qk}(r)$ represented by Equation (1) given earlier is approximated by using a direct-wave (near-field) mixture model and represented in the frequency domain, as

[Formula 54]

$$H_{qk}(f) = \frac{\gamma(f)}{d_{qk}} \exp[-j2\pi f c^{-1}(d_{qk} - d_{Qk})] \tag{64}$$

where $d_{qk}$ is the distance between a signal source k and sensor q and $y(f)$ is a constant dependent on frequency. The attenuation $\gamma(f)/d_{qk}$ is determined by the distance $d_{qk}$ and the constant $\gamma(f)$, and the delay $(d_{qk}-d_{Qk})/c$ is determined by the distance normalized by using the position of sensor Q.

Assuming that the signals have sparseness, the following relationship holds at each time-frequency $(f, \tau)$.

$$X_q(f,\tau) = H_{qk}(f,\tau) \cdot S_k(f,\tau) \tag{65}$$

From Equations (62), (63), (64), and (65), it follows that

[Formula 55]

$$X_q''(f, \tau) = \frac{1}{d_{qk}D} \exp\left[-j\frac{\pi}{2}\frac{(d_{qk} - d_{Qk})}{d}\right], D = \sqrt{\sum_{i=1}^{M} \frac{1}{d_{ik}^2}} \tag{66}$$

As can be seen from this equation, the elements $X_q''(f, \tau)$ of the norm-normalized vector $X''(f, \tau)$ are independent of the frequency f and are dependent only on the positions of the signal sources k and sensors q. Therefore, when norm-normalized vectors are clustered, each of the clusters formed corresponds to the same signal source.

The same applies near-field and far-field mixed models that do not take attenuation of signals into consideration (as in the first embodiment).

It can be seen from Equation (66) that the value of parameter d is preferably $d > d_{max}/2$ (where $d_{max}$ represents the maximum distance between the reference sensor corresponding to the element $X_Q''(f, \tau)$ and another sensor), more preferably $d > d_{max}$, and yet more preferably $d = d_{max}$, as with the first embodiment.

FIGS. 37 and 38 are complex planes illustrating the relationship between an element $X_q''(f, \tau)$ of a norm-normalized vector $X''(f, \tau)$ for each value of parameter d and its argument $\arg[X_q''(f, \tau)]$. The horizontal axis in the planes represents a real axis and the vertical axis represents an imaginary axis.

Figure 37A:
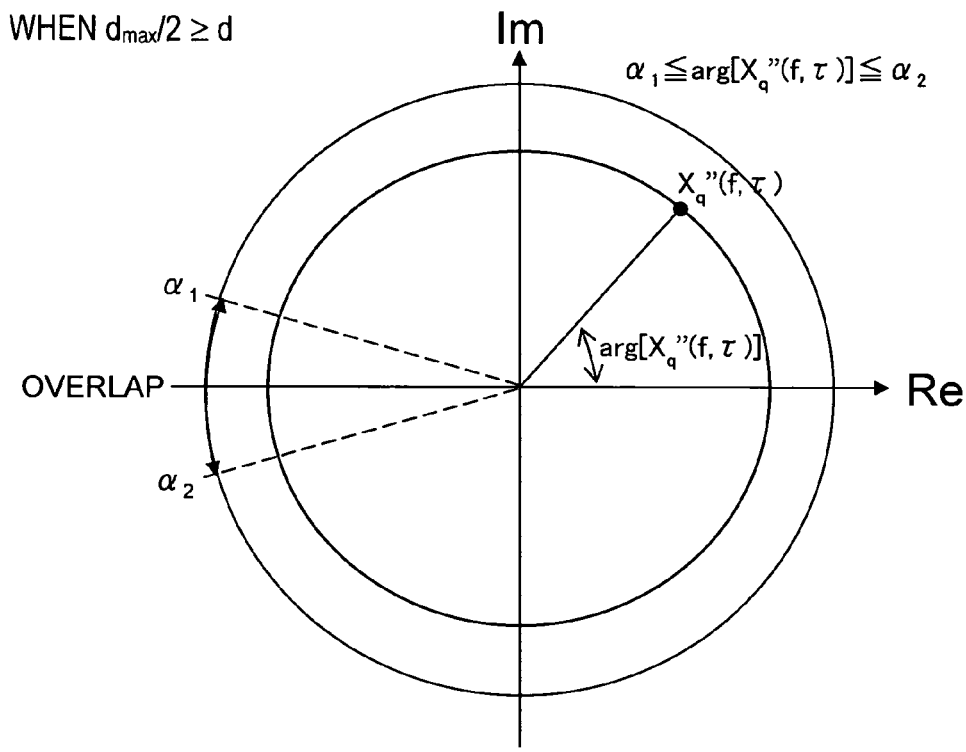
FIG. 37A is a complex plane used for illustrating the relation between an element $X_q"(f, \tau)$ of a norm-normalized vector at each value of parameter "d" and its argument arg $[X_q"(f, \tau)]$ when $d_{max}/2 \geq d$.

FIG. 37A shows a complex plane view showing the relationship when $d_{max}/2 \geq d$. Here, from the definition of $d_{max}$ given above, the absolute value of $d_{qk}-d_{Qk}$ is less than or equal to $d_{max}$ for any q and k. Therefore, if $d_{max}/2 \geq d$, then $(\pi/2) \cdot (d_{qk}-d_{Qk})/d \leq -\pi$ and $(\pi/2) \cdot (d_{qk}-d_{Qk})/d \geq \pi$. Consequently, the arguments $\arg[X_q''(f, \tau)]$ of $X_q''(f, \tau)$ represented by Equation (66) can be distributed over the range beyond $2\pi$, that is, $\alpha_1 \leq \arg[X_q''(f, \tau)] \leq \alpha_2 (\alpha_1 \leq -\pi, \alpha_2 \geq \pi)$. Accordingly, the arguments of elements $X_q''(f, \tau)$ of different norm-normalized vectors $X''(f, \tau)$ can be identical and therefore the different norm-normalized vectors $X''(f,\tau)$ can be clustered in the same cluster by the clustering described above. Therefore, it is desirable that $d > d_{max}/2$. However, if there are no samples of norm-normalized vectors $X''(f, \tau)$ that correspond to the argument overlapping range, no problem arises even if $d_{max}/2 \geq d$.

Figure 37B:
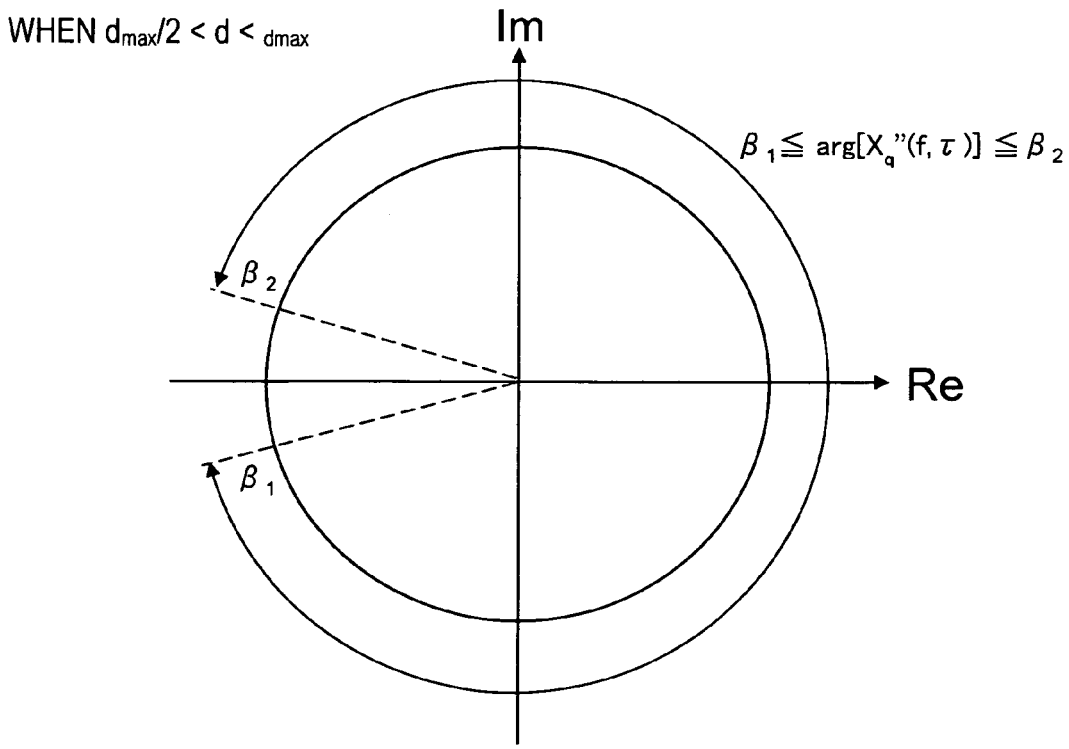
FIG. 37B is a complex plane used for illustrating the relation between an element $X"(f, \tau)$ of a norm-normalized vector $X"(f, \tau)$ at each value of parameter "d" and its argument $\arg[X_q"(f, \tau)]$ when $d_{max}/2 < d < d_{max}$.

FIG. 37B shows a complex plane showing the case where $d_{max}/2 < d < d_{max}$. In this case, the relationships $-\pi < (\pi/2) \cdot (d_{qk} - D_{Qk})/d < -\pi/2$ and $\pi/2 < (\pi/2) \cdot (d_{qk}-d_{Qk})/d < \pi$ are possible. Consequently, the arguments $\arg[X_q''(f, \tau'')]$ of $X_q''(f, \tau)$ represented by Equation (66) can be distributed over the range $\beta_1 \leq \arg[X_q''(f, \tau)] \leq \beta_2 (-\pi < \beta_1 < -\pi/2, \pi/2 < \beta_2 < \pi)$. Accordingly, it is possible that the distance between elements of different norm-normalized vectors $X''(f, \tau)$ does not monotonically increase with increasing difference between the arguments of elements of different norm-normalized vectors $X''(f, \tau)$ in the ranges $-\pi < \arg[X_q''(f, \tau)] < -\pi/2$ and $\pi/2 < \arg[X_q''(f, \tau)] < \pi$. This can degrade the accuracy of the clustering described above. Therefore it is desirable that $d \geq d_{max}$.

Figure 38A:
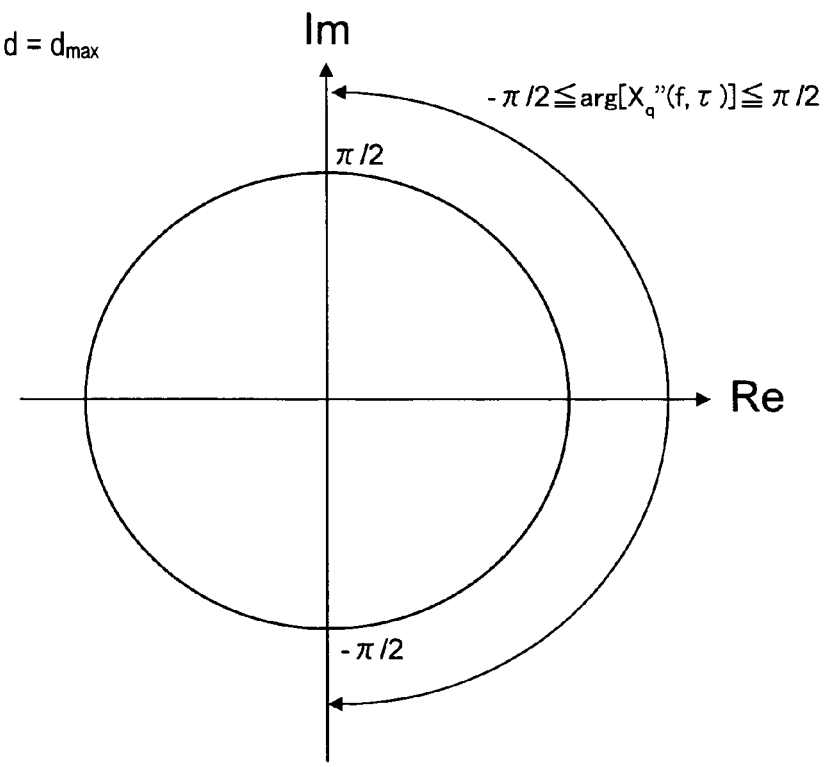
FIG. 38A is a complex plane used for illustrating the relation between an element $X_q"(f, \tau)$ of a norm-normalized vector at each value of parameter "d" and its argument arg $[X_q"(f, \tau)]$ when $d=d_{max}$.
Figure 38B:
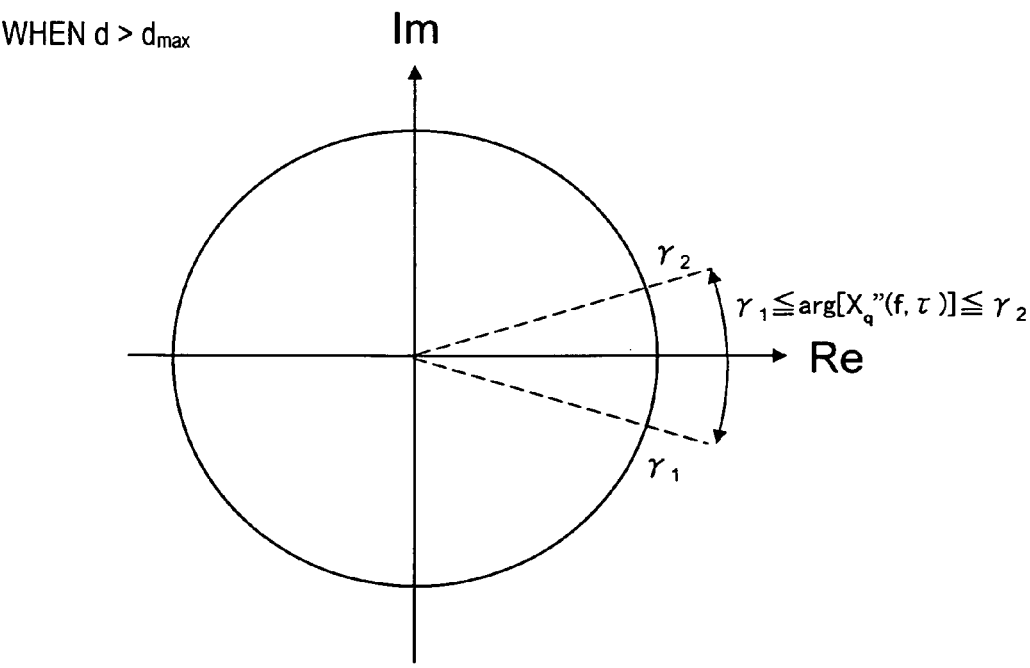
FIG. 38B is a complex plane used for illustrating the relation between an element $X_q"(f, \tau)$ of a norm-normalized vector $X"(f, \tau)$ at each value of parameter "d" and its argument $\arg[X_q"(f, \tau)]$ when $d>d_{max}$.

FIG. 38A is a complex plane of the case where $d=d_{max}$ and FIG. 38B is a complex plane of the case where $d > d_{max}$. Here, if $d > d_{max}$, the relation $-\pi/2 < (\pi/2) \cdot (d_{qk}-d_{Qk})/d < 0$, $0 < (\pi/2) \cdot (d_{qk}-d_{Qk})/d < \pi/2$ is possible. As a result, the arguments arg

[$X_q''(f, \tau)$] of $X_q''(f, \tau)$ represented by Equation (66) are distributed over the range $\gamma_1 \leq \arg[X_q''(f, \tau)] \leq \gamma_2 (-\pi/2 < \gamma_1 < 0$ and $0 < \gamma_2 < \pi/2)$ as shown in FIG. 38B. As the value d increases, the distribution range becomes narrower and clusters are distributed more densely in the narrow range. This degrades the accuracy of the clustering described above.

On the other hand, if $d=d_{max}$, the relationship $-\pi/2 \leq (\pi/2) \cdot (d_{qk} - d_{Qk})/d < 0$ and $0 < (\pi/2) \cdot (d_{qk} - d_{Qk})/d \leq \pi/2$ are possible. Consequently, the arguments $\arg[X_q''(f, \pi)]$ of $X_q''(f, \tau)$ represented by Equation (66) are distributed over the range $-\pi/2 < \arg[X_q''(f, \tau)] \leq \pi/2$ as shown in FIG. 38A. In this case, clusters can be distributed over a range as wide as possible while maintaining the relationship in which the distance between elements of norm-normalized vectors $X''(f, \tau)$ monotonically increases as the difference between the arguments of the elements increases. Consequently, the accuracy of clustering can be improved in general. [End of the detailed description of (the processing by the frequency normalizing section 2121 and the norm normalizing section 2122)]

[Details of Processing by the Clustering Section 2123 (Details of Step S204)]

As described earlier, the clustering section 2123 reads norm-normalized vectors $X''(f, \tau)$ from memory area 2104 of the memory 2100 and clusters them into M clusters. This clustering is performed so that the total sum U of the sums of squares $U_k$ of the members of the clusters ($X''(f, \tau) \in C_k$) and their centroids $\eta_k$

[Formula 56]

$$U = \sum_{k=1}^{M} U_k$$
$$U_k = \sum_{X''(f,\tau) \in C_k} \|X''(f, \tau) - \eta_k\|^2$$

is minimized. The minimization can be performed effectively by using the k-means clustering described in Non-patent literature 6, for example. The centroid (center vector) $\eta_k$ of the cluster identified by cluster information $C_k$ can be calculated as

[Formula 57]

$$\eta_k = \frac{\sum_{X''(f,\tau) \in C_k} X''(f, \tau)/|C_k|}{\left\| \sum_{X''(f,\tau) \in C_k} X''(f, \tau)/|C_k| \right\|}$$

where $|C_k|$ is the number of members (norm-normalized vectors $X''(f, \tau)$) of the cluster identified by cluster information $C_k$. While the distance used here is the square of the Euclidean distance, it may be the Minkowski distance, which is the generalized square of the Euclidean distance. [End of the detailed description of (the processing by the clustering section 2123)]

[Details of Processing by the Separated Signal Generating Section 2124 (Details of Step S205)]

Figure 36:
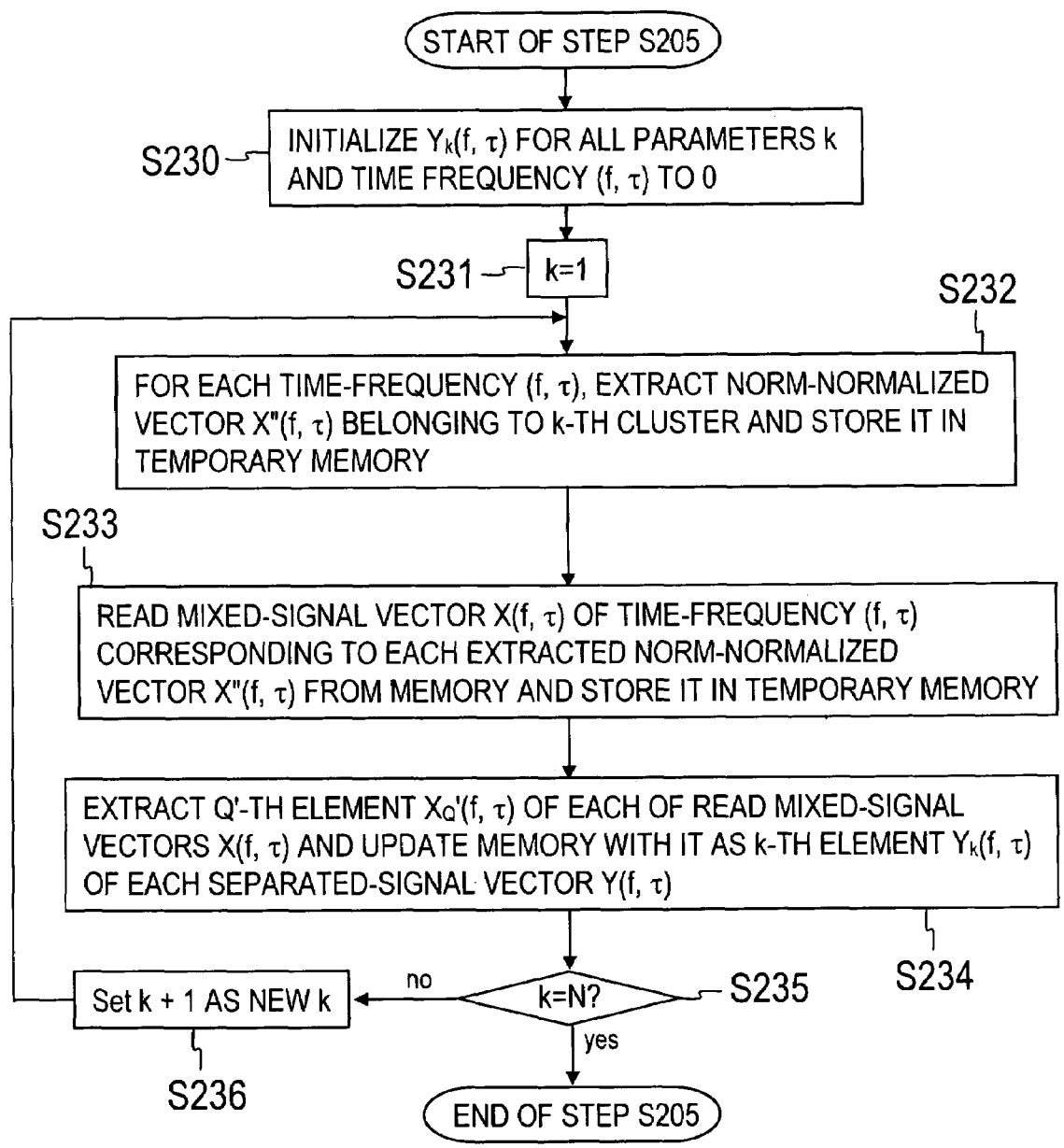
FIG. 36 is a flowchart illustrating details of processing at step S205 shown in FIG. 34.

FIG. 36 is a flowchart illustrating details of processing at step S205 shown in FIG. 34. With reference to the flowchart, details of processing at step S205 will be described below.

First, the control section 2140 (FIG. 32) initializes the values of $Y_k(f, \tau)$ for all values of parameter k (k=1, . . . , N) and time frequencies (f, $\tau$) (all f and $\tau$ in a defined range) to 0 and stores them in memory area 2107 of the memory 2100 (step S230).

The control section 2140 then assigns 1 to parameter k and stores it in the temporary memory 2141 (step S231). Then the separated signal generating section 2124 (FIGS. 32 and 33) reads the cluster information $C_k$ from memory area 2106 of the memory 2100, extracts the members (norm-normalized vectors $X''(f, \tau)$) of the k-th cluster identified by the cluster information $C_k$, and stores them in the temporary memory 2141 (step S232). The separated signal generating section 2124 then refers to the norm-normalized vectors $X''(f, \tau)$ stored at step S232 in the temporary memory 2141, reads mixed-signal vectors $X(f, \tau)$ in the time-frequencies (f, $\tau$) corresponding to the norm-normalized vectors $X''(f, \tau)$ from memory area 2102 of the memory 2100, and stores them in the temporary memory 2141 (step S233). Then, the separated signal generating section 2124 reads the reference value Q' from memory area 2105 of the memory 2100 and extracts (for each time-frequency (f, $\tau$)) the Q'-th element $X_{Q'}(f, \tau)$ of the mixed-signal vector $X(f, \tau)$ stored at step S233. The separated signal generating section 2124 updates the values in memory area 2107 of the memory 2100 by setting the extracted element $X_{Q'}(f, \tau)$ as the k-th element $Y_k(f, \tau)$ of the separated-signal vector $Y(f, \tau)$ (step S234). That is, the separated signal generating section 2124 in this example extracts the element $Y_k(f, \tau)$ as

[Formula 58]

$$Y_k(f, \tau) = \begin{cases} X_{Q'}(f, \tau) & X''(f, \tau) \in C_k \\ 0 & \text{otherwise} \end{cases}$$

Then, the control section 2140 determines whether the value of parameter k stored in the temporary memory 2141 satisfies k=N (step S235). If not k=N, the control section 2140 sets a calculation result k+1 as a new value of parameter k, stores it in the temporary memory 2141 (step S236), and then returns to step S232. On the other hand, if k=N, the control section 2140 terminates processing at step S205. [End of the detailed description of (processing by the separated signal generating section 2124)]

<Experimental Results>

Results of experiments on sound source separation according to the sixth embodiment will be given below. In order to demonstrate the effects of the sixth embodiment, experiments on two types of signal separation were conducted.

Figures 39A, 39B:
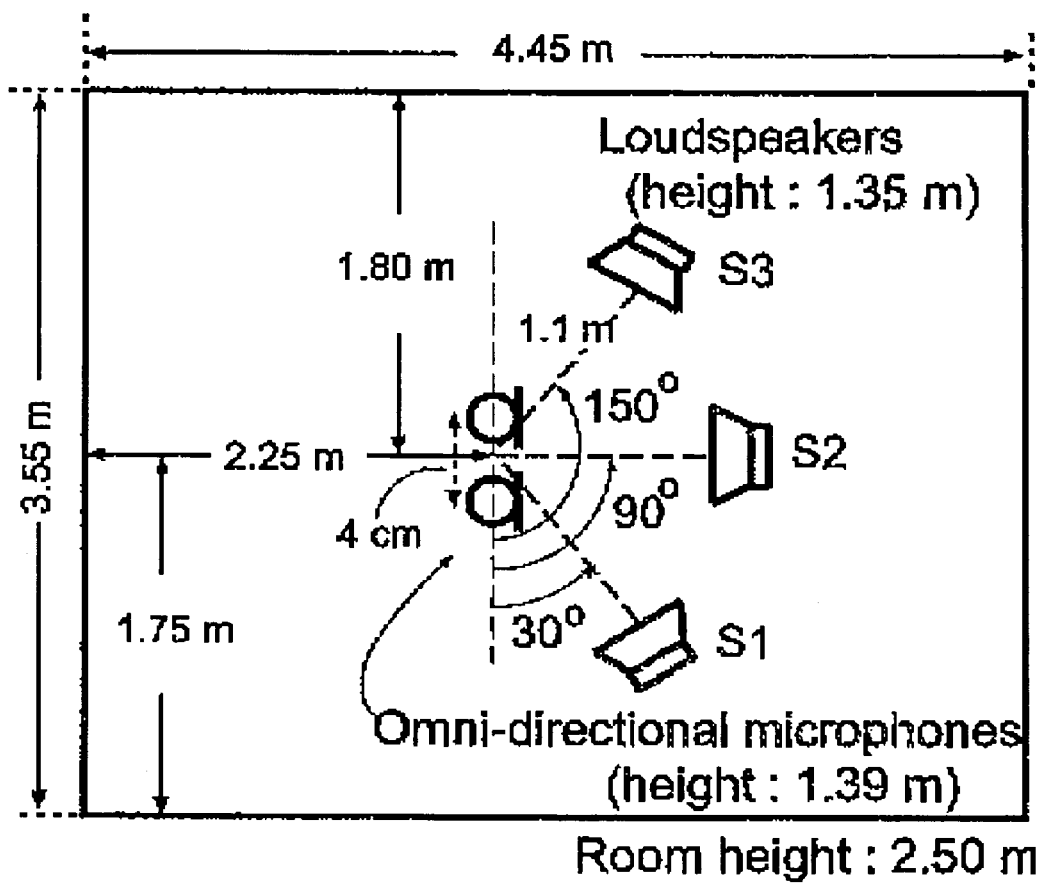
FIG. 39A shows conditions of sound source separation experiments according to the sixth embodiment.
FIG. 39B shows results of the sound source separation experiments according to the sixth embodiment.

In a first separation experiment, two sensors are used. Conditions of the experiment are shown in FIG. 39A. Three signal sources were used and English speech was emitted for 6 seconds through loudspeakers. Table in FIG. 39B shows the results of the experiments. As shown in the Table, the SIRs (signal-to-interference ratios) are improved. Greater numeric values represent better separation performances. Shown in the table are observations by the sensors before separation (InputSIR), results obtained using clustering with DOA (DOA (Previous)), and results obtained using the sixth embodiment (clustering using normalization) (Normalized obser. vector (Proposed)). The results reveal that, when two sensors are used, the method of the sixth embodiment can achieve signal separation with performance equivalent to the performance achieved by clustering using DOA alone.

Figures 40A, 40B:
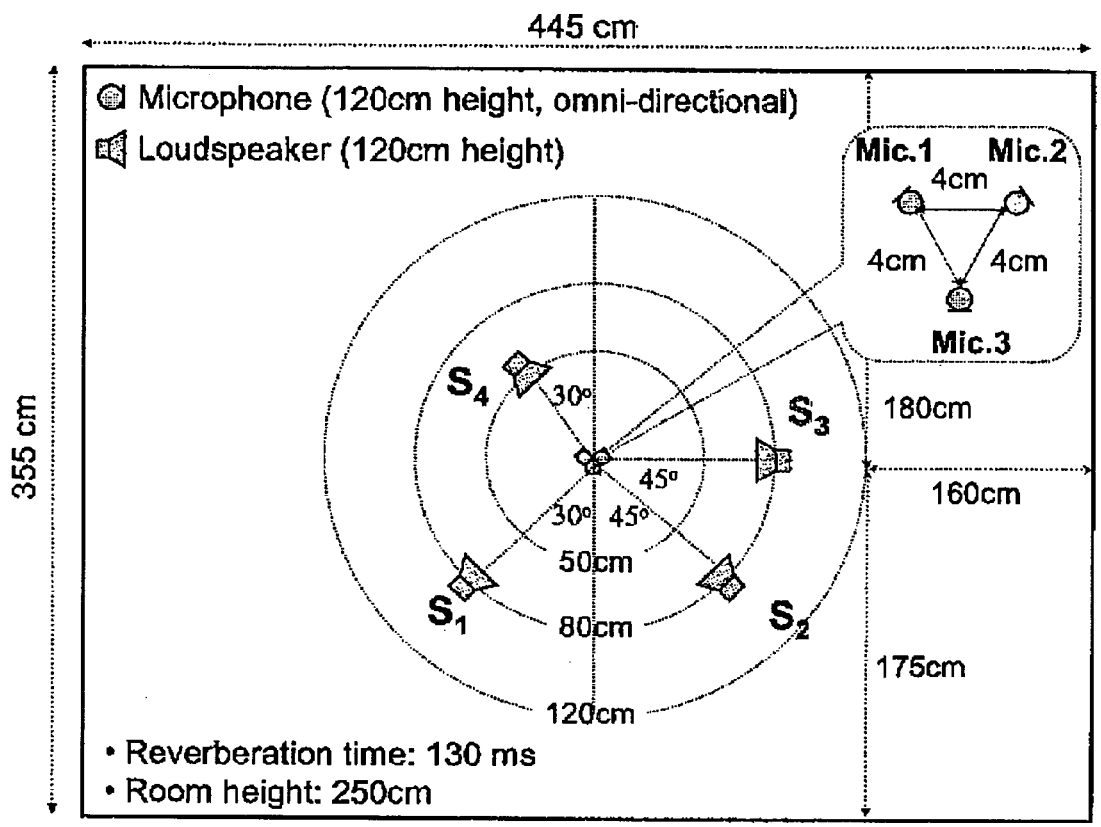
FIG. 40A shows conditions of sound source separation experiments according to the sixth embodiment.
FIG. 40B shows results of the sound source separation experiments according to the sixth embodiment.
Figures 41A, 41B:
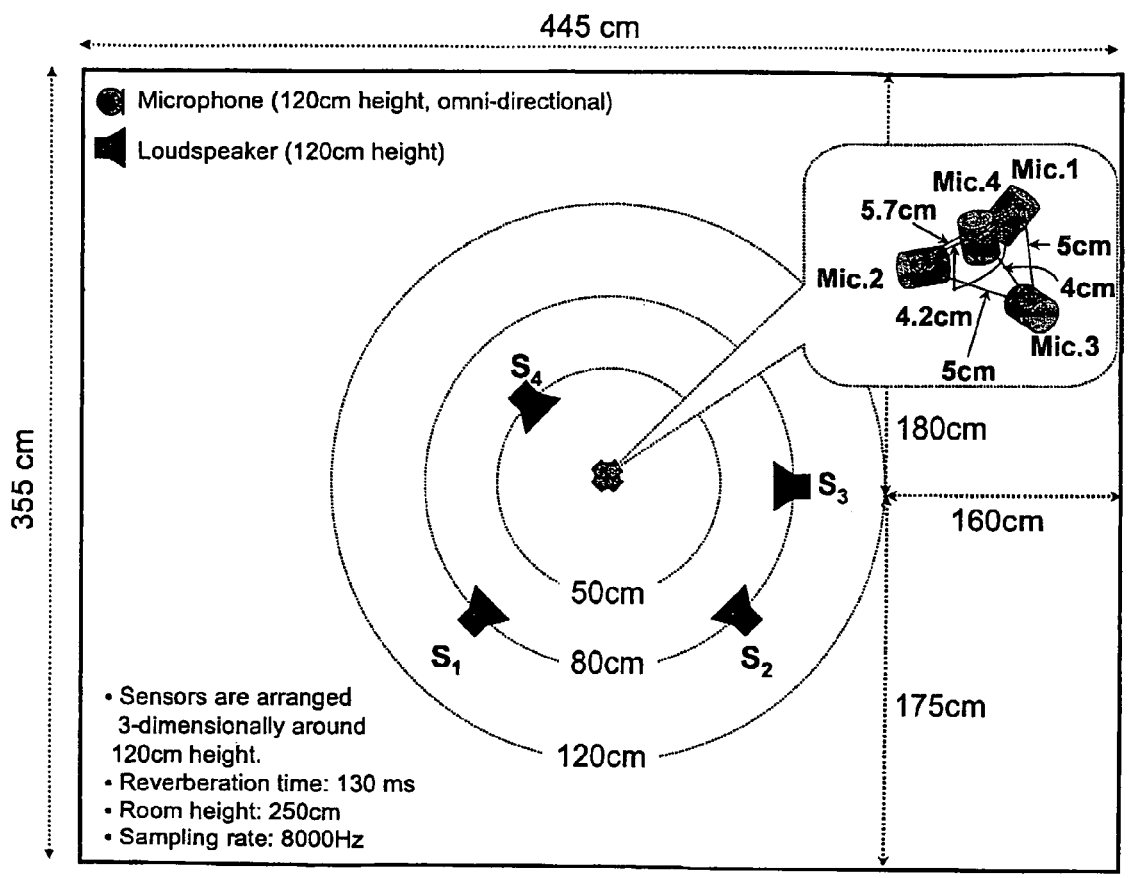
FIG. 41A shows conditions of sound source separation experiments according to the sixth embodiment.
FIG. 41B shows results of the sound source separation experiments according to the sixth embodiment.

In a second experiment, randomly arranged sensors are used. Experimental conditions are shown in FIG. 40A. In the experiment, four omnidirectional microphones (sensors) were nonlinearly arranged. Information indicating a maximum distance between microphones of 4 cm was all information provided to the separation system as to the arrangement of the sensors. Four signal sources were used to emit English speech for 6 seconds through loudspeakers. If DOAs were used in this arrangement of sensors and signal sources, a complicated process would have to be performed in which DOA of each sensor pair is estimated, clustering is performed for each sensor pair, and then the results of clustering at all sensor pairs are combined. The method of the sixth embodiment can achieve high separation performance as shown in the table in FIG. 40B without needing such a complicated combining operation. Furthermore, the second embodiment conducted under the conditions shown in FIG. 41A also showed high separation performance as shown in the table in FIG. 41B.

Features of the Sixth Embodiment

The features of the sixth embodiment are summarized below.

(1) Because all information obtained from mixed-signal vectors is used for clustering, information about all sensors can be effectively used and therefore the performance of signal separation is improved.

(2) Because precise information about the positions of sensors is not needed, a random arrangement of sensors can be used and sensor position calibration is not required.

<Variations>

The present invention is not limited to the sixth embodiment described above. For example, the first normalizing section $2121a$ of the frequency normalizing section $2121$ in the sixth embodiment normalizes the argument of each element $X_q(f, \tau)$ of a mixed-signal vector $X(f, \tau)$ on the basis of a particular element $X_q(f, \tau)$ of the mixed-signal vector $X(f, \tau)$ according to Equation (61). However, the first normalizing section $2121a$ of the frequency normalizing section $2121$ may normalize the argument of each element $X_q(f, \tau)$ of a mixed-signal vector $X(f, \tau)$ on the basis of a particular element $X_q(f, \tau)$ of the mixed-signal vector $X(f, \tau)$ according to any of the following equations.

$$X_q'''(f,\tau)=|X_q(f,\tau)|\exp\{j\cdot(\arg[X_q(f,\tau)\cdot X_Q^*(f,\tau)])\}X_q'''(f,\tau)=|X_q(f,\tau)|\exp\{j\cdot(\arg[X_q(f,\tau)]-\arg[X_Q(f,\tau)])\}X_q'''(f,\tau)=|X_q(f,\tau)|\exp\{j\cdot\Psi(\arg[X_q(f,\tau)/X_Q(f,\tau)])\}$$ [Formula 59]

Here, "*" is the complex conjugate of "·" and "$\Psi\{\cdot\}$" is a function, preferably a monotonically increasing function from a viewpoint of clustering accuracy.

The frequency normalizing section $2121$ may perform the frequency normalizing by using any of the following equations

[Formula 60]

$$X_q'(f, \tau) = \rho \cdot \frac{\arg[X_q(f, \tau)/X_Q(f, \tau)]}{4fc^{-1}d}$$

$$X_q'(f, \tau) = \rho \cdot \frac{\arg[X_q(f, \tau)\cdot X_Q*(f, \tau)]}{4fc^{-1}d}$$

$$X_q'(f, \tau) = \rho \cdot \frac{\arg[X_q(f, \tau)] - \arg[X_Q(f, \tau)]}{4fc^{-1}d}$$

$$X_q'(f, \tau) = \rho \cdot \frac{\Psi(\arg[X_q(f, \tau)/X_Q(f, \tau)])}{4fc^{-1}d}$$

instead of Equation (60). Here, $\rho$ is a constant (for example $\rho=1$).

While the norm normalizing section $2122$ in the sixth embodiment performs normalization so that the norm has a value of 1, it may perform normalization so that the norm has a predetermined value other than 1. Furthermore, the norm normalizing section $2122$ is not provided and therefore norm normalization may be omitted. In that case, the clustering section $2123$ clusters frequency-normalized vectors $X'(f, \tau)$. However, the norms of frequency-normalized vectors $X'(f, \tau)$ are not equal. Therefore, the clustering is performed based on whether vectors are similar only in direction, rather than both in direction and norm. This means evaluation based on the degrees of similarity. One example of the measure of similarity may be cosine distance $$\cos\theta=|X'^H(f,\tau)\cdot\eta_k|/(\|X'(f,\tau)\|\cdot\|\eta_k\|)$$

where $\theta$ is the angle between a frequency-normalized vector $X'(f, \tau)$ and the vector of the centroid $\eta_k$. If the cosine distance is used, the clustering section $2123$ generates a cluster that minimizes the total sum of cosine distances $$U_i=\Sigma_{X_p'(f,\tau)\in C_i}|X_p'^H(f,\tau)\cdot\eta_i|/(\|X_p'(f,\tau)\|\cdot\|\eta_i\|)$$ [Formula 61]

Here, the centroid $\eta_k$ is the average among the members of each cluster.

The reference values Q and Q' given above may or may not be equal.

The same value of parameter d may be set for all sensors q or different values of parameter d may be set for different sensors q. For example, the distance between a reference sensor and a sensor q may be set as the value of parameter d for the sensor q.

Furthermore, the separated signal generating section $2124$ may generate, instead of

[Formula 62]

$$Y_k(f, \tau) = \begin{cases} X_{Q'}(f, \tau) & X''(f, \tau) \in C_k \\ 0 & \text{otherwise} \end{cases}$$

the following binary mask

[Formula 63]

$$M_k(f, \tau) = \begin{cases} 1 & X''(f, \tau) \in C_k \\ 0 & \text{otherwise} \end{cases}$$

and obtain the k-th element $Y_k(f, \tau)$ of a separated signal vector $Y(f, \tau)$ as $$Y_k(f,\tau)=M_k(f,\tau)X_{Q'}(f,\tau)$$

While a Fourier transformation or an inverse Fourier transformation is used for transformation between the frequency domain and the time domain in the embodiments described above, a wavelet transformation, DFT filter bank, polyphase filter bank or the like may be used for the transformation (for example see R. E. Crochiere, L. R. Rabiner, "Multirate Digital Signal Processing." Eaglewood Cliffs, N.J.: Prentice-Hall, 1983 (ISBN 0-13-605162-6). The operations described above may be performed in time sequence in accordance with the description or may be performed in parallel or separately, depending on the throughput capacity of the apparatus that performs the operations. It will be understood that any other modifications may be made without departing from the spirit of the present invention.

If any of the embodiments described above is implemented by a computer, operations to be performed by each apparatus are described by a program. The processing functions described above are implemented on the computer by executing the program.

The program describing these processing operations can be recorded on a computer-readable recording medium. The computer-readable medium may be any medium such as a magnet recording device, an optical disk, magneto-optical recording medium, or a semiconductor memory. In particular, the magnetic recording device may be a hard disk device, a flexible disk, or a magnetic tape; the optical disk may be a DVD (Digital Versatile Disc), a DVD-RAM (Random Access Memory), a CD-ROM (Compact Disc Read Only Memory), a CD-R (Recordable/RW (ReWritable); the magneto-optical recording medium may be an MO (Magneto-Optical disc); and the semiconductor memory may be an EEP-ROM (Electronically Erasable and Programmable-Read Only Memory).

The program may be distributed by selling, transferring, or leasing a removable recording medium such as a DVD or a CD-ROM, for example, on which the program is recorded. Alternatively, the program may be distributed by storing it in a storage device of a server computer beforehand and transmitting it from the server computer to another computer via a network.

In an alternative embodiment, a computer may directly read the program from a removable recording medium and execute processing according to the program, or the computer may execute processing according to the program each time the program is transmitted from a server to the computer. Alternatively, the computer may execute the processing described above using an ASP (Application Service Provider) service in which the program itself is not transmitted from a server computer to the computer, instead, the computer implements the processing by obtaining only instructions of the program and the results of execution of the instructions. The program in this mode includes information that is made available for processing by computer and is a quasi-program (such as data that are not direct instructions to a computer but defines processing to be performed by the computer).

While a given program is executed on a computer to configure the present embodiments, at least part of the processing described above may be implemented by hardware.

INDUSTRIAL APPLICABILITY

According to the present technique, a target signal can be accurately extracted in a real environment in which various interfering signals are generated. Examples of applications to sound signals include a speech separation system which functions as a front-end system of a speech recognition apparatus. Even in a situation where a human speaker and a microphone are distant from each other and therefore the microphone collects sounds other than the speech of the speaker, such a system can extract only the speech of that speaker to enable the speech to be properly recognized.

What is claimed is:

1. A signal separating apparatus which separates mixed signals consisting of a mixture of source signals originated from a plurality of signal sources into the source signals, comprising:
   a frequency domain transforming section which transforms the mixed signals observed by a plurality of sensors into mixed signals in the frequency domain;
   a normalizing section which normalizes a complex vector generated by using the mixed signals in the frequency domain to generate a normalized vector excluding frequency dependence of the complex vector; and
   a clustering section which clusters the normalized vectors to generate clusters.

2. A signal separating apparatus according to claim 1, wherein the normalizing section comprises:
   a first normalizing section which normalizes the argument of each of the elements of the complex vector by using one particular element of the complex vector as a reference; and
   a second normalizing section which divides the argument of each of the elements normalized by the first normalizing section by a value proportional to a frequency.

3. A signal separating apparatus according to claim 2, wherein the normalizing section further comprises a third normalizing section which normalizes the norm of a vector consisting of the elements normalized by the second normalizing section to a predetermined value.

4. A signal separating apparatus which separates mixed signals consisting of a mixture of source signals originated from a plurality of signal sources into the source signals, comprising:
   a frequency transforming section which transforms the mixed signals observed by a plurality of sensors into mixed signals in the frequency domain;
   a separation matrix computing section which calculates a separation matrix for each frequency by using the mixed signals in the frequency domain;
   an inverse matrix computing section which calculates a generalized inverse matrix of the separation matrix;
   a basis vector normalizing section which normalizes basis vectors constituting the generalized inverse matrix to obtain normalized basis vectors;
   a clustering section which clusters the normalized basis vectors to generate clusters; and
   a permutation computing section which uses center vectors of the clusters and the normalized basis vectors to calculate a permutation used for rearranging the elements of the separation matrix.

5. A signal separating apparatus according to claim 4, wherein the basis vector normalizing section performs normalization that eliminates frequency dependence from the basis vectors.

6. A signal separating apparatus according to claim 5, wherein the normalization that eliminate frequency dependence from the basis vectors normalize the argument of each element of each of the basis vectors by using one particular element of the basis vector as a reference and divides the argument of each element by a value proportional to a frequency.

7. A signal separating apparatus according to claim 5, wherein the normalization that eliminates frequency dependence from the basis vectors is performed by calculating

[Formula 64]

$$A'_{qp}(f) = |A_{qp}(f)| \exp\left[ j \frac{\arg[A_{qp}(f)/A_{Qp}(f)]}{4fc^{-1}d} \right]$$

for each element $A_{qp}(f)$ (where q=1, . . . , M and M is the number of sensors observing the mixed signals) of the basis vectors $A_p(f)$ (where p=1, . . . , N and N is the number of signal sources), where exp is Napier's number, arg[·] is an argument, f is a frequency, j is an imaginary unit, c is signal transmission speed, Q is a reference value selected from natural numbers less than or equal to M, and d is a real number.

8. A signal separating apparatus according to claim 7, wherein "d" is a longest distance $d_{max}$ in distances between a reference sensor corresponding to the element $A_{Qp}(f)$ and other sensors.

9. A signal separating apparatus according to claim 4, wherein the basis vector normalizing section performs normalization that eliminates frequency dependence from the basis vectors and normalization that normalizes the norms of the basis vectors to a predetermined number.

10. A signal separating apparatus which separates mixed signals consisting of a mixture of source signals originated from a plurality of signal sources into the source signals, comprising:
   a frequency transforming section which transforms the mixed signals observed by a plurality of sensors into mixed signals in the frequency domain;
   a separation matrix computing section which calculates a separation matrix for each frequency by using the mixed signals in the frequency domain;
   an inverse matrix computing section which calculates a generalized inverse matrix of the separation matrix;
   a basis vector normalizing section which normalizes basis vectors constituting the generalized inverse matrix to obtain normalized basis vectors;
   a clustering section which clusters the normalized basis vectors to generate clusters; and
   a permutation computing section which uses an envelope, the center vectors of the clusters, and the normalized basis vectors to calculate a permutation used for sorting elements of the separation matrix, the envelope being a separated signal obtained from the frequency-domain mixed signals and one of the separation matrix and a separation matrix generated by rearranging the separation matrix.

11. A signal separating apparatus which separates mixed signals consisting of a mixture of source signals originated from a plurality of signal sources into the source signals, comprising:
   a frequency domain transforming section which transforms the mixed signals observed by a plurality of sensors into mixed signals in the frequency domain;
   a signal separating section which calculates a separation matrix and separated signals for each frequency by using the mixed signals in the frequency domain; and
   a target signal selecting section which normalizes basis vectors which are columns of a generalized inverse matrix of the separation matrix, clusters the normalized basis vectors, and selects selection signals including a target signal from among the separated signals by using the variance of the clusters as an indicator.

12. A signal separating apparatus according to claim 11, further comprising:
   a mask generating section which generates a time-frequency mask by using the mixed signals in the frequency domain and the basis vectors; and
   a masking section which applies the time-frequency mask to the selection signals selected by the target signal selecting section to generate masked selection signals.

13. A signal separating apparatus according to claim 12, wherein the mask generating section comprises:
   a whitening matrix generating section which generates a whitening matrix by using the mixed signals in the frequency domain;
   a whitening section which uses the whitening matrix to transform a mixed-signal vector consisting of the mixed signals in the frequency domain into a whitened mixed-signal vector and to transform the basis vectors into whitened basis vectors;
   an angle computing section which computes the angle between the whitened mixed-signal vector and the whitened basis vector for each time-frequency; and
   a function operation section which generates the time-frequency mask which is a function including the angle as an element.

14. A signal separating apparatus according to claim 13, wherein the whitening matrix is $V(f)=R(f)^{-1/2}$, wherein $R(f)=<X(f,\tau)\cdot X(f,\tau)^H>_\tau$, f is a frequency, $\tau$ is discrete time, $X(f,\tau)$ is the mixed-signal vector, $<*>$ is a time-averaged vector of a vector "*", and "$*^H$" is a complex conjugate transposed vector of the vector "*";
   the whitening section calculates the whitened mixed-signal vector $Z(f,\tau)$ as $Z(f,\tau)=V(f)\cdot X(f,\tau)$ and calculates the whitened basis vector $B(f)$ as $B(f)=V(f)\cdot A(f)$ where the basis vector is $A(f)$;
   the angle computing section calculates the angle $\theta(f,\tau)$ as $\theta(f,\tau)=\cos^{-1}(|B^H(f)\cdot Z(f,\tau)|/\|B(f)\|\cdot\|Z(f,\tau)\|)$, where $|*|$ is the absolute value of a vector "*" and $\|*\|$ is the norm of the vector "*"; and
   the function operation section calculates a logistic function $M(\theta(f,\tau))=\alpha/(1+e^{g\cdot(\theta(f,\tau)-\theta_T)})$ as the time-frequency mask, where $\alpha$, g, and $\theta_T$ are real numbers.

15. A signal separating apparatus according to claim 12, wherein the mask generating section comprises:
   a frequency normalizing section which normalizes a mixed-signal vector $X(f,\tau)$ generated by using the mixed signals in the frequency domain to a frequency-independent frequency-normalized vector $X'(f,\tau)$;
   a first norm-normalizing section which normalizes the frequency-normalized vector $X'(f,\tau)$ to a norm-normalized vector $X''(f,\tau)$ whose norm has a predetermined value;
   a centroid selecting section which extracts centroids $\eta_\iota$ corresponding to the selection signals;
   a second norm-normalizing section which normalizes the centroids $\eta_\iota$ corresponding to the selection signals to norm-normalized centroids $\eta_\iota'$ whose norm has a predetermined value;
   a squared distance computing section which calculates the square $DS(f,\tau)$ of the distance between the norm-normalized vector $X''(f,\tau)$ and the norm-normalized centroids $\eta_\iota'$; and
   a function generating section which generates the time-frequency mask using a function including the square of the distance $DS(f,\tau)$ as an element.

16. A signal separating apparatus according to claim 11, wherein the target signal selecting section performs normalization that eliminate frequency dependence from the basis vectors.

17. A signal separating apparatus according to claim 16, wherein the normalization that eliminates frequency dependence from the basis vectors normalizes the argument of each element of the basis vectors by using one particular element of the basis vector as a reference and divides the argument of each element by a value proportional to a frequency.

18. A signal separating apparatus according to claim 17, wherein the normalization that eliminates frequency dependence from the basis vectors is performed by calculating

[Formula 65]

$$A'_{qp}(f) = |A_{qp}(f)|\exp\left[j\frac{\arg[A_{qp}(f)/A_{Qp}(f)]}{4fc^{-1}d}\right]$$

for each element $A_{qp}(f)$ (where q=1, ..., M and M is the number of sensors observing the mixed signals) of each of the basis vectors $A_p(f)$ (where p is a natural number), where exp is Napier's number, arg[·] is an argument, f is a frequency, j is an imaginary unit, c is signal transmission speed, Q is a reference value selected from natural numbers less than or equal to M, and "d" is a real number.

19. A signal separating apparatus according to claim 18, wherein the real number "d" is a longest distance $d_{max}$ in distances between a reference sensor corresponding to the reference value Q and other sensors.

20. A signal separating apparatus according to claim 11, wherein the target signal selecting section performs normalization that eliminates frequency dependence from the basis vectors and normalization that normalizes the norms to a predetermined value.

21. A signal separating apparatus according to claim 11, wherein the target signal selecting section selects a cluster that provides the minimum variance and selects separated signals corresponding to the selected cluster as the selection signals.

22. A signal separating apparatus which separates mixed signals consisting of a mixture of source signals originated from a plurality of signal sources into the source signals, comprising:
  a frequency transforming section which transforms the mixed signals observed by a plurality of sensors into mixed signals in the frequency domain;
  a vector normalizing section which normalizes a mixed-signal vector consisting of the mixed signals in the frequency domain to obtain a normalized vector;
  a clustering section which clusters the normalized vector to generate clusters; and
  a separated signal generating section which extracts a predetermined ordinal number-th element of the mixed-signal vector corresponding to the time-frequency of the normalized vector that belongs to the k-th cluster and generates a separated-signal vector having the element as the k-th element.

23. A signal separating apparatus according to claim 22, wherein the vector normalizing section performs normalization that eliminate frequency dependence from the mixed-signal vector consisting of the mixed signals in the frequency domain.

24. A signal separating apparatus according to claim 23, wherein the normalization that eliminates frequency dependence from the mixed-signal vectors has a normalization of the argument of each element of each of the basis vectors by using one particular element of the mixed-signal vector as a reference and a division of the argument of each element by a value proportional to a frequency.

25. A signal separating apparatus according to claim 24, wherein the normalization that eliminates frequency dependence of the mixed-signal vectors is performed by calculating

[Formula 66]

$$X'_q(f, \tau) = |X_q(f, \tau)|\exp\left[j\frac{\arg[X_q(f, \tau)/X_Q(f, \tau)]}{4fc^{-1}d}\right]$$

wherein M is the number of sensors, q=1, ..., M, $X_q(f, \tau)$ denotes each of the elements of the mixed-signal vector, exp is Napier's number, arg[·] is an argument, j is an imaginary unit, c is signal transmission speed, Q is a value selected from natural numbers less than or equal to M, d is a real number, f is a frequency, and c is discrete time.

26. A signal separating apparatus according to claim 25, wherein "d" is a longest distance $d_{max}$ in distances between a sensor corresponding to the element $X_Q(f, \tau)$ and other sensors.

27. A signal separating apparatus according to claim 22, wherein the vector normalizing section performs normalization that eliminates frequency dependence from the mixed-signal vectors and normalization that normalizes the norms to a predetermined value.

28. A signal separating method for separating mixed signals consisting of a mixture of source signals originated from a plurality of signal sources into the source signals, comprising the steps of:
  transforming the mixed signal observed by a plurality of sensors into mixed signals in the frequency domain and outputting the transformed mixed signals;
  calculating a separation matrix for each frequency by using the mixed signals in the inputted frequency-domain;
  calculating a generalized inverse matrix of the inputted separation matrix and outputting the calculated generalized inverse matrix;
  normalizing basis vectors constituting the inputted generalized inverse matrix to obtain normalized basis vectors;
  clustering the inputted normalized basis vectors to generate and output clusters; and
  using the center vectors of the inputted clusters and the normalized basis vectors to calculate a permutation used for rearranging elements of the separation matrix and outputting the calculated permutation.

29. A signal separating method for separating mixed signals consisting of a mixture of source signals originated from a plurality of signal sources into the source signals, comprising the steps of:
  transforming the mixed signals observed by a plurality of sensors into mixed signals in the frequency domain and outputting the transformed mixed signals;
  calculating a separation matrix and separated signals for each frequency by using the inputted frequency-domain mixed-signals; and
  normalizing basis vectors which are columns of a generalized inverse matrix of the inputted separation matrix, clustering the normalized basis vectors, and selecting selection signals including a target signal from among the inputted separated signals by using variance of the clusters as an indicator.

30. A signal separating method for separating mixed signals consisting of a mixture of source signals originated from a plurality of signal sources into the source signals, comprising the steps of:
  transforming the mixed signals observed by a plurality of sensors into mixed signals in the frequency domain and outputting the transformed mixed signals;

normalizing a mixed-signal vector consisting of the inputted frequency-domain mixed signals to obtain a normalized vector and outputting the normalized vector;

clustering the inputted normalized vector to generate clusters and outputting the clusters; and extracting a predetermined ordinal number-th element of the mixed-signal vector corresponding to the time-frequency of the normalized vector that belongs to the k-th cluster and generating and outputting a separated-signal vector having the element as the k-the element.

31. A computer-readable recording medium including a signal separating program, which when executed by a computer causes the computer to function as a signal separating apparatus according to claim 1.

\* \* \* \* \*